US010127781B2

(12) United States Patent
Bowers et al.

(10) Patent No.: US 10,127,781 B2
(45) Date of Patent: Nov. 13, 2018

(54) SYSTEMS AND TECHNIQUES FOR VANDALISM DETECTION IN A PERSONAL COMMUNICATION STRUCTURE (PCS)

(71) Applicant: Civiq Smartscapes, LLC, Milford, MA (US)

(72) Inventors: Kyle R. Bowers, Boxborough, MA (US); Kenneth J. Gray, Uxbridge, MA (US); Benjamin M. Lawler, Beverly, MA (US); Benjamin P. Lee, Wayland, MA (US); Parag N. Shah, Carlisle, MA (US)

(73) Assignee: Civiq Smartscapes, LLC, Milford, MA (US)

( * ) Notice: Subject to any disclaimer, the term of this patent is extended or adjusted under 35 U.S.C. 154(b) by 0 days.

(21) Appl. No.: 15/353,422

(22) Filed: Nov. 16, 2016

(65) Prior Publication Data
US 2017/0175411 A1 Jun. 22, 2017

Related U.S. Application Data

(60) Provisional application No. 62/256,070, filed on Nov. 16, 2015.

(51) Int. Cl.
*G06F 1/16* (2006.01)
*G08B 13/00* (2006.01)
(Continued)

(52) U.S. Cl.
CPC .......... *G08B 13/00* (2013.01); *G06F 1/1633* (2013.01); *G07F 19/201* (2013.01); *G08B 13/06* (2013.01);
(Continued)

(58) Field of Classification Search
CPC ........ G08B 13/00; G08B 13/02; G08B 13/06; G08B 13/14; G08B 13/1409;
(Continued)

(56) References Cited

U.S. PATENT DOCUMENTS 2,029,221 A 1/1936 Jackson et al.
4,923,319 A 5/1990 Dent
(Continued)

FOREIGN PATENT DOCUMENTS

CN 202248971 U 5/2012
CN 203097341 U 7/2013
(Continued)

OTHER PUBLICATIONS

City Bridge, LLC, "Link NYC Technical Proposal," submitted Jul. 21, 2014 to the City of New York Department of Information, Technology and Telecommunications in response to Request for Proposals for a Franchise to Install, Operate and Maintain Public Communications Structures (248 pages).
(Continued)

*Primary Examiner* — Van Trieu
(74) *Attorney, Agent, or Firm* — Goodwin Procter LLP

(57) ABSTRACT

Systems and techniques for vandalism detection in a personal communication structure (PCS) are described. The PCS may include one or more vandalism detection systems which may be located in different system compartments of the PCS. Each vandalism detection system may include (or being communicatively coupled to) an accelerometer and may be able to differentiate forces associated with acts of vandalism from other forces. The vandalism detection systems may transmit alerts with accompanying data to a remote entity. The data allows for an appropriate response to the alert. The alert may be transmitted to a remote security center over a wired or wireless communications system. The
(Continued)

controller may transmit the alert again or to other locations if an acknowledgement is not received.

28 Claims, 39 Drawing Sheets

(51) Int. Cl.
    *G08B 13/14*         (2006.01)
    *G08B 13/06*         (2006.01)
    *G07F 19/00*         (2006.01)

(52) U.S. Cl.
    CPC ...... *G08B 13/1409* (2013.01); *G08B 13/1436* (2013.01); *H05K 999/99* (2013.01)

(58) Field of Classification Search
    CPC ............ G08B 13/1436; G08B 13/1445; G08B 13/1472; G08B 13/149; G06F 1/1633; G06F 3/04886; G06F 19/3481; G06G 19/00; G09B 19/00; G09G 5/00
    See application file for complete search history.

(56) References Cited

U.S. PATENT DOCUMENTS

| | | | |
|---|---|---|---|
| 5,061,023 A | 10/1991 | Soubliere et al. | |
| 5,170,195 A | 12/1992 | Akiyama et al. | |
| 5,415,949 A | 5/1995 | Stone et al. | |
| 5,465,819 A | 11/1995 | Weilant et al. | |
| 5,484,217 A | 1/1996 | Carroll et al. | |
| 5,587,740 A | 12/1996 | Brennan | |
| 5,665,938 A | 9/1997 | Boshear et al. | |
| 5,682,216 A | 10/1997 | Lin et al. | |
| 5,772,300 A | 6/1998 | Kitai | |
| 5,791,770 A | 8/1998 | Hoyt et al. | |
| 5,841,310 A | 11/1998 | Kalthoff et al. | |
| 5,860,253 A | 1/1999 | Lapointe | |
| 5,948,301 A | 9/1999 | Liebermann | |
| 5,961,289 A | 10/1999 | Lohmann | |
| 5,991,153 A | 11/1999 | Heady et al. | |
| 6,002,240 A | 12/1999 | McMahan et al. | |
| 6,010,065 A | 1/2000 | Ramachandran et al. | |
| 6,104,451 A | 8/2000 | Matsuoka et al. | |
| 6,176,421 B1 | 1/2001 | Royal, Jr. et al. | |
| 6,210,066 B1 | 4/2001 | Dent | |
| 6,223,982 B1 | 5/2001 | Dunn | |
| 6,364,761 B1 | 4/2002 | Steinbrecher | |
| 6,384,811 B1 | 5/2002 | Kung et al. | |
| 6,390,436 B2 | 5/2002 | Barnes et al. | |
| 6,493,440 B2 | 12/2002 | Gromatzky et al. | |
| 6,512,670 B1 | 1/2003 | Boehme et al. | |
| 6,766,005 B1 | 7/2004 | Grunenwald | |
| 6,788,544 B1 | 9/2004 | Barsun et al. | |
| 6,792,708 B2 | 9/2004 | Dicke et al. | |
| 6,928,559 B1 | 8/2005 | Beard | |
| 6,969,212 B1 | 11/2005 | Richens et al. | |
| 7,108,445 B2 | 9/2006 | Henriques | |
| 7,157,838 B2 | 1/2007 | Thielemans et al. | |
| 7,195,222 B2 | 3/2007 | Dent | |
| 7,339,782 B1 | 3/2008 | Landes et al. | |
| 7,374,258 B2 | 5/2008 | Bowron | |
| 7,405,926 B2 | 7/2008 | Wu et al. | |
| 7,734,764 B2 | 6/2010 | Weiner et al. | |
| 7,748,681 B2 | 7/2010 | Dent | |
| 7,793,026 B1 | 9/2010 | Abraham et al. | |
| 7,894,194 B2 | 2/2011 | Shih et al. | |
| 7,980,533 B1 | 7/2011 | Anderson et al. | |
| 7,985,139 B2 | 7/2011 | Lind et al. | |
| 8,006,435 B2 | 8/2011 | DeBlonk et al. | |
| 8,006,897 B1 | 8/2011 | Douglass et al. | |
| 8,037,651 B2 | 10/2011 | Dent | |
| 8,108,724 B2 | 1/2012 | Barlow et al. | |
| 8,116,081 B2 | 2/2012 | Crick, Jr. | |
| 8,125,163 B2 | 2/2012 | Dunn et al. | |
| 8,154,768 B2 | 4/2012 | Muraki | |
| 8,189,134 B2 | 5/2012 | LeCave | |
| 8,208,115 B2 | 6/2012 | Dunn | |
| 8,212,959 B2 | 7/2012 | Moscovitch et al. | |
| 8,274,622 B2 | 9/2012 | Dunn | |
| 8,281,531 B2 | 10/2012 | Dent | |
| 8,297,067 B2 | 10/2012 | Keisling et al. | |
| 8,310,824 B2 | 11/2012 | Dunn et al. | |
| 8,321,052 B2 | 11/2012 | Yepez et al. | |
| 8,323,089 B2 | 12/2012 | Nagano | |
| 8,345,845 B2 | 1/2013 | Boyce et al. | |
| 8,350,799 B2 | 1/2013 | Wasinger et al. | |
| 8,351,013 B2 | 1/2013 | Dunn et al. | |
| 8,351,014 B2 | 1/2013 | Dunn | |
| 8,358,397 B2 | 1/2013 | Dunn | |
| 8,369,083 B2 | 2/2013 | Dunn et al. | |
| 8,373,841 B2 | 2/2013 | Dunn | |
| 8,379,182 B2 | 2/2013 | Dunn | |
| 8,427,007 B2 | 4/2013 | Jansma et al. | |
| 8,439,761 B2 | 5/2013 | O'Keene et al. | |
| 8,472,174 B2 | 6/2013 | Idems et al. | |
| 8,482,520 B2 * | 7/2013 | Orr ..................... | G06F 3/04886 345/156 |
| 8,482,695 B2 | 7/2013 | Dunn | |
| 8,497,972 B2 | 7/2013 | Dunn et al. | |
| 8,508,155 B2 | 8/2013 | Schuch | |
| 8,523,135 B2 | 9/2013 | Pierson | |
| 8,548,422 B2 | 10/2013 | Jenkins | |
| 8,569,910 B2 | 10/2013 | Dunn et al. | |
| 8,606,428 B2 | 12/2013 | Chan | |
| 8,649,170 B2 | 2/2014 | Dunn et al. | |
| 8,654,302 B2 | 2/2014 | Dunn et al. | |
| 8,700,226 B2 | 4/2014 | Schuch et al. | |
| 8,711,321 B2 | 4/2014 | Dunn et al. | |
| 8,713,377 B2 | 4/2014 | Nuthi | |
| 8,749,749 B2 | 6/2014 | Hubbard | |
| 8,755,021 B2 | 6/2014 | Hubbard | |
| 8,767,165 B2 | 7/2014 | Dunn | |
| 8,767,923 B1 | 7/2014 | Edwards | |
| 8,773,633 B2 | 7/2014 | Dunn et al. | |
| 8,804,091 B2 | 8/2014 | Dunn et al. | |
| 8,823,916 B2 | 9/2014 | Hubbard et al. | |
| 8,854,572 B2 | 10/2014 | Dunn | |
| 8,854,595 B2 | 10/2014 | Dunn | |
| 8,927,909 B2 | 1/2015 | Le Neel et al. | |
| 8,983,647 B1 | 3/2015 | Dwarakanath et al. | |
| 8,988,647 B2 | 3/2015 | Hubbard | |
| 8,994,559 B1 | 3/2015 | LaRocco | |
| 9,030,641 B2 | 5/2015 | Dunn | |
| 9,072,166 B2 | 6/2015 | Dunn et al. | |
| 9,116,263 B2 | 8/2015 | Hayden, Sr. | |
| 9,451,060 B1 | 9/2016 | Bowers et al. | |
| 9,516,485 B1 | 12/2016 | Bowers et al. | |
| 9,622,392 B1 | 4/2017 | Bowers et al. | |
| 9,703,320 B2 | 7/2017 | Bowers et al. | |
| 9,786,141 B2 * | 10/2017 | Grabham ........... | G08B 13/1472 |
| 9,823,690 B2 | 11/2017 | Bowers et al. | |
| 2001/0032918 A1 | 10/2001 | Barnes et al. | |
| 2003/0080949 A1 | 5/2003 | Ditzik | |
| 2003/0214781 A1 | 11/2003 | Kolb et al. | |
| 2004/0085713 A1 | 5/2004 | Pols Sandhu et al. | |
| 2004/0187505 A1 | 9/2004 | Hoff et al. | |
| 2004/0203570 A1 | 10/2004 | Berger | |
| 2005/0038749 A1 | 2/2005 | Fitch et al. | |
| 2005/0166482 A1 | 8/2005 | Leahy et al. | |
| 2005/0210331 A1 | 9/2005 | Connelly et al. | |
| 2005/0237694 A1 | 10/2005 | Kapusta et al. | |
| 2006/0034051 A1 | 2/2006 | Wang et al. | |
| 2006/0059790 A1 | 3/2006 | Yeung | |
| 2006/0117085 A1 | 6/2006 | Nagao et al. | |
| 2006/0186676 A1 | 8/2006 | Fukunaga et al. | |
| 2006/0203143 A1 | 9/2006 | Shin | |
| 2006/0218828 A1 | 10/2006 | Schrimpf et al. | |
| 2006/0220895 A1 | 10/2006 | Arcaria et al. | |
| 2006/0228165 A1 | 10/2006 | Yonan | |
| 2006/0238307 A1 | 10/2006 | Bauer et al. | |
| 2006/0244700 A1 | 11/2006 | Sano et al. | |
| 2007/0060097 A1 | 3/2007 | Edge et al. | |
| 2007/0082651 A1 | 4/2007 | Loizeaux | |

(56) References Cited

U.S. PATENT DOCUMENTS

| | | |
|---|---|---|
| 2007/0103866 A1 | 5/2007 | Park |
| 2007/0170237 A1 | 7/2007 | Neff |
| 2007/0183849 A1 | 8/2007 | Rock |
| 2007/0263610 A1 | 11/2007 | Mitchell |
| 2008/0053129 A1 | 3/2008 | Follette et al. |
| 2008/0113821 A1 | 5/2008 | Beadell et al. |
| 2008/0181385 A1 | 7/2008 | Eveland |
| 2008/0204556 A1 | 8/2008 | de Miranda et al. |
| 2008/0204982 A1 | 8/2008 | Wu et al. |
| 2008/0255901 A1 | 10/2008 | Carroll et al. |
| 2009/0003312 A1 | 1/2009 | Velazquez et al. |
| 2009/0050763 A1 | 2/2009 | Dittmer |
| 2009/0149153 A1 | 6/2009 | Lee |
| 2009/0231807 A1 | 9/2009 | Bouissiere |
| 2009/0241388 A1 | 10/2009 | Dunn |
| 2009/0241620 A1 | 10/2009 | Field et al. |
| 2009/0280770 A1 | 11/2009 | Mahendran |
| 2009/0302188 A1 | 12/2009 | Lewis |
| 2010/0149736 A1 | 6/2010 | Dittmer et al. |
| 2010/0211804 A1 | 8/2010 | Brumley et al. |
| 2010/0213724 A1 | 8/2010 | Uyeda |
| 2010/0222132 A1 | 9/2010 | Sanford et al. |
| 2010/0237143 A1 | 9/2010 | LaBrecque, Jr. |
| 2011/0080348 A1 | 4/2011 | Lin et al. |
| 2011/0217681 A1* | 9/2011 | Krejcarek ........... G06F 19/3481 434/236 |
| 2011/0226505 A1 | 9/2011 | Mackin |
| 2011/0274093 A1 | 11/2011 | Sing et al. |
| 2012/0032062 A1 | 2/2012 | Newville |
| 2012/0068985 A1 | 3/2012 | Tsai et al. |
| 2012/0096350 A1 | 4/2012 | Chu et al. |
| 2012/0113582 A1 | 5/2012 | Hirano et al. |
| 2012/0213351 A1 | 8/2012 | Boyce et al. |
| 2012/0262271 A1 | 10/2012 | Torgersrud et al. |
| 2012/0295580 A1 | 11/2012 | Corner |
| 2013/0147626 A1 | 6/2013 | Hammoud |
| 2013/0158714 A1 | 6/2013 | Barton et al. |
| 2013/0229098 A1 | 9/2013 | Pletcher |
| 2013/0237175 A1 | 9/2013 | Piett |
| 2013/0332271 A1 | 12/2013 | Hay |
| 2014/0069154 A1 | 3/2014 | Dolev |
| 2014/0148171 A1 | 5/2014 | Cucala Garcia |
| 2014/0224591 A1 | 8/2014 | Garcia |
| 2015/0097663 A1* | 4/2015 | Sloo ..................... G01N 27/02 340/501 |
| 2015/0106150 A1 | 4/2015 | Soleimani |
| 2015/0110453 A1 | 4/2015 | Elford et al. |
| 2015/0244297 A1 | 8/2015 | Niemoeller et al. |
| 2015/0249353 A1 | 9/2015 | Hamilton, IV et al. |
| 2015/0286258 A1 | 10/2015 | Habermehl |
| 2015/0286259 A1 | 10/2015 | Ermenko et al. |
| 2015/0289405 A1 | 10/2015 | Stewart et al. |
| 2017/0074453 A1 | 3/2017 | Bowers et al. |
| 2017/0083043 A1 | 3/2017 | Bowers et al. |
| 2017/0083062 A1 | 3/2017 | Bowers et al. |
| 2017/0111486 A1 | 4/2017 | Bowers et al. |
| 2017/0111520 A1 | 4/2017 | Bowers et al. |
| 2017/0111521 A1 | 4/2017 | Bowers et al. |
| 2017/0140344 A1 | 5/2017 | Bowers et al. |
| 2017/0147992 A1 | 5/2017 | Bowers et al. |
| 2017/0163519 A1 | 6/2017 | Bowers et al. |

FOREIGN PATENT DOCUMENTS

| | | |
|---|---|---|
| CN | 104695733 A | 6/2015 |
| DE | 19817929 A1 | 5/1999 |
| DE | 19903812 A1 | 8/2000 |
| DE | 202006001363 U1 | 4/2006 |
| DE | 202012008748 U1 | 12/2013 |
| DE | 102013202127 U1 | 8/2014 |
| EP | 0387011 A2 | 9/1990 |
| EP | 0936794 A2 | 8/1999 |
| EP | 1530383 A1 | 5/2005 |
| EP | 2328130 A1 | 6/2011 |
| EP | 2439912 A1 | 4/2012 |
| FR | 2892517 A1 | 4/2007 |
| WO | WO-2003/103451 A1 | 12/2003 |
| WO | WO-2007/116116 A1 | 10/2007 |
| WO | WO-2009/135308 A1 | 11/2009 |
| WO | WO-2009/143764 A1 | 12/2009 |
| WO | WO-2015/123142 A1 | 8/2015 |

OTHER PUBLICATIONS

CityBridge & LinkNYC Media Data Sheet, available at <http://civiqsmartscapes.com/img/solutions/LinkNYC-Media-Kit.pdf> published Mar. 2015 (13 pages).

Communication Relating to the Results of the Partial International Search (ISA/206) for International Application No. PCT/US2016/050968 dated Dec. 12, 2016 (5 pages).

International Search Report and The Written Opinion of The International Search Authority for International Application No. PCT/US2016/062037 dated Nov. 6, 2017 (10 pages).

International Search Report and The Written Opinion of the International Searching Authority for International Application No. PCT/US2016/050965 dated Dec. 9, 2016 (13 pages).

International Search Report and The Written Opinion of the International Searching Authority for International Application No. PCT/US2016/050968 dated Mar. 23, 2017 (26 pages).

International Search Report and The Written Opinion of the International Searching Authority for International Application No. PCT/US2016/050972 dated Dec. 7, 2016 (14 pages).

International Search Report and The Written Opinion of the International Searching Authority for International Application No. PCT/US2016/061511 dated Feb. 15, 2017 (12 pages).

International Search Report and The Written Opinion of the International Searching Authority for International Application No. PCT/US2016/062240 dated Mar. 24, 2017 (10 pages).

International Search Report and The Written Opinion of the International Searching Authority for International Application No. PCT/US2016/062244 dated Apr. 12, 2017 (18 pages).

International Search Report and The Written Opinion of the International Searching Authority for International Application No. PCT/US2016/062345 dated Mar. 20, 2017 (9 pages).

U.S. Appl. No. 15/240,493, Techniques and Apparatus for Controlling Access to Components of a Personal Communication Structure (PCS), filed Aug. 18, 2016.

U.S. Appl. No. 15/352,122, Method and Apparatus for Power and Temperature Control of Compartments Within a Personal Communication Structure (PCS), filed Nov. 15, 2016.

U.S. Appl. No. 15/353,647, Techniques and Systems for Servicing a Personal Communication Structure (PCS), filed Nov. 16, 2016.

U.S. Appl. No. 15/353,248, Systems and Methods for Field Replacement of Serviceable Units, filed Nov. 16, 2016.

U.S. Appl. No. 15/423,081, Systems and Methods for Field Replacement of Serviceable Units, filed Feb. 2, 2017.

* cited by examiner

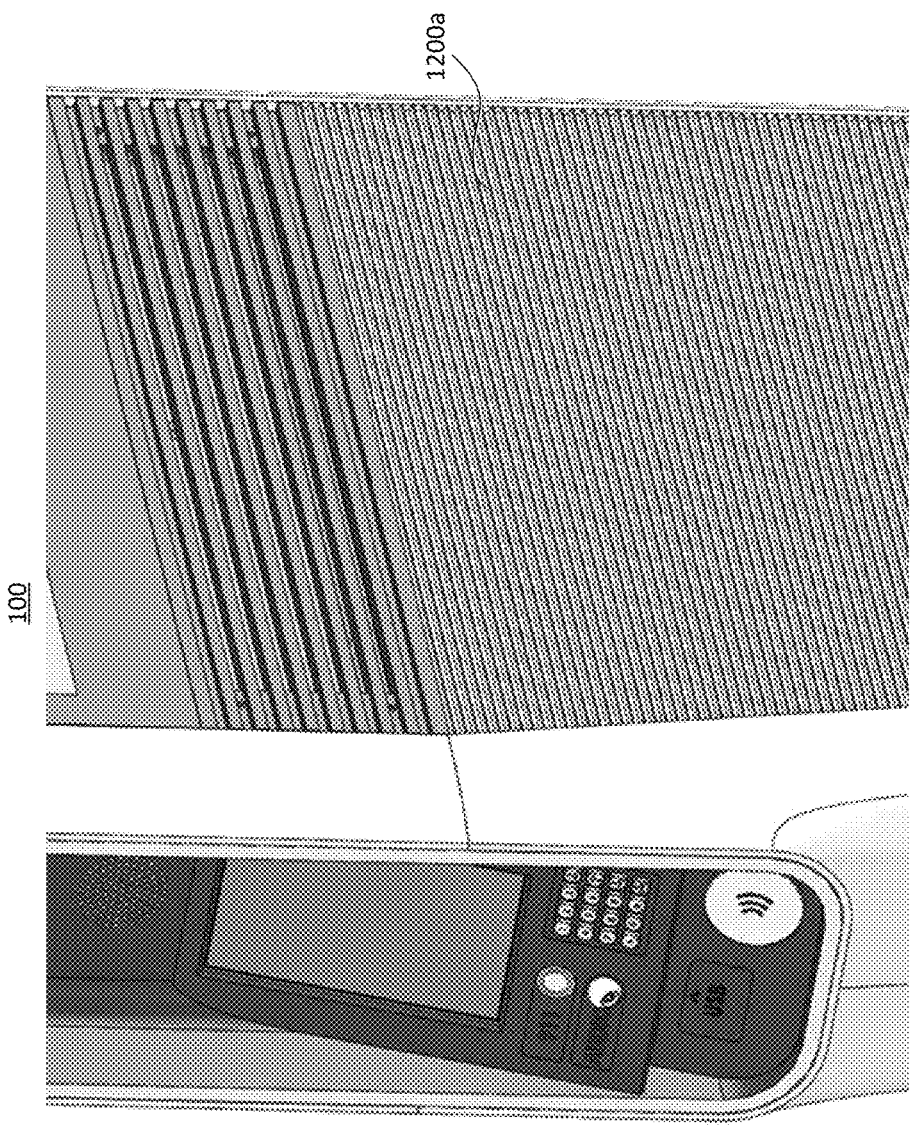

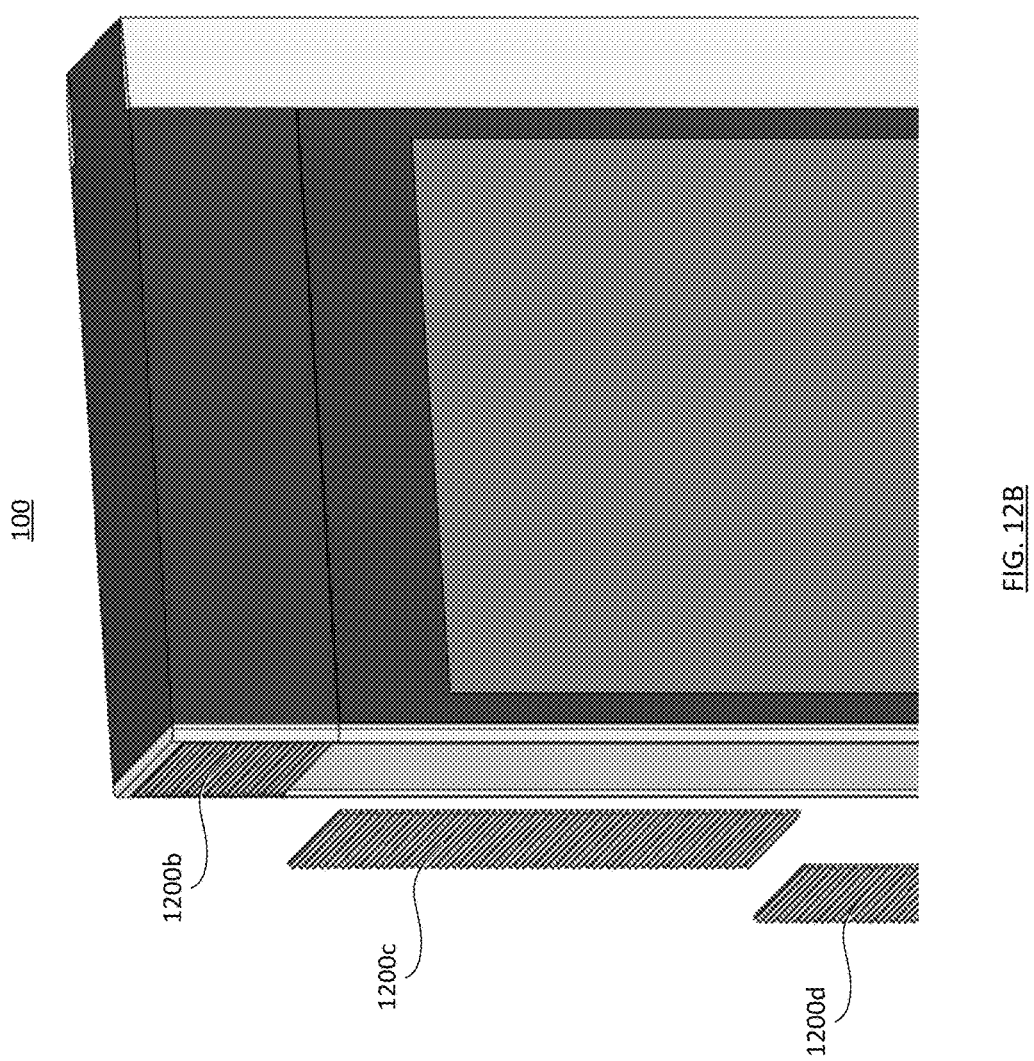

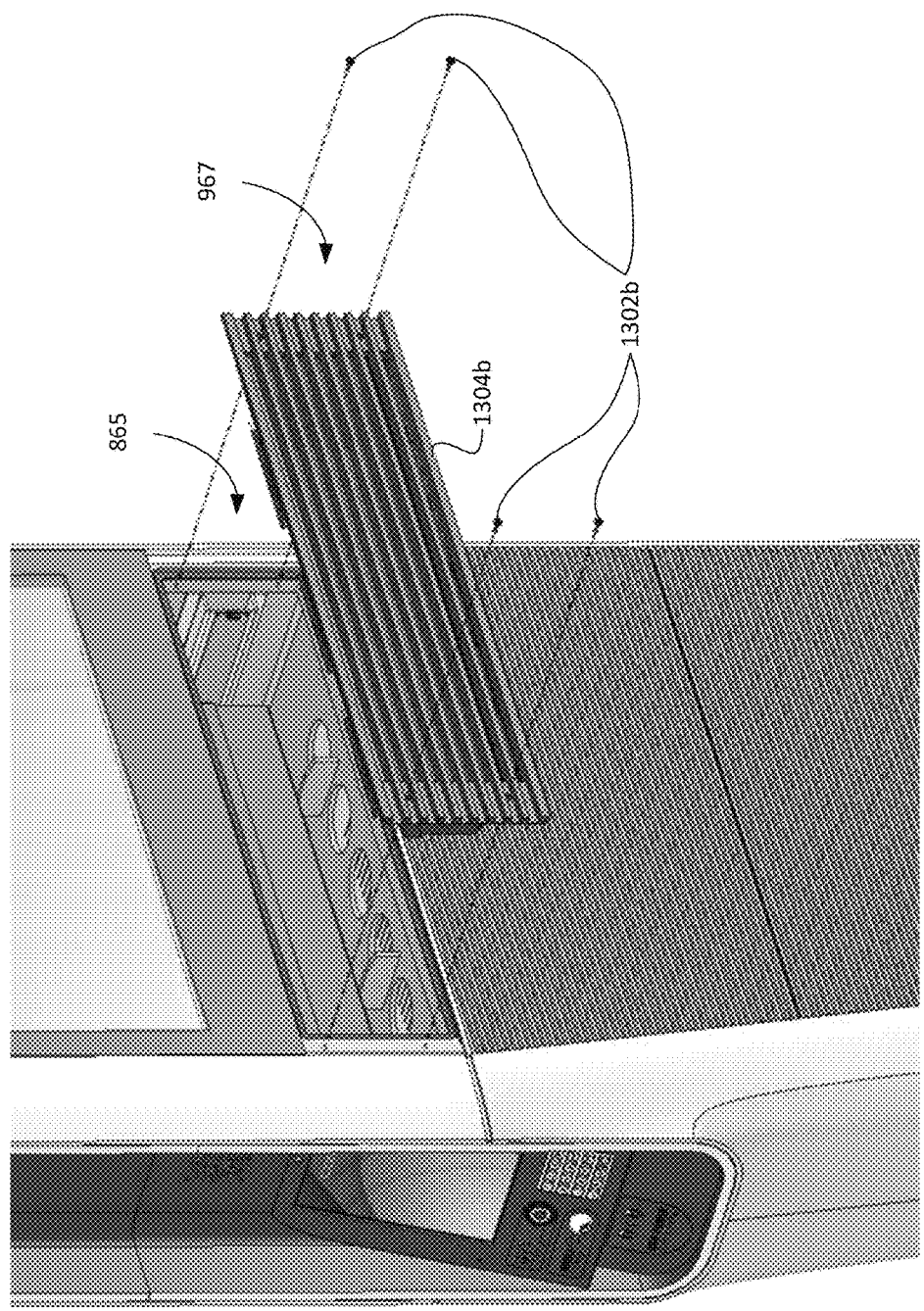

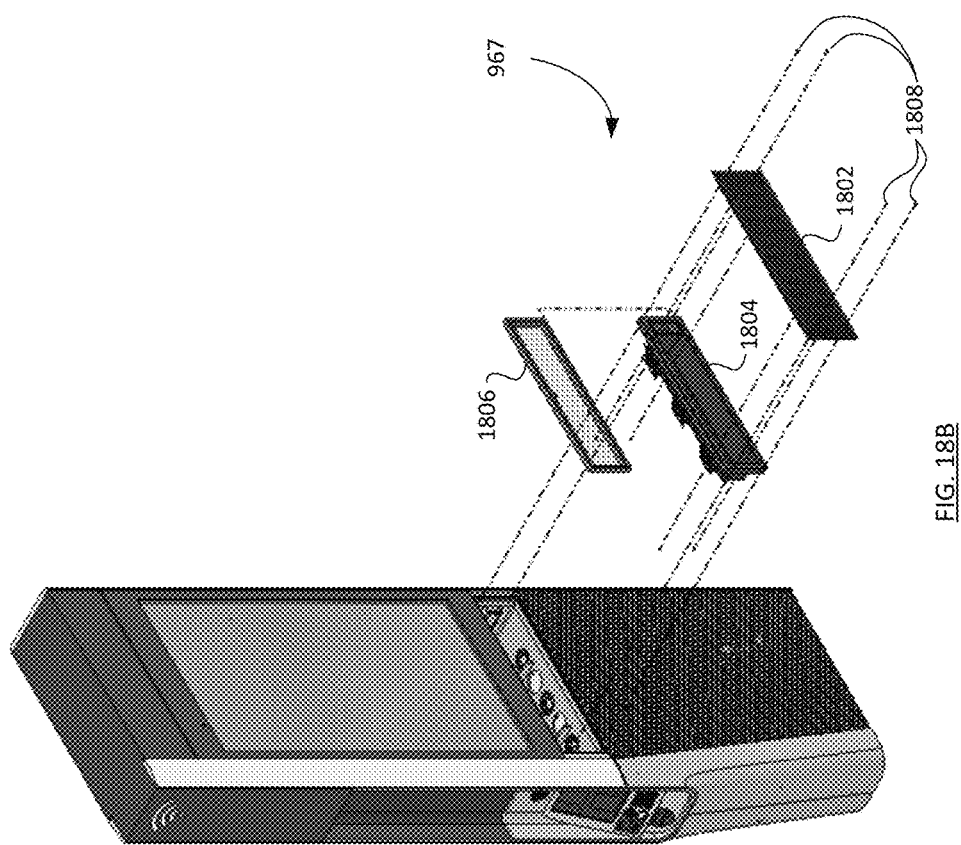

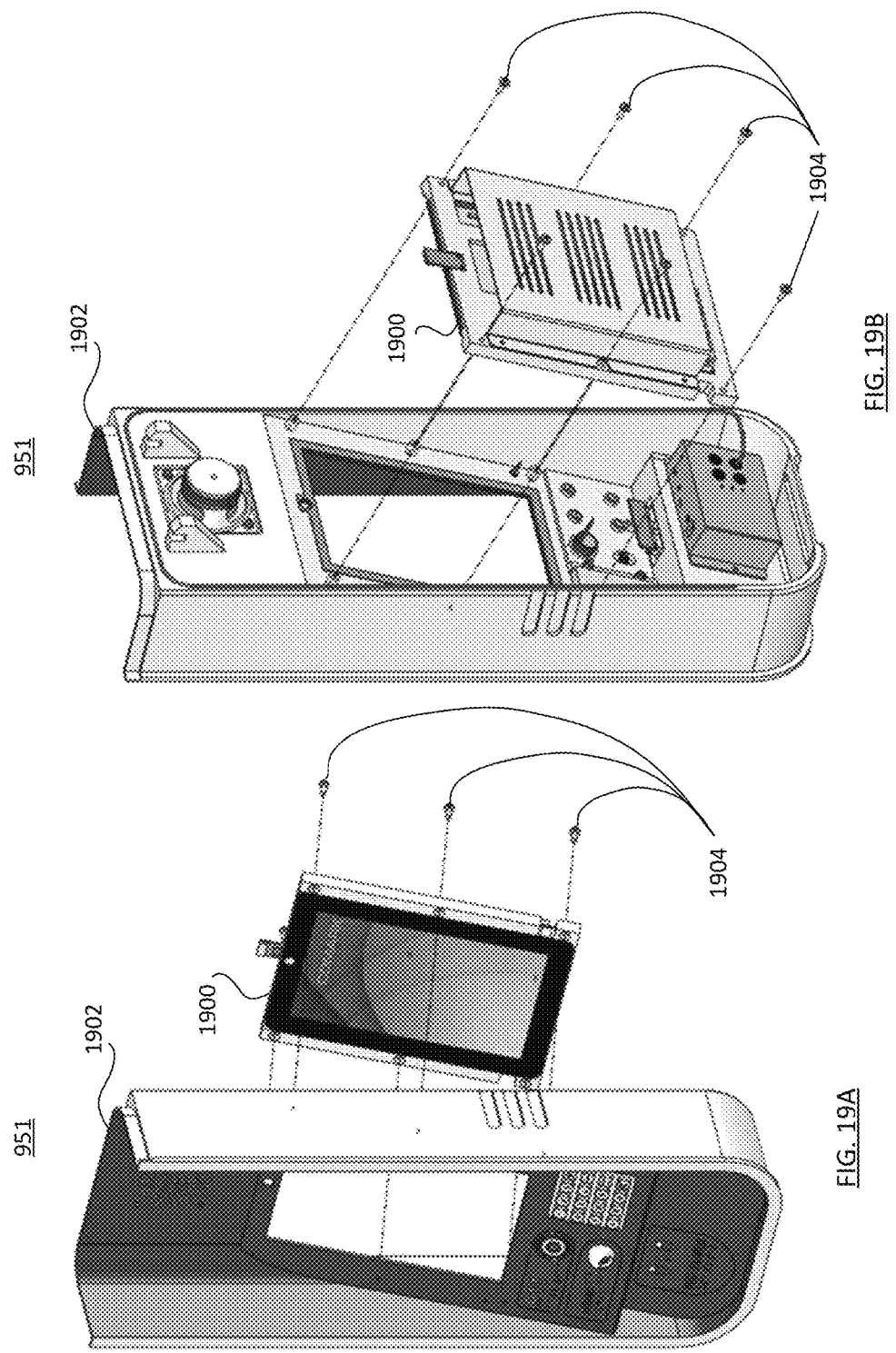

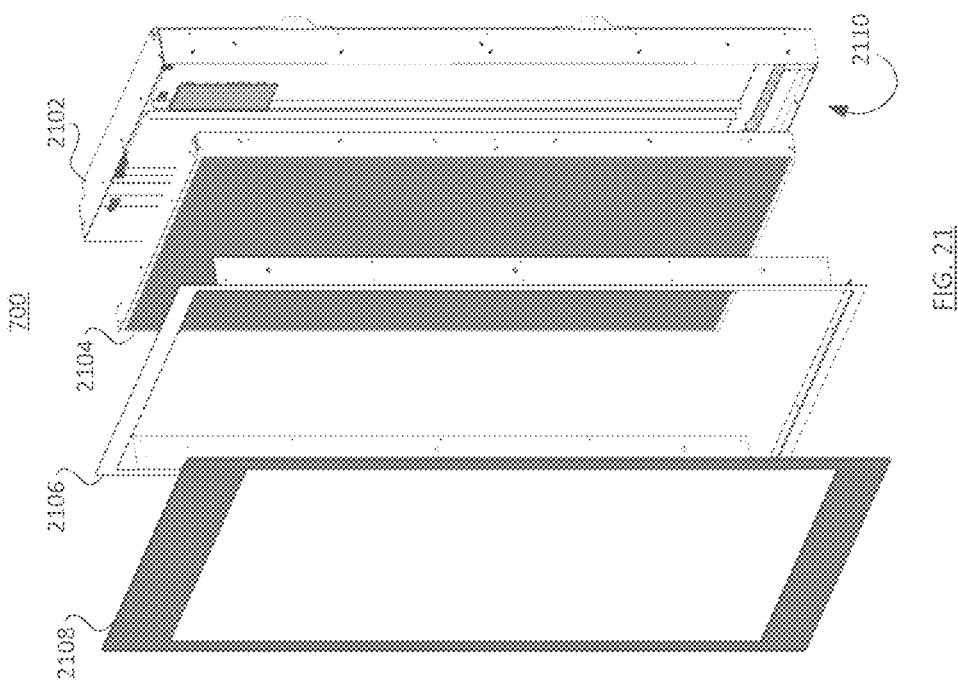
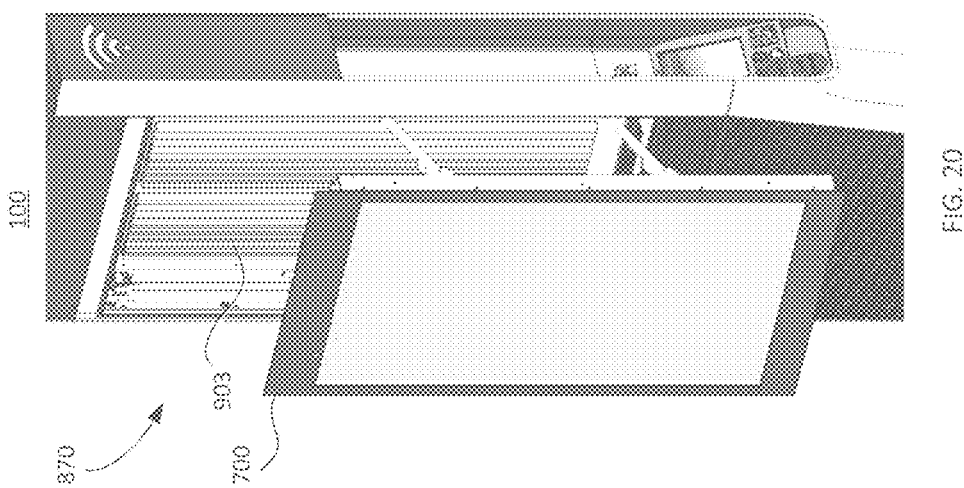

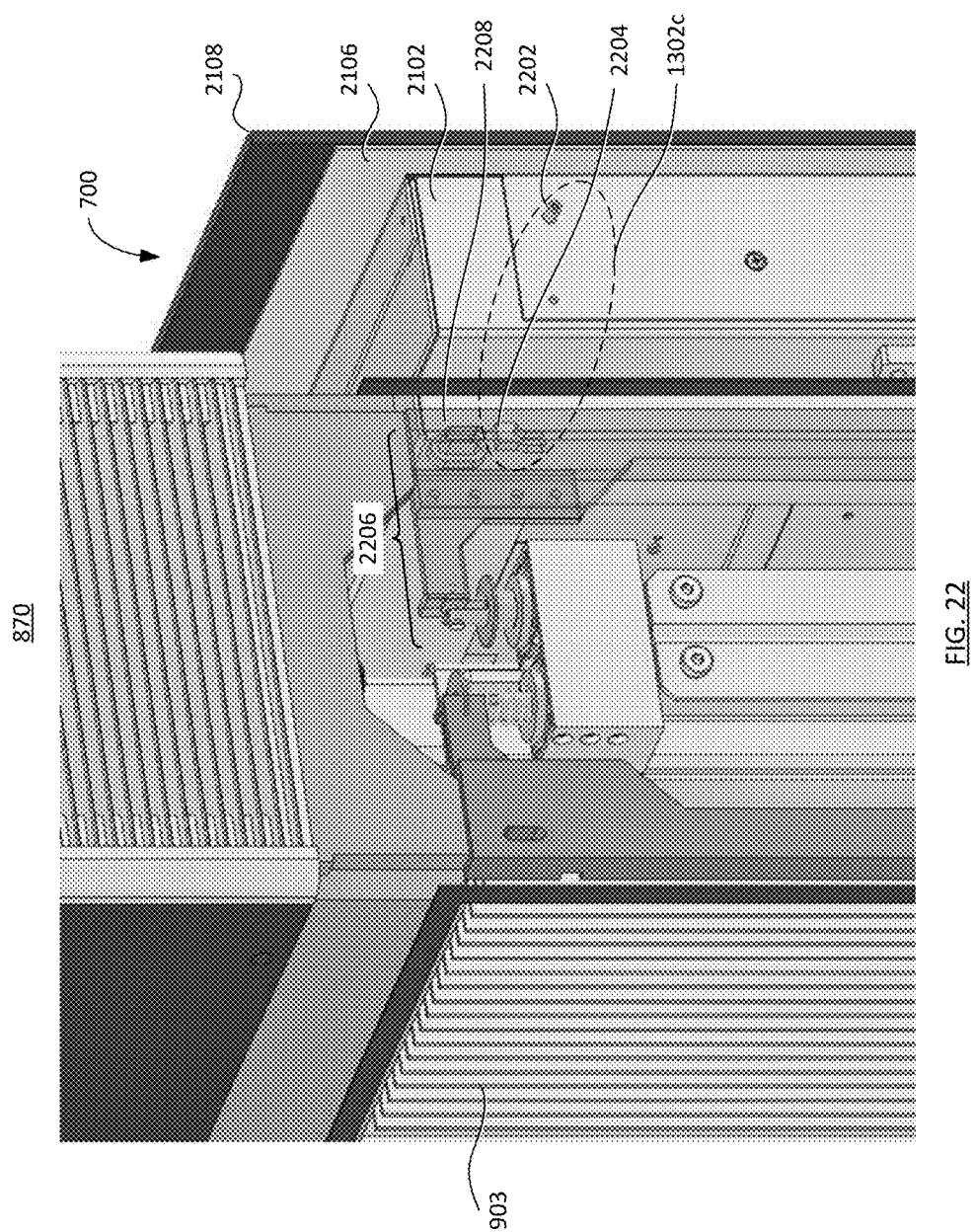

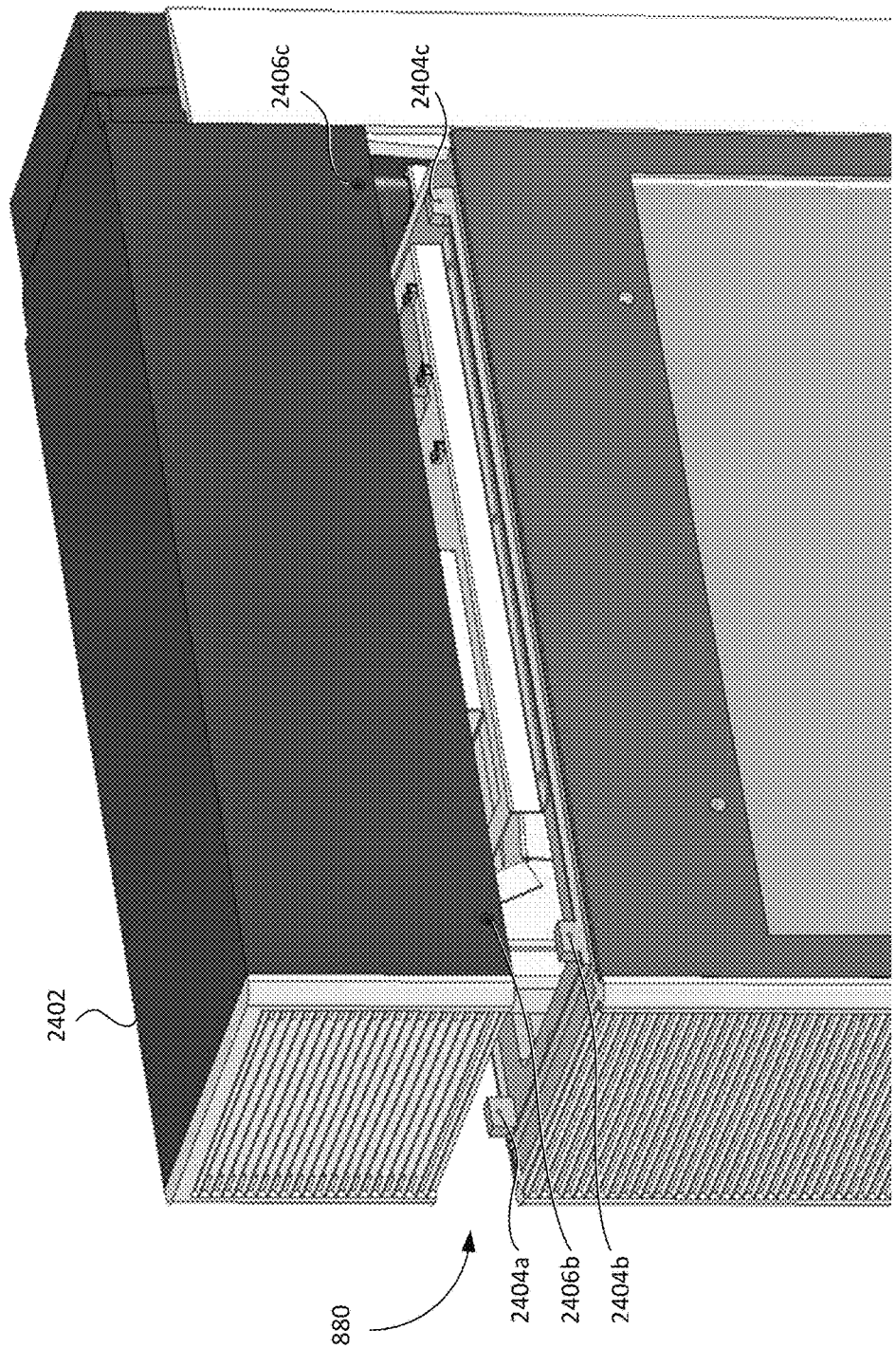

SYSTEMS AND TECHNIQUES FOR VANDALISM DETECTION IN A PERSONAL COMMUNICATION STRUCTURE (PCS)

CROSS REFERENCE TO RELATED APPLICATIONS

This application claims priority to and the benefit of, and incorporates herein by reference in its entirety, U.S. Provisional Patent Application Ser. No. 62/256,070, filed on Nov. 16, 2015.

FIELD OF INVENTION

The present disclosure relates generally to systems and techniques for vandalism detection in a personal communication structure (PCS). Some embodiments relate specifically to techniques and apparatus for compartmentalizing subsystems of a PCS and independently detecting vandalism of the individual compartments.

BACKGROUND

In some public or semi-public areas, various structures can be used for communication or to obtain access to goods and services. For example, telephone booths can be used to place telephone calls. Interactive kiosks can be used to obtain access to information, products, and/or services. Some interactive kiosks are self-service kiosks, which allow patrons of a business to perform service tasks that were historically performed by business employees. For example, the automated teller machine (ATM) is a self-service kiosk that allows users to deposit funds into a financial account, withdraw funds from an account, check an account balance, etc.—tasks that were historically performed with the assistance of a human bank teller. As another example, some retail stores allow customers to scan and pay for their items at self-service checkout kiosks rather than checkout stations staffed by human cashiers.

An interactive kiosk generally includes a computer terminal, which executes software and/or controls hardware peripherals to perform the kiosk's tasks. Many interactive kiosks are deployed inside buildings that are accessible to the public (e.g., banks, stores), in areas where the building operators can monitor the kiosks and protect them from unauthorized access. In some cases, interactive kiosks are integrated into walls of buildings (e.g., some ATMs are integrated into walls of banks), fastened to walls, or placed against walls, which can protect the kiosks from unauthorized access and reduce the occurrence of potentially dangerous events such as the kiosks tipping or overturning.

SUMMARY OF THE INVENTION

In recent years, public telephone booths have dwindled in number and many of the remaining booths have fallen into relative disuse and disrepair. The demise of the public telephone booth can be traced, in part, to the increasing prevalence of mobile phones and to the widespread use of communication networks for non-telephonic purposes. Many people who wish to participate in telephone conversations in public places prefer the convenience of their own mobile phones to the inconvenience of a stationary phone booth. Furthermore, in contrast to many mobile phones, conventional public telephone booths do not allow users to access Internet-based data and services. Many people who wish to access Internet-based data and services in public places use mobile computing devices (e.g., smartphones or laptop computers) and wireless networks (e.g., mobile broadband networks or Wi-Fi networks) to do so. In short, for many people, the public telephone booth is less convenient and less functional than other readily-available options for connecting to a communication network.

Despite the seeming ubiquity of mobile computing devices, many people are often left with insufficient access to telephonic or Internet-based services. In some areas, wireless network coverage may be poor or nonexistent. In areas where wireless networks are available, the number of network users or the volume of network traffic may exceed the capacity of the network, leaving some users unable to connect to the network, and degrading quality of service for users who are able to connect (e.g., degrading audio quality of phone calls or reducing rates of data communication). Even when wireless networks are available and not congested, some people may not have access to telephonic or Internet-based services because they may not have suitable computing devices or network-access agreements (e.g., a person may not own a computing device, may own a computing device but not have a network-access agreement with an Internet-service provider, may not own a mobile computing device, may have a mobile computing device with an uncharged battery, etc.).

There is a need for personal communication structures (PCSs) that enhance public access to communication networks. Such PCSs may enhance access to communication networks by expanding network coverage (e.g., making communication networks available in areas where they would otherwise be unavailable), expanding network capacity (e.g., increasing the capacity of communication networks in areas where such networks are available), expanding access to end-user computing devices and telephones, and/or expanding access to charging outlets for mobile computing devices. By enhancing access to communication networks, the PCSs may improve the employment prospects, educational opportunities, and/or quality of life for individuals, families, and communities that would otherwise have limited access to communication networks.

Public access to communication networks can be enhanced by placing PCSs in public locations, including sidewalks, parking facilities, mass transit stations, etc. From time to time, a PCS operated in a public location may be vandalized, or vandalism of a PCS may be attempted. According to an aspect of the present disclosure, a PCS may detect vandalism or attempted vandalism of the PCS. In some embodiments, the PCS may take action based on detecting the vandalism or attempted vandalism.

The interior portions of a PCS may be secured to protect the PCS's components from vandalism, theft, and damage (e.g., from unwanted handling or exposure to the ambient environment), protect people from safety hazards (e.g., electrical hazards), prevent unauthorized parties from accessing the PCS's components, etc.

Therefore, in a first aspect, a personal communication structure (PCS) includes one or more vandalism detection systems. Each vandalism detection system includes an accelerometer for detecting a series of forces applied to the PCS during a time period, determining if the detected forces are attributed to environmental effects, and if the detected forces are not attributed to environmental effects, issuing an alert indicating the PCS is being subject to an act of vandalism.

The determination of whether the detected forces are attributed to environmental effects may include determining the direction, magnitude, and/or frequency of the forces applied to the PCS. In some embodiments, the PCS may include a plurality (e.g., two, three or more) of independently accessible compartments at least partially enclosing respective subsystems of the PCS. The plurality of independently accessible compartments may include, for example, an electronics compartment at least partially enclosing a power distribution subsystem, a communications compartment at least partially enclosing a communications subsystem, and display compartments, each at least partially enclosing a respective display subsystem. In some versions of the PCS, the interior of each of the independently accessible compartments is accessible without accessing the interior of any other independently accessible compartment. One of the more vandalism detection systems may be in each or some subset of each of the compartments. The PCS may also include a user interface compartment at least partially enclosing a user interface subsystem, which may also contain a vandalism detection system.

In some cases, issuance of the alert may instructs the power distribution subsystem to interrupt power being provided to one or more subsystems of the PCS. Further, the vandalism detection systems may be powered by a backup power supply that is independent of a primary power supply for the PCS to allow for continued monitoring while more sensitive functions are turned off. The PCS may also include a communications system in electronic communication with the vandalism detection system for transmitting the alert, in some cases via wireless signals to a remote monitoring facility. In some embodiments, a second alert may be issued based at least in part on a subsequent determination if the detected forces are attributed to environmental effects.

In another aspect, the invention provides a method for detecting vandalism at a personal communications structure (PCS). The method includes detecting, using an accelerometer, one or more series of forces applied to the PCS during a time period, determining if the detected forces are attributed to environmental effects, and if not attributed to environmental effects, issuing an alert indicating the PCS is being subject to an act of vandalism. The alert may include an alert level and/or a location of the PCS. If the PCS does not receive an acknowledgment of the alert, a second alert may be transmitted. The alert may be transmitted to an address (e.g., a digital address) selected from a prioritized, preprogrammed list of addresses. After transmitting the alert, the PCS may transmit video (e.g., video captured by the PCS's camera(s)).

Determining whether the detected forces are attributed to environmental effects may include determining the direction, frequency, and/or magnitude of the forces applied to the PCS.

In some embodiments, the PCS may include a plurality (e.g., two, three or more) of independently accessible compartments at least partially enclosing respective subsystems of the PCS. The plurality of independently accessible compartments may include, for example, an electronics compartment at least partially enclosing a power distribution subsystem, a communications compartment at least partially enclosing a communications subsystem, and display compartments, each at least partially enclosing a respective display subsystem. In some versions of the PCS, the interior of each of the independently accessible compartments is accessible without accessing the interior of any other independently accessible compartment. One of the more vandalism detection systems may be in each or some subset of each of the compartments. The PCS may also include a user interface compartment at least partially enclosing a user interface subsystem, which may also contain a vandalism detection system.

In some cases, issuance of the alert may instructs the power distribution subsystem to interrupt power being provided to one or more subsystems of the PCS. Further, the vandalism detection systems may be powered by a backup power supply that is independent of a primary power supply for the PCS to allow for continued monitoring while more sensitive functions are turned off. The PCS may also include a communications system in electronic communication with the vandalism detection system for transmitting the alert, in some cases via wireless signals to a remote monitoring facility. In some embodiments, a second alert may be issued based at least in part on a subsequent determination if the detected forces are attributed to environmental effects.

In another aspect, the invention provides a method for detecting vandalism at a personal communications structure (PCS). The method includes detecting, using an accelerometer, one or more series of forces applied to the PCS during a time period, determining if the detected forces are attributed to environmental effects, and if not attributed to environmental effects, issuing an alert indicating the PCS is being subject to an act of vandalism.

Other aspects and advantages of the invention will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 12A and 12B show front perspective views of a PCS with ribbed panels, in accordance with some embodiments;

FIGS. 18A and 18B show respective front and exploded front perspective views of an air intake assembly, in accordance with some embodiments;

FIGS. 19A and 19B show respective front perspective and rear perspective views of a user interface device, in accordance with some embodiments;

FIG. 20 shows a perspective view of a display compartment, in accordance with some embodiments;

FIG. 21 shows an exploded perspective view of display module, in accordance with some embodiments;

FIG. 22 shows a perspective cut-away view of a compartment lock of a display compartment, in accordance with some embodiments;

FIG. 24 shows a perspective view of a communications compartment, in accordance with some embodiments;

DETAILED DESCRIPTION

Overview of a Personal Communication Structure (PCS)

Figure 1:
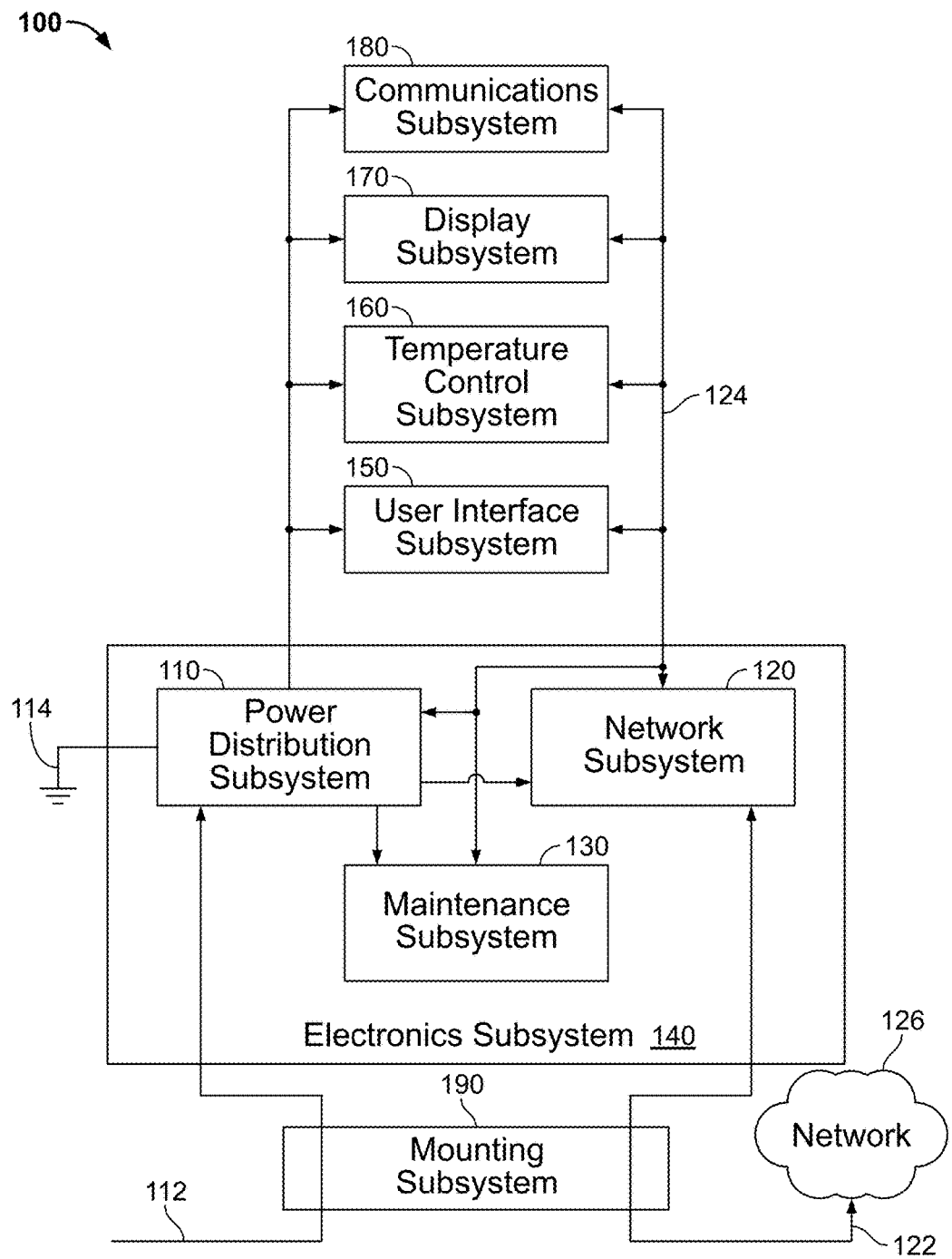
FIG. 1 is a block diagram of a personal communication structure (PCS), in accordance with some embodiments.

FIG. 1 illustrates a personal communication structure (PCS) 100, according to some embodiments. PCS 100 enhances access to communication networks in public or semi-public places. In some embodiments, PCS 100 includes an electronics subsystem 140, a user interface subsystem 150, a temperature control subsystem 160, a display subsystem 170, a communications subsystem 180, and/or a mounting subsystem 190. Electronics subsystem 140 may include a power distribution subsystem 110, a network subsystem 120, and/or a maintenance subsystem 130. These and other components of PCS 100 are described in further detail below.

Power distribution subsystem 110 distributes electrical power to components of PCS 100. Power distribution subsystem 100 may provide power to network subsystem 120, maintenance subsystem 130, other components of electronics subsystem 140, user interface subsystem 150, temperature control subsystem 160, display subsystem 170, and/or communications subsystem 180. Power distribution subsystem 110 may distribute power provided by any suitable power source(s) including, without limitation, batteries, solar panels, a power line 112 coupled to a power grid, etc. In some embodiments, power distribution subsystem 110 includes one or more power converters operable to convert power from one form (e.g., AC power) into another form (e.g., DC power) suitable for the PCS's components. In some embodiments, power distribution subsystem 110 includes one or more voltage level converters operable to change the voltage level of a signal to a level compatible with a component of the PCS. The ground terminal of the power distribution subsystem 110 may be coupled to a reference potential 114 via the chassis of the PCS or via any other suitable path.

Figure 2:
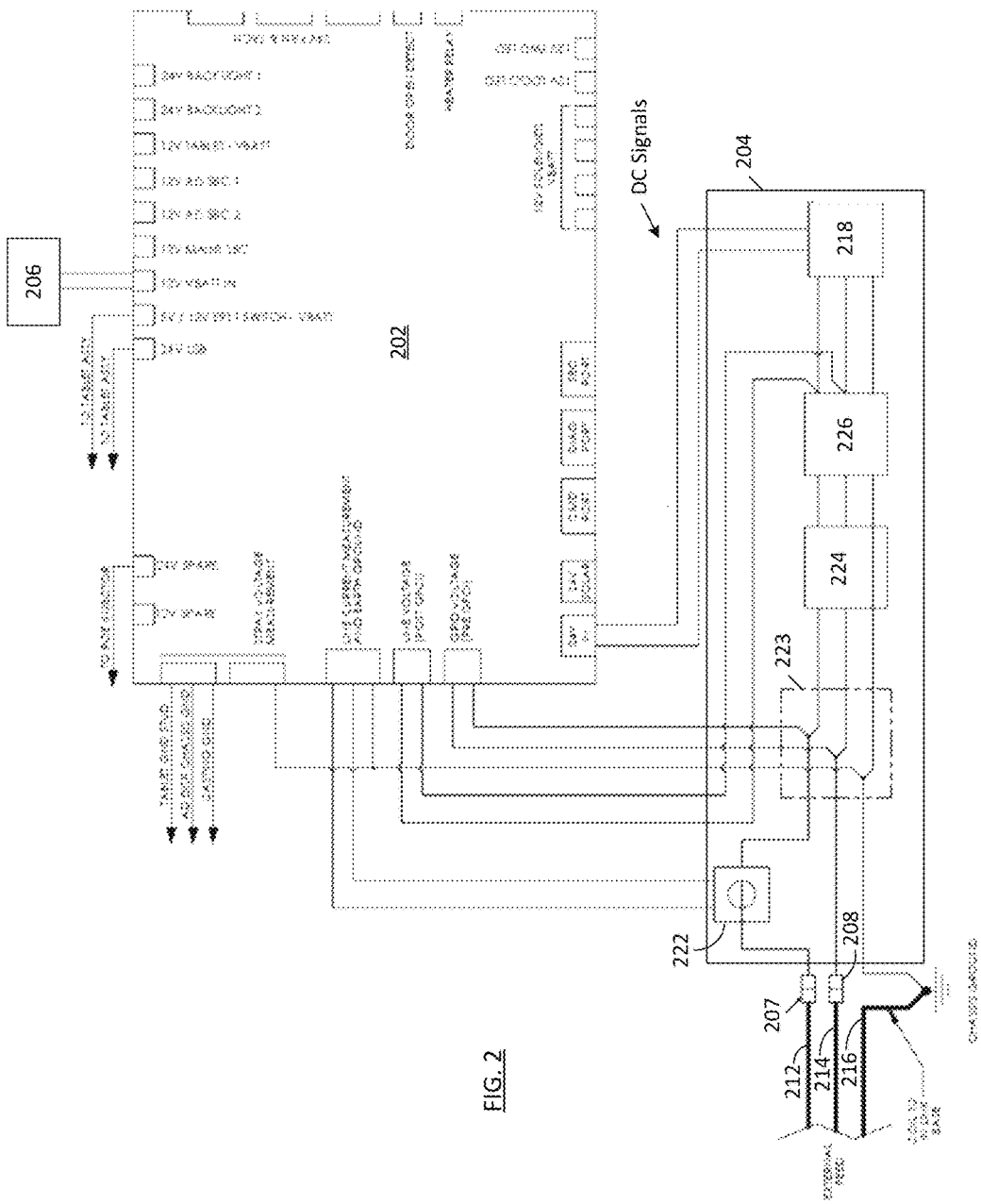
FIG. 2 is a schematic of a power distribution subsystem of a PCS, in accordance with some embodiments.

FIG. 2 shows a schematic of a power distribution subsystem 110, according to some embodiments. In some embodiments, power distribution subsystem (PDS) 110 includes a power conversion system 204, a power distribution board 202, and a battery 206. The inputs to power conversion system 204 include AC power supply signals (e.g., 120 VAC at 60 Hz) carried on a hot line 212, a neutral line 214, and a ground line 216. In some embodiments, the hot line 212 and neutral line 214 may be coupled to power conversion system 204 by quick disconnect devices 207 and 208, respectively, whereby the hot and neutral lines may be safely disconnected from power distribution subsystem 110 if the PCS is separated from its footing. Ground line 216 may be coupled to a ground terminal of the PCS 100. Power conversion system 204 processes the AC power supply signals and converts the processed signals into DC power supply signals. In some embodiments, power conversion system 204 includes a current transformer 222, AC power distribution unit 223, ground-fault circuit interrupter 224 (e.g., circuit breakers), AC line filter 226, and rectifier 218. Rectifier 218 may function as a DC power supply (e.g., a 24 V, 75 A, 2 kW DC power supply). As can be seen in FIG. 2, the outputs of various components of power conversion system 204 may be provided as inputs to power distribution board 202.

Power distribution board 202 may detect power system faults and distribute DC power signals to other components of the PCS. In some embodiments, power distribution board 202 uses the AC signals provided by power conversion system 204 to perform fault detection (e.g., ground fault detection, stray voltage detection, etc.). In some embodiments, power distribution board 202 uses the DC power supply signals provided by power conversion system 204 and/or battery 206 to produce DC power supply signals at various voltage levels (e.g., 5V, 12V, and 24V DC), and distributes those DC power supply signals to suitable components of the PCS 100.

In some embodiments, power distribution system DC power signals can be switched on and off. As those skilled in the art can appreciate, staggered activation of high-power devices (e.g., one or more components of display subsystem 170) reduces in-rush current demand on power supply 218. In some embodiments, the power distribution subsystem 110 is able to measure output current and can shut off power supply signals when the device reaches an over-current threshold. When a device causes over-current and "trips" the output, an error message may be sent to a maintenance center, indicating that the PCS requires servicing.

Battery 206 may provide backup power for components of PCS 100, including but not limited to user interface subsystem 150, which may implement emergency communication (e.g., E911) functionality. In some embodiments, power distribution board 202 may charge battery 206 (e.g., at 24 VDC) when power conversion system 204 is producing DC power and PCS 100 is not using all the available DC power. In some embodiments, a solar charging system may charge battery 206 during power outages or at other times.

In some embodiments, the power distribution subsystem 110 can detect whether the ground-fault circuit interrupter 224 has tripped. The ability to detect activation of the ground-fault circuit interrupter 224 can facilitate maintenance of the PCS. For example, while on back-up battery power, the PDS may determine whether AC power is lost (e.g., by sensing whether AC power supply signals are present) or the ground-fault circuit interrupter 224 has tripped. A suitable message can then be sent to the maintenance center, indicating, for example, whether the PCS requires service.

Returning to FIG. 1, network subsystem 120 controls communication on a network 124 within PCS 100, and communication between internal network 124 and a network 126 external to the PCS. In some embodiments, network subsystem 120 uses network 124 to communicate with power distribution system 110, maintenance subsystem 130, user interface subsystem 150, temperature control subsystem 160, display subsystem 170, and/or communications subsystem 180. The nodes of network 124 may be arranged in one or more suitable network topologies, including, without limitation, a bus (e.g., with network subsystem 120 as the bus controller), star network (e.g., with network subsystem 120 as the central hub), ring network, mesh network, tree network, point-to-point network, etc. Network 124 may be implemented using one or more suitable communication technologies, including, without limitation, Ethernet, DVI (Digital Visual Interface), HDMI (High-Definition Multimedia Interface), USB (Universal Serial Bus), SMB (System Management Bus), I2C (Inter-Integrated Circuit) bus, VGA (Video Graphics Array), SCSI (Small Computer System Interface), SPI (Serial Peripheral Interface) bus, LVDS (low-voltage differential signaling), etc.

Network subsystem 120 may send and receive any suitable data. For example, network subsystem 120 may control the operation of other components of PCS 100 by sending control data to the PCS's subsystems. Network subsystem 120 may forward commands received from a suitable source, including, without limitation, other PCS subsystems and/or network 126. As another example, network subsystem 120 may send operand data to components of PCS 100 for processing by those components (e.g., data to be displayed by display subsystem 170 or user interface subsystem 150, data to be transmitted by communications subsystem 180, etc.).

In some embodiments, network subsystem 120 communicates with network 126 via data link 122. Data link 122 may be implemented using a suitable communications line, including, without limitation, an Ethernet cable, coaxial cable, or optical fiber. In some embodiments, network subsystem 120 may include a signal conversion device adapted to convert the signals received on data link 122 from one form (e.g., optical signals) into another form (e.g., electrical signals).

Figure 3:
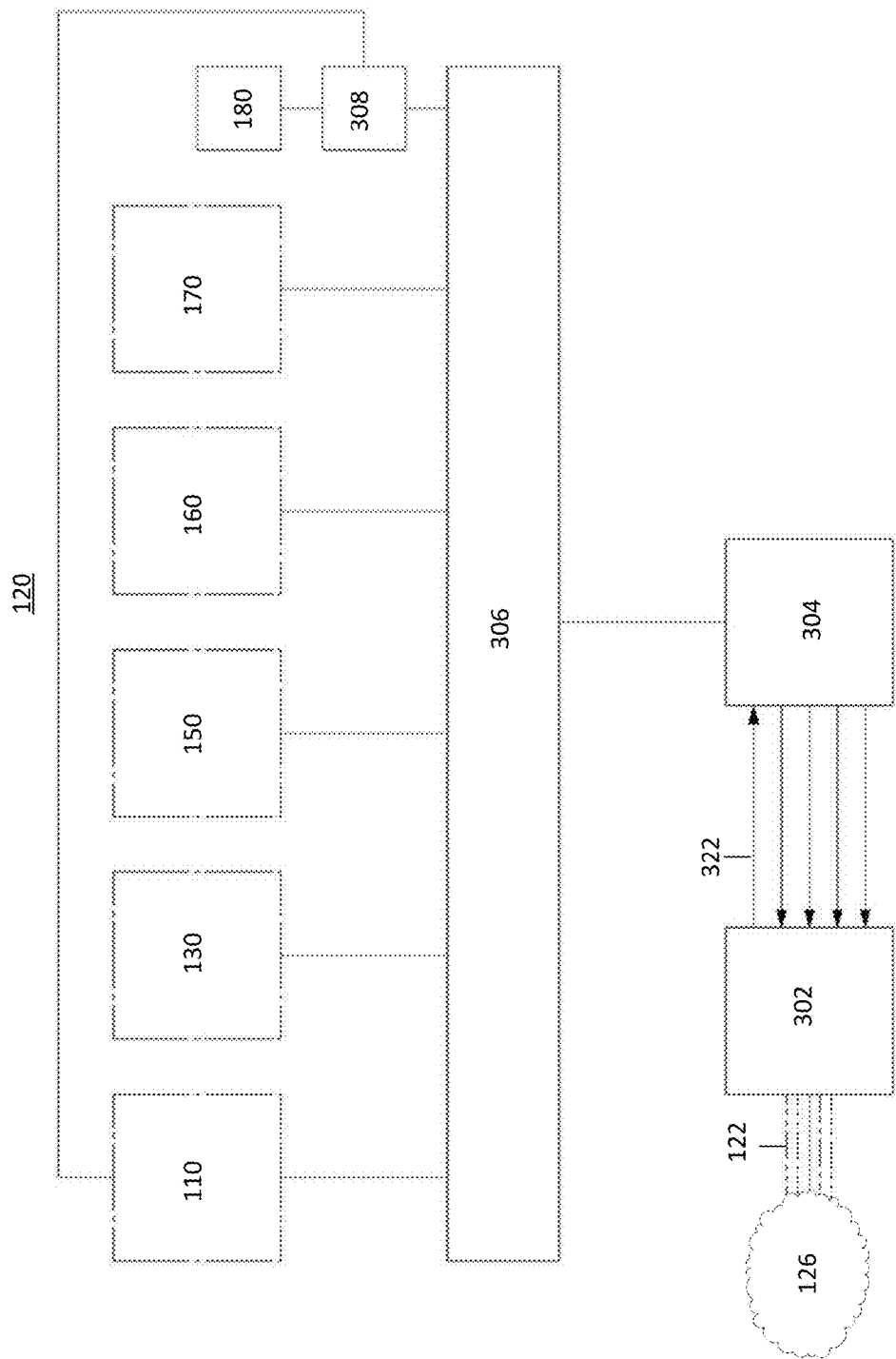
FIG. 3 is a schematic of a network subsystem of a PCS, in accordance with some embodiments.

FIG. 3 shows a schematic of a network subsystem 120, in accordance with some embodiments. In one embodiment, network subsystem 120 includes a fiber junction box 302, a service delivery switch 304, and a network switch 306. In the example of FIG. 3, data link 122 includes one or more optical fibers. Fiber junction box 302 may optically couple the optical fibers of data link 122 to one or more internal optical fibers 322. In some embodiments, fiber junction box 302 includes one or more quick disconnect devices, whereby the optical fibers of data link 122 may be protected from damage if PCS 100 is separated from its footing. Service delivery switch 304 may convert the optical signals received on optical fibers 322 into electrical signals representing network traffic (e.g., Ethernet packets), and provide that network traffic to network switch 306. Likewise, service delivery switch 304 may convert the network traffic (e.g., Ethernet packets) received from network switch 306 into optical signals, and provide those optical signals to fiber junction box 302. Network switch 306 may switch network traffic between PCS subsystems, or between a PCS subsystem and network 126. In some embodiments, network switch 306 is an Ethernet switch. Network switch 306 may be powered by power distribution subsystem 110.

In some embodiments, network subsystem 120 includes a power-over-Ethernet (POE) injector 308. The POE injector 308 may provide power to one or more PCS subsystems, including, without limitation, communications subsystem 180.

Returning to FIG. 1, maintenance subsystem 130 runs maintenance diagnostics on components of PCS 100. In some embodiments, maintenance subsystem 130 performs tests on the PCS's components and/or initiates self-tests of the PCS's components. Such tests may be performed periodically (e.g., daily, weekly, monthly, etc.), intermittently, randomly, or at other suitable times. Alternatively or in addition, components of PCS 100 may perform such tests in response to commands received via network subsystem 120 (e.g., commands issued by a PCS operator via network 126 or via communications subsystem 180), or in response to other suitable events.

Based on the results of such tests, maintenance subsystem 130 may determine whether a tested component is operating properly. If a tested component is not operating properly, maintenance subsystem 130 may output data describing the component's malfunction (e.g., transmit an error code to a PCS operator via network 126 or communications subsystem 180, display an error message via display subsystem 170 or user interface subsystem 150, etc.), take action to resolve the malfunction (e.g., reboot the malfunctioning component), turn off power to the faulty component or to the entire PCS (e.g., if the malfunction presents a safety hazard), etc.

In some embodiments, maintenance subsystem 130 may be adapted to control or adjust the operation of power distribution subsystem 110, for safety purposes or other suitable purposes. As described above, if a safety hazard is detected, maintenance subsystem 130 may control power distribution subsystem 110 to deactivate the PCS 100 or the unsafe component(s). Alternatively, maintenance subsystem 130 may control power distribution subsystem 110 to "power cycle" or "reboot" a malfunctioning component.

Figure 4:
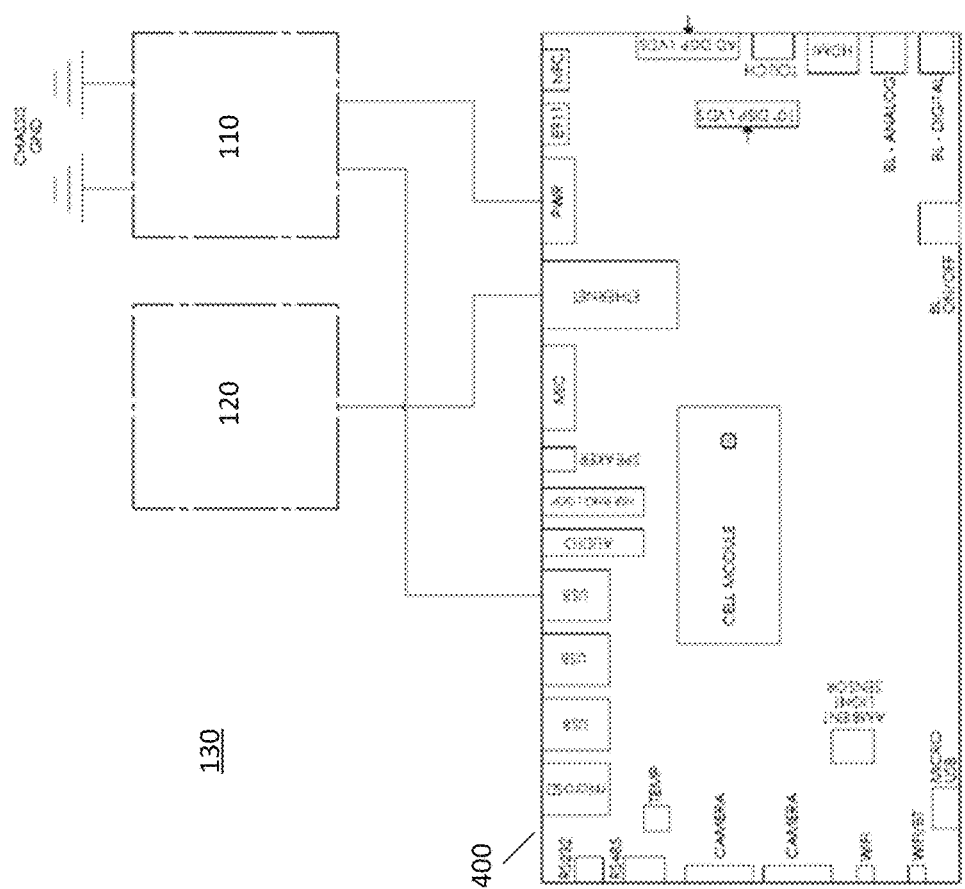
FIG. 4 is a schematic of a maintenance subsystem of a PCS, in accordance with some embodiments.

FIG. 4 shows a schematic of a maintenance subsystem 130, in accordance with some embodiments. In various embodiments, maintenance subsystem 130 includes one or more processing devices 400. The processing device(s) may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 400 may communicate with other components of PCS 100 via network subsystem 120 to perform maintenance tasks, or for other suitable purposes. In some embodiments, processing device(s) 400 are powered by power distribution subsystem 110.

Returning to FIG. 1, in addition to power distribution subsystem 110, network subsystem 120, and/or maintenance subsystem 130, electronics subsystem 140 may include other components. In some embodiments, electronics subsystem 140 includes one or more illumination controllers, which control illumination of one or more lights coupled to or proximate to the PCS. When lit, the lights controlled by the illumination controller may illuminate user interface subsystem 150 or other portions of PCS 100. In some embodiments, electronics subsystem 140 includes one or more sensor controllers, which control one or more sensor devices (e.g., microphones, cameras, ambient light sensors, pressure sensors, voltage sensors, environmental sensors, accelerometers, etc.). Such sensors may be used for any suitable purpose, including, without limitation, adjusting the brightness of displays and/or lights based on ambient lighting, surveilling the region proximate to the PCS (e.g., when an attempt to gain unauthorized access to the PCS is detected), etc.

Figure 5:
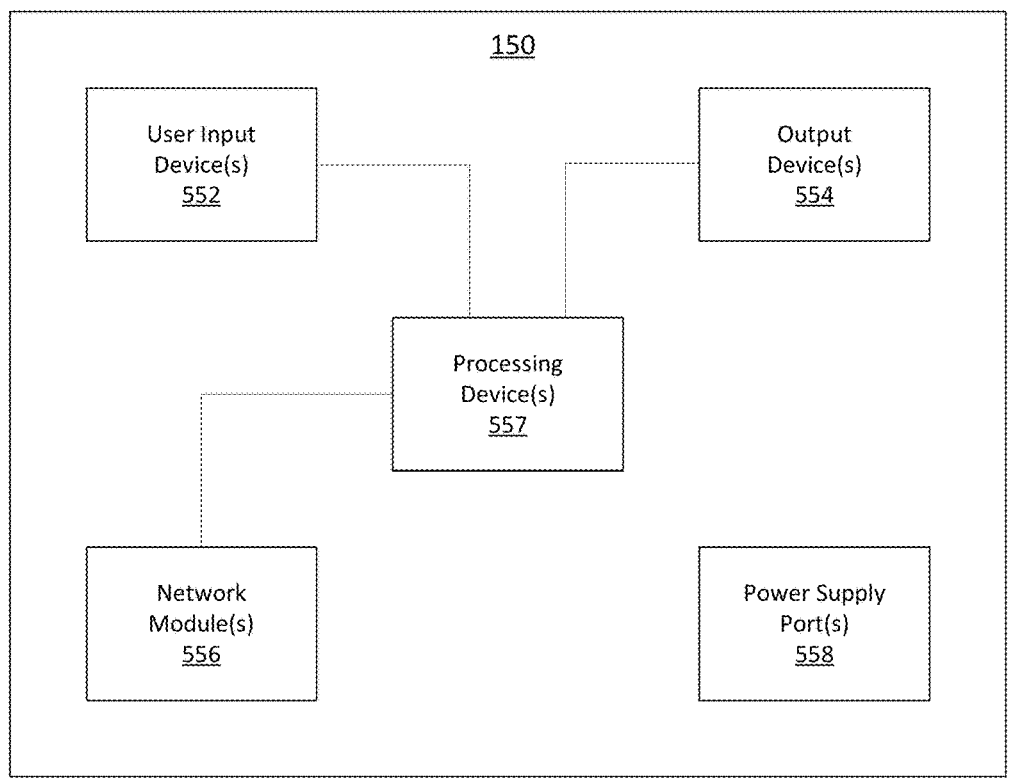
FIG. 5 is a block diagram of a user interface subsystem of a PCS, in accordance with some embodiments.

User interface subsystem 150 provides an interactive user interface, which may be used to access a communication network. Referring to FIG. 5, user interface subsystem 150 may include one or more user input devices 552, output devices 554, network modules 556 (e.g., network interface controllers, wireless transceivers, etc.), processing devices 557, and/or power supply ports 558. The user input device(s) 552 may include, without limitation, a touchscreen, touchpad, keyboard, keypad, trackball, one or more microphones, camera, buttons, switches, etc. The output device(s) 554 may include, without limitation, a display unit (e.g., touchscreen, LCD display, etc.), light(s), speaker(s), audio jack(s) (e.g., headset jacks, including microphone), etc. The one or more network modules 556 may include, without limitation, a 3G mobile network transceiver, 4G mobile network transceiver, LTE mobile network transceiver, Wi-Fi transceiver, RFID reader, Bluetooth transceiver, Near Field Communication (NFC) transceiver, Ethernet adapter, etc. In some embodiments, at least one of the network modules 556 may be configured to access network 126 via network subsystem 120 or to access a communication network via communications subsystem 180. The one or more processing devices may include, without limitation, a microprocessor, microcontroller, small board computer, or system on a chip (SoC) (e.g., Qualcomm Snapdragon, Nvidia Tegra, Intel Atom, Samsung Exynos, Apple A7, Motorola X8, etc.). The one or more power supply ports 558 may include, without limitation, one or more USB charging ports, a two-prong or three-prong AC power outlet (e.g., providing current limited AC power at 120 V, 60 Hz), etc.

User interface subsystem 150 may enhance users' access to communication networks in several ways. In some embodiments, user interface subsystem 150 may provide users access to communication networks (e.g., the Internet) via network module(s) 556. For example, a user may provide inputs via user input device(s) 552 to control a web browser or other network-based application executing on processing device(s) 557, which may access a communication network via network module(s) 556. The data obtained from the communication network may be processed by processing device(s) 557 and provided to the user via output device(s) 554. As another example, a user may connect a computing device (e.g., a mobile computing device) to user interface subsystem 150 via a network module 556 (e.g., a Wi-Fi access point), and access a communication network via another network module 556 (e.g., a mobile network transceiver), via communications subsystem 180, or via network 126. As yet another example, users may charge mobile computing devices via power supply port(s) 558, and access communication networks through the charged devices.

In some embodiments, PCS 100 includes an assisted listening unit that transmits the PCS's audio outputs to hearing assistance devices (e.g., hearing aids, Cochlear implants, etc.) within the assisted listening unit's range via a "hearing loop" (e.g., an "audio induction loop" or "audio-frequency induction loop"). The assisted listening unit may include a loop coil and a loop amplifier adapted to drive amplified signals into the loop coil, thereby creating a magnetic field that delivers the amplified signals to hearing assistance devices within the unit's range. The loop coil may be included in or located proximate to user interface subsystem 150, or disposed at another suitable location in, on, or near PCS 100.

In some embodiments, user interface subsystem 150 includes an interface for adjusting the assisted listening unit (e.g., for increasing or decreasing the signal strength or range of the assisted listening unit). The assisted listening unit's interface may include, without limitation, one or more buttons, dials, switches, and/or software-based interfaces. By adjusting the assisted listening unit, a user may control the range of the assisted listening unit and/or the volume of the audio output provided by the assisted listening unit.

In some embodiments, user interface subsystem 150 includes interface components for placing a phone call. User interface subsystem may implement the phone calls using voice-over-IP (VOIP) technology. The user's speech may be captured via the user interface subsystem's microphone, and the speech of other parties to the phone call may be provided via the user interface subsystem's speaker(s). In some embodiments, the user interface subsystem 150 permits users to place phone calls to emergency responders (e.g., E911 calls). The E911 calls may be placed using VOIP technology (e.g., via a network module 556 of user interface 150, via communications subsystem 180, or via network 126) or another suitable technology.

In some embodiments, the user input devices 552 include a microphone system, and the processing device 557 is able to perform noise cancellation on the microphone system. It can be appreciated that the PCS may be located in an environment with high levels of ambient street noise. The processing device 557 may perform a noise cancelling process that distinguishes the user's speech from the background noise and removes at least some of the background noise from the audio stream. When a user plugs in a headset that contains a microphone, the noise cancellation technique may also detect and remove background noise picked up by the headset's microphone.

Figure 6:
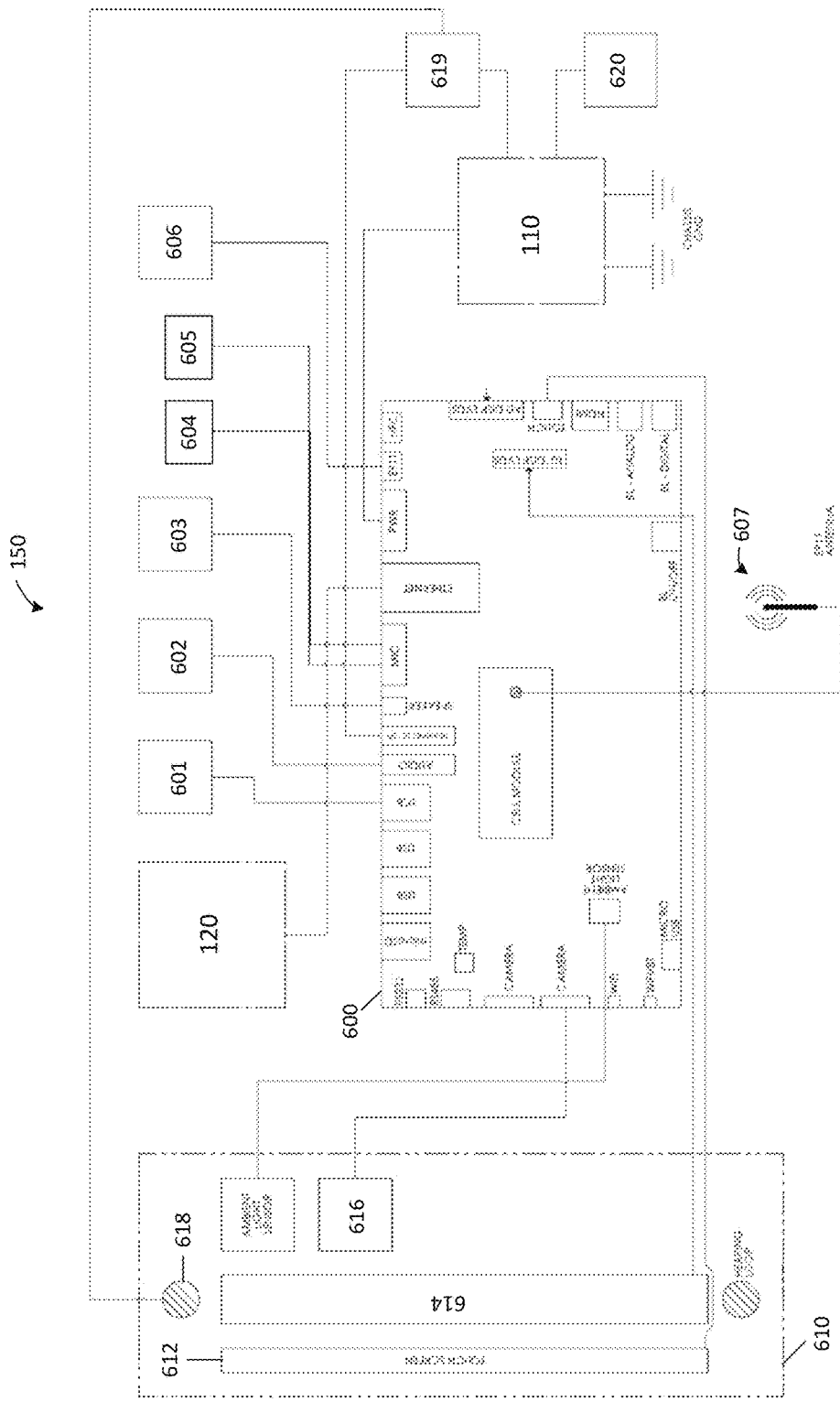
FIG. 6 is a schematic of a user interface subsystem of a PCS, in accordance with some embodiments.

FIG. 6 shows an exemplary schematic of the user interface subsystem 150, in accordance with some embodiments. In some embodiments, user interface subsystem 150 includes one or more processing devices 600. The processing device(s) 600 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 600 may communicate with other components of PCS 100 via network subsystem 120. In some embodiments, processing device(s) 600 are powered by power distribution subsystem 110.

In the example of FIG. 6, user interface subsystem 150 includes a keypad 601, headset jack 602, speaker 603, two microphones (604, 605), and an E911 button 606, all of which are coupled to the processing device(s) 600. Processing device(s) 600 may be adapted to initiate an E911 communication when E911 button 606 is pressed, and to send and receive E911 messages via a wireless communication module 607 (e.g., a 3G, 4G, or LTE mobile network transceiver, including a suitable antenna, which may be located proximate to the top of the PCS).

In some embodiments, the E911 button contains an indicator. One example of the indicator is an illumination ring. The illumination ring may help a user to locate the button at night, and/or may flash when a user presses the button to indicate a E911 call is in progress.

In the example of FIG. 6, user interface subsystem 150 includes a touchscreen 612, display 614, camera 616, hearing loop coil 618, hearing loop amplifier 619, and USB charging port(s) 620. In some embodiments, the touchscreen 612, display 614, camera 616, and hearing loop coil 618 may be packaged together in a tablet computing device 610. The USB charging port(s) 620 and hearing loop amplifier 619 may be powered by power distribution subsystem 110.

Returning to FIG. 1, temperature control subsystem 160 controls the temperature within PCS 100. For example, temperature control subsystem 160 may cool the components of PCS 100. Some of the PCS's components generate heat and the PCS 100 may absorb heat from its environment (e.g., via radiation or convection), particularly when the ambient temperature is high or the PCS is exposed to direct sunlight. Extreme heat can interfere with the operation of the PCS or even permanently damage some of the PCS's components.

Alternatively or in addition, temperature control system 160 may, under appropriate conditions, heat the components of PCS 100. Some PCSs may be located in cold environments (e.g., outdoors in regions with cold ambient temperatures). Like extreme heat, extreme cold can interfere with the PCS's operation or damage its components.

Temperature control subsystem 160 may include one or more components suitable for heating and/or cooling the PCS. In some embodiments, temperature control subsystem 160 includes one or more fans operable to circulate ambient air through the PCS, which can cool the PCS. In some embodiments, the PCS 100 includes one or more heat sinks, and the ambient air circulated by temperature control subsystem 160 passes proximate to the heat sink(s). In some embodiments, temperature control subsystem 160 includes one or more fans operable to recirculate air in portions (e.g., airtight compartments) of PCS 100, which can facilitate the transfer of heat from those portions of the PCS to other regions of the PCS and/or to the ambient environment. The fans may be single-speed fans or variable-speed fans. In some embodiments, temperature control subsystem 160 includes one or more heaters, which can heat the PCS. In some embodiments, one or more fans and/or heaters are located apart from temperature control subsystem 160, but controlled by the temperature control subsystem.

Temperature control subsystem 160 may control the PCS's temperature by controlling the operation of the fan(s) and/or heater(s). In some embodiments, temperature control subsystem 160 controls the PCS's temperature based, at least in part, on the temperature inside or in an area proximate to the PCS. Temperature control subsystem 160 may obtain temperature information regarding the temperature in or near PCS 100 from one or more temperature sensors. The temperature sensors may be located inside the PCS, on an outer surface of the PCS, proximate to the PCS, and/or in any other suitable location. Temperature control subsystem 160 may include one or more sensor drivers that can activate the sensor(s) and obtain temperature measurements from the sensor(s). Alternatively or in addition, temperature control subsystem may obtain temperature information regarding the temperature in the vicinity of the PCS from a suitable source (e.g., a website) via a communication network (e.g., network 126).

In some embodiments, the temperature control system 160 adds or removes active fans (e.g. switches fans on or off) in specific areas of the PCS based on the temperature sensor information. For example, active fans may be added when the ambient temperature is high (e.g., above a threshold). Conversely, active fans may be removed when the ambient temperature is low (e.g., below a threshold) to reduce power usage. The fans may be organized in addressable groups to facilitate addition and removal of active fans.

In some embodiments, the temperature control subsystem 160 uses a feedback-based control system (e.g., a feedback loop) to control the speeds of the fans. The fans may include tachometers, and the tachometer outputs may be fed back to the temperature control subsystem, which may use the tachometer outputs to determine the speeds of the fans. In addition to adding and removing active fans, the temperature control subsystem 160 may increase the speeds of the fans as the internal temperature increases or decrease the speeds of the fans as the temperature decreases.

In some embodiments, the temperature control subsystem 160 uses the fan tachometer output to determine whether a fan fault has occurred. For example, the temperature control subsystem 160 may detect a fan fault when the tachometer output indicates that there is little or no fan rotation (e.g., the rate of fan rotation is below a threshold). When a fan fault is detected, the PCS may notify the maintenance center of the fault, so the PCS can be serviced to replace or repair the faulty fan.

In some embodiments, temperature control subsystem 160 controls the PCS's temperature based on environmental information, which may include temperature information and/or other information associated with the PCS's environment. For example, environmental information may include sunlight information indicating whether the PCS is exposed to direct sunlight. Sunlight information may be obtained from a camera or other suitable optical sensor. Alternatively or in addition, environmental information may include humidity information indicating the humidity levels in the PCS's environment, time-of-day information indicating the current time at the PCS's location, weather information indicating the weather in the PCS's environment, etc.

Based on the environmental information, temperature control subsystem 160 may control the fan(s) and/or heater(s) to adjust the PCS's temperature. In some embodiments, temperature control subsystem 160 may activate one or more heaters when the PCS's temperature is below a lower threshold temperature, and/or activate one or more fans when the PCS's temperature is above an upper threshold temperature. In some embodiments, the number of heater units and/or fans activated by temperature control subsystem 160 is determined based on the environmental information. In some embodiments, the settings of the activated heaters and/or fans (e.g., the fan speeds, the heater temperatures, etc.) may be determined based on the environmental information. In some embodiments, if the temperature in the PCS is determined to be outside a safe operating range, temperature control subsystem may instruct power distribution subsystem 110 to deactivate the PCS or at least one component thereof.

Display subsystem 170 includes one or more display modules, each of which includes at least one display device. The display device may include, without limitation, a liquid crystal display (LCD), light-emitting diode (LED) display, organic light-emitting diode (OLED) display, cathode ray tube (CRT), electroluminescent display (ELD), electronic paper/electronic ink display (e.g., a bi-stable or multi-stable electrophoretic or electro-wetting display), plasma display, thin-film transistor (TFT) display, 3D display (e.g., volumetric display, holographic display, integral imaging display, compressive light field display, etc.), stereoscopic display, etc. In some embodiments, display subsystem 170 includes two display modules disposed on opposite sides of the PCS, such that the modules' display devices face in opposite directions.

A display device may display suitable information, including, without limitation, news information, weather information, emergency information (e.g., instructions for dealing with an emergency, evacuation routes, etc.), travel information (e.g., traffic conditions, road conditions, speed limits, alternative route information, public transit schedules, locations of and/or directions to public transportation facilities, etc.), tourism information (e.g., locations of and/or directions to popular tourist attractions), advertisements, etc. The displayed information may be displayed in one or more suitable formats, including, without limitation, text, still images, and/or video. Display subsystem 170 may include one or more processing devices adapted to control the display of information by the display device(s). For example, each display module may include a processing device adapted to control the display module's display device.

In some embodiments, display subsystem 170 includes one or more cameras. For example, each display module may include one or more cameras. Display subsystem 170 may use the cameras to determine the ambient light levels, and may adjust the brightness of the display device(s) accordingly. For example, if the ambient light level at the PCS is high (e.g., because the sun is shining on the PCS), display subsystem 170 may increase the brightness of the display(s) (e.g., by increasing the brightness of the display backlight(s)), so that the displayed information is readily viewable by onlookers or passers-by. On the other hand, if the ambient light level at the PCS is low, display subsystem 170 may decrease the brightness of the display(s), to reduce the display subsystem's power usage and/or heat generation. In some embodiments, the brightness levels of the PCS's displays may be controlled independently.

Alternatively or in addition, display subsystem 170 may use the cameras to obtain information about "potential viewers" (e.g., people viewing the PCS, viewing a display device of the PCS, using the PCS, and/or in the vicinity of the PCS). In some embodiments, display subsystem 170 may determine, based on images of the area proximate to the PCS (e.g., images acquired by the PCS's camera(s)), a potential viewer's apparent demographic information, including, without limitation, age, sex, race/ethnicity, etc. In some embodiments, display subsystem 170 may use facial-recognition techniques to determine a potential viewer's identity.

Display subsystem 170 may use information about the PCS's potential viewers to select the information to be displayed by the display device(s) (e.g., to select advertisements for display based on the identities or demographics of the potential viewers). Alternatively or in addition, display subsystem 170 may track the identities and/or demographics of the potential viewers who have been in the vicinity of the PCS when particular advertisements have been displayed. Tracking information about potential viewers of advertisements and/or controlling the display of advertisements based on information about the potential viewers may increase the value of the PCS's advertising impressions to potential advertisers.

Display subsystem 170 may obtain information about a potential viewer from the potential viewer, from analysis of images of the potential viewer, and/or from the potential viewer's computing device (e.g., smartphone). For example, a potential viewer who connects to a communication network through a PCS 100 (e.g., via user interface subsystem 150 or via the user's computing device) may provide authentication data (e.g., a username, password, and/or other credentials), and the PCS may use that authentication data to access the potential viewer's account information, which may identify the potential viewer and/or provide information about the potential viewer (e.g., the potential viewer's attributes and/or interests). The potential viewer may have provided such information when registering for access to the PCS (or set of PCSs), or the PCS may have inferred such information based on the potential viewer's activities on the communication network.

Even if potential viewers do not register for PCS access, information about a potential viewer's attributes and/or interests can still be inferred based on the potential viewer's activities, and this information can be tracked in connection with information identifying the potential viewer's computing device (e.g., a mobile device's phone number, mobile equipment identifier (MEID), or unique device identifier (UDID); a computing device's media access control (MAC) address; etc.). In some embodiments, a PCS 100 may identify a potential viewer or attributes thereof based on identifying information transmitted by the potential viewer's computing device when the computing device is within range of the PCS, even if the computing device is not connected to a network via the PCS 100.

Figure 7:
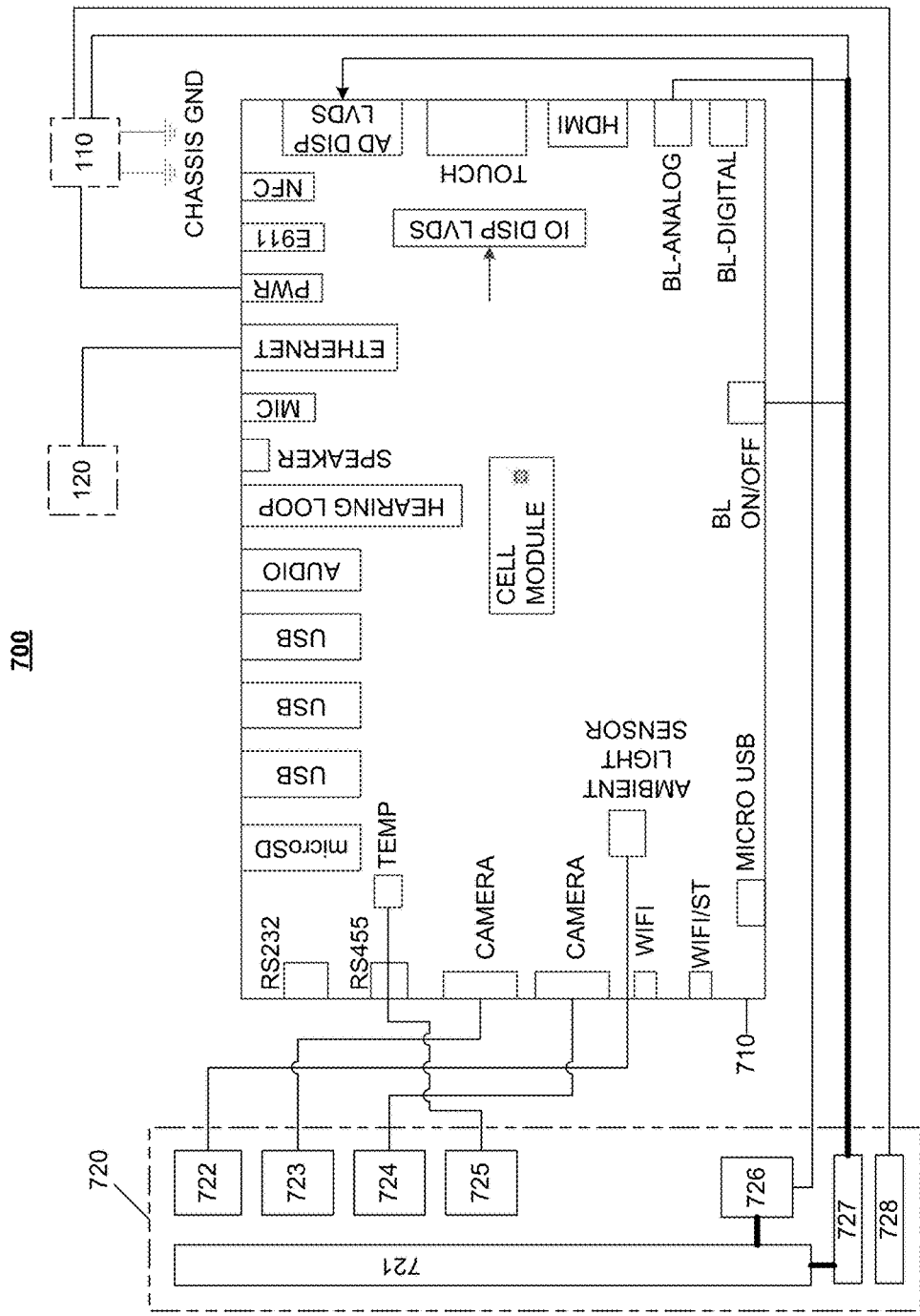
FIG. 7 is a schematic of a display module of a PCS, in accordance with some embodiments.

FIG. 7 is a schematic of a display module 700, in accordance with some embodiments. In some embodiments, a PCS 100 includes two display modules 700. In some embodiments, a display module 700 includes one or more processing device(s) 710. Each processing device 710 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 710 may communicate with other components of PCS 100 via network subsystem 120. In some embodiments, each processing device 710 is powered by power distribution subsystem 110. In the example of FIG. 7, display module 700 also includes a display device 720. Display device 720 may include a display panel 721, ambient light sensor 722, two cameras (723, 724), temperature sensor 725, frame rate controller 726, power/backlight controller 727, and one or more fans 728.

In some embodiments, the processing device 710 is able to read the ambient light sensor 722 and send a control signal to the power/backlight controller 727. One example of the control signal is a pulse width modulated (PWM) output. In response to the ambient light sensor 722 detecting the presence of high ambient light, the duty cycle of the PWM signal may be increased, thereby causing the power/backlight controller to increase the backlight brightness, so that the display image is viewable in bright sunlight. Those skilled in the art can appreciate that the PWM control signal may be digital or converted to an analog output via a digital to analog converter.

Returning to FIG. 1, communications subsystem 180 includes one or more communication modules. In some embodiments, the communication module(s) include one or more radio access nodes. The radio access node(s) may include small cells (e.g., low-power radio access nodes with ranges between roughly 10 m and 1-2 km, including, but not limited to, femtocells, picocells, and microcells), macrocells (e.g., radio access nodes with ranges of up to a few tens of kilometers), etc. The radio access node(s) may reduce congestion in mobile data networks (e.g., 3G, 4G, or LTE networks) by expanding network capacity and offloading traffic from more congested portions of the network to the portions of the network associated with the radio access node(s). In areas where mobile data networks are highly congested (e.g., portions of New York City, and particularly portions of Manhattan), deploying PCSs with radio access node(s) in an area where mobile data networks are congested may, in some embodiments, greatly reduce network congestion and improve quality of service for many network users.

In some embodiments, communications subsystem 180 includes at least one wireless access point. Computing devices may connect to the wireless access point using a suitable wireless adapter, including, without limitation, a Wi-Fi or WiMAX adapter. Through the wireless access point, communications subsystem 180 may provide access to a local area network (LAN) or wide area network (WAN) (e.g., network 126, or a 3G, 4G, or LTE network accessed via the communications subsystem's radio access node(s)). PCS operators may use the wireless access points to provide wireless broadband network access to individuals, subscribers, communities, etc. Use of the wireless access points may further improve the quality of service on mobile data networks by offloading some users from the mobile data networks to the wireless access point.

Returning to FIG. 1, mounting subsystem 190 includes a mounting device that releasably secures the PCS to a support (e.g., a footing). The mounting device may be adapted to break when a shear force above a predetermined value is applied to the mounting device, thereby allowing the PCS to move. Such releasable mounting can reduce the damage caused to people and property when an automobile collides with the PCS.

Figure 8:
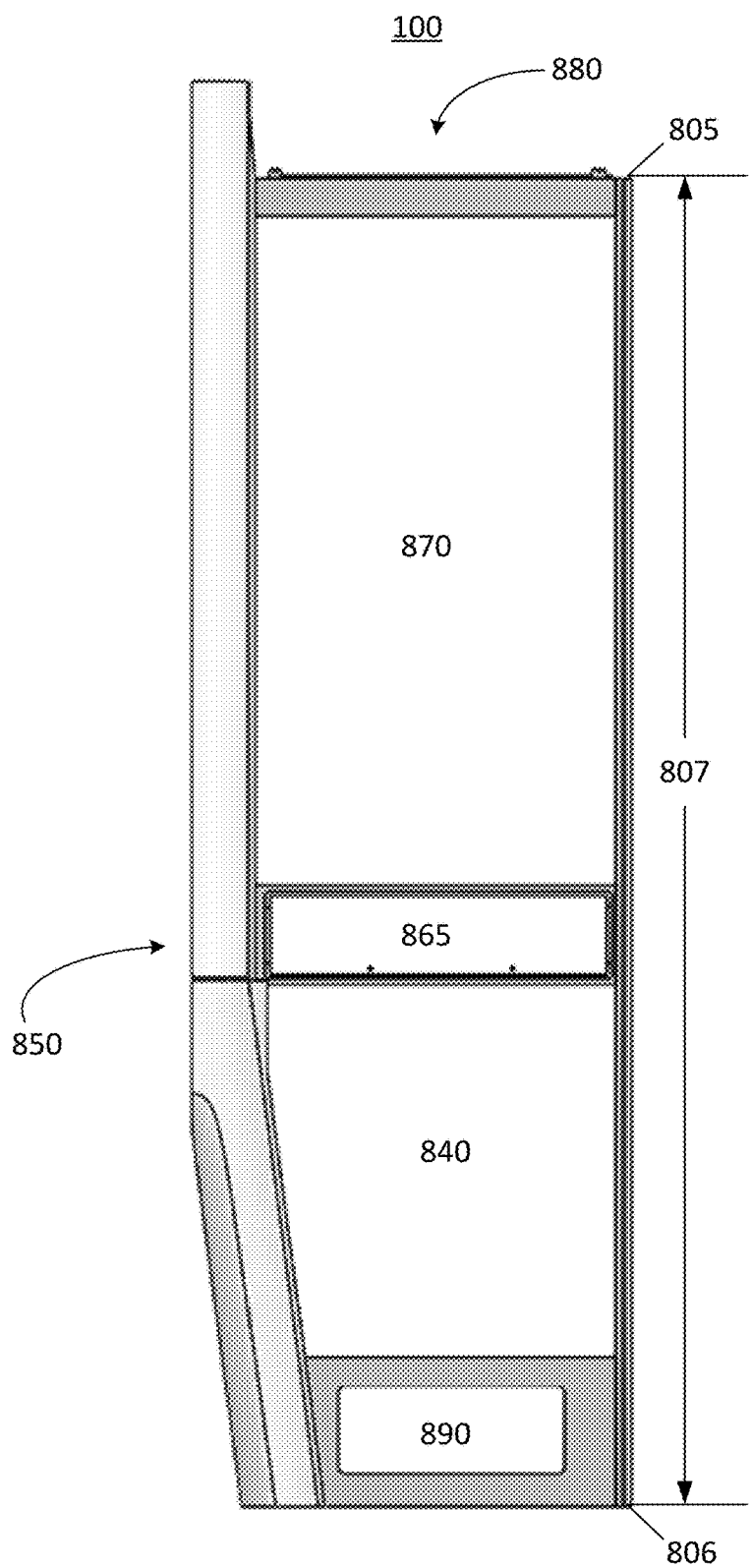
FIG. 8 illustrates an arrangement of compartments of a PCS, in accordance with some embodiments.

PCS 100 may include compartments and components of PCS 100 may be disposed in the compartments. FIG. 8 illustrates an arrangement of compartments of a PCS 100, according to some embodiments. For convenience, the PCS's top portion 805 and base portion 806 are identified in FIG. 8, as is the PCS's height 807.

In the example of FIG. 8, PCS 100 includes mounting compartment 890, electronics compartment 840, user interface compartment 850, air intake compartment 865, display compartment 870, and communications compartment 880. Electronics compartment 840 may enclose electronics subsystem 140. User interface compartment 850, display compartment 870, and communications compartment 880 may enclose user interface subsystem 150, display subsystem 170, and communications subsystem 180, respectively. In some embodiments, display compartment 870 may enclose, in addition to display subsystem 870, one or more heat sinks. Mounting compartment 890 may enclose at least a portion of a mounting subsystem 190.

Air intake compartment 865 may enclose at least portions of temperature control subsystem 160. In some embodiments, air intake compartment 865 may enclose one or more fans, which may draw ambient air into the air intake area. In some embodiments, the one or more fans may also draw air into the air intake area from electronics compartment 840. The fans may move the air through display compartment 870 (e.g., across one or more heat sinks), and the air may be discharged through an exhaust in communications compartment 880. In some embodiments, air intake compartment 865 may enclose one or more heaters.

In the example of FIG. 8, communications compartment 880 is located proximate to the top 805 of the PCS, display compartment 870 is disposed along an upper portion of the PCS and below communications compartment 880, and an air intake compartment 865 is located proximate to a middle portion of the PCS (in the direction of the PCS's height) and below display compartment 870. Mounting compartment 890 is located proximate a base 806 of the PCS, electronics compartment 840 is disposed along a lower portion of the PCS between mounting compartment 890 and air intake compartment 865, and user interface compartment 850 is disposed along a lower portion of the PCS adjacent to air intake compartment 865 and electronics compartment 840.

Embodiments of a PCS are not limited by the compartmentalization scheme illustrated in FIG. 8. A PCS may include none of the compartments illustrated in FIG. 8, any combination of the compartments illustrated in FIG. 8, and/or other compartments not illustrated in FIG. 8. In cases where a PCS includes a compartment illustrated in FIG. 8 (e.g., mounting compartment 890, electronics compartment 840, user interface compartment 850, air intake compartment 865, display compartment 870, or communications compartment 880), the location and/or shape of that compartment may differ from the location and/or shape of the corresponding compartment in FIG. 8. In some embodiments, a PCS may include a compartment that encloses two or more PCS subsystems that are enclosed by different compartments in the example of FIG. 8. In some embodiments, a PCS may include separate compartments enclosing respective portions of a PCS subsystem that is enclosed by a single compartment in the example of FIG. 8. In some embodiments, a PCS may include a compartment that encloses other compartments.

Figure 9A:
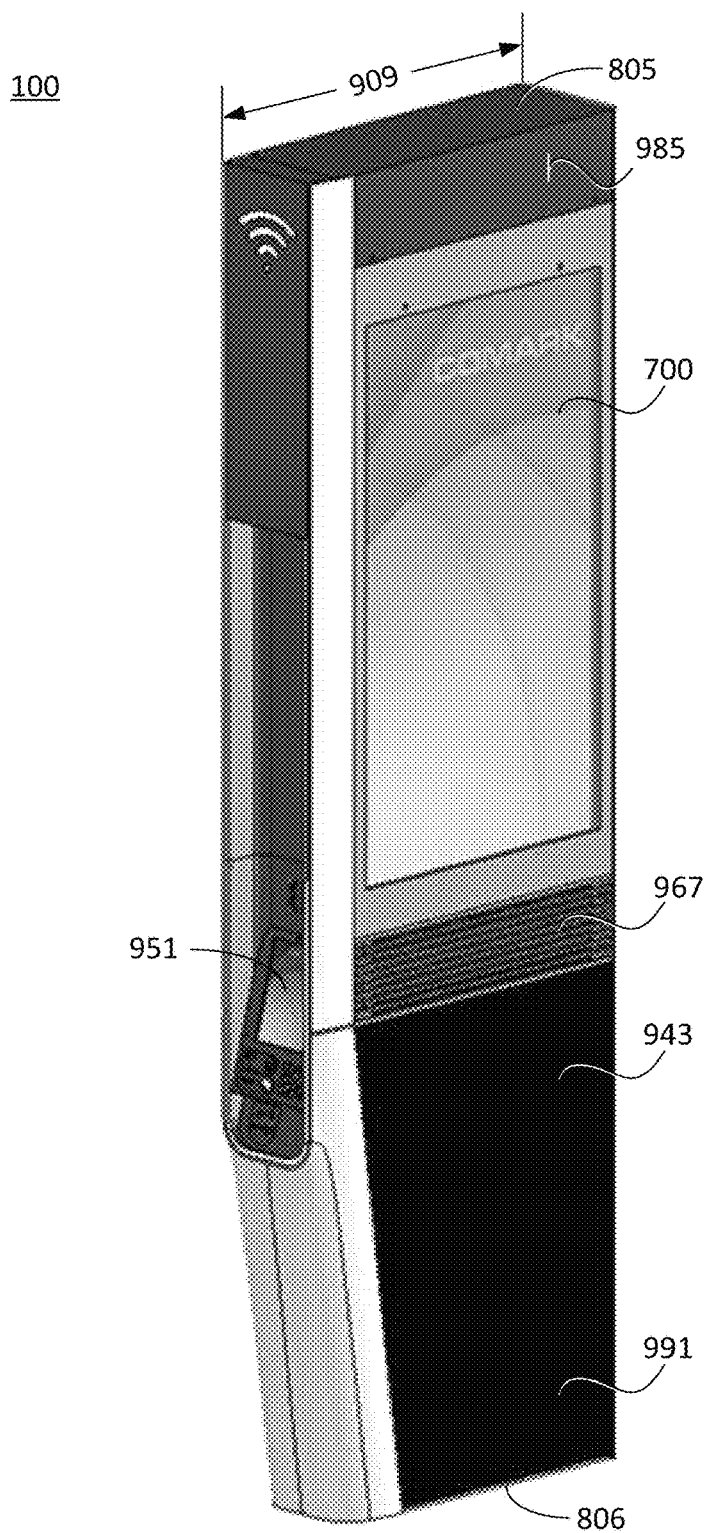
FIGS. 9A, 9B, and 9C show respective front perspective, side, and exploded front perspective views of a PCS, in accordance with some embodiments.
Figure 9B:
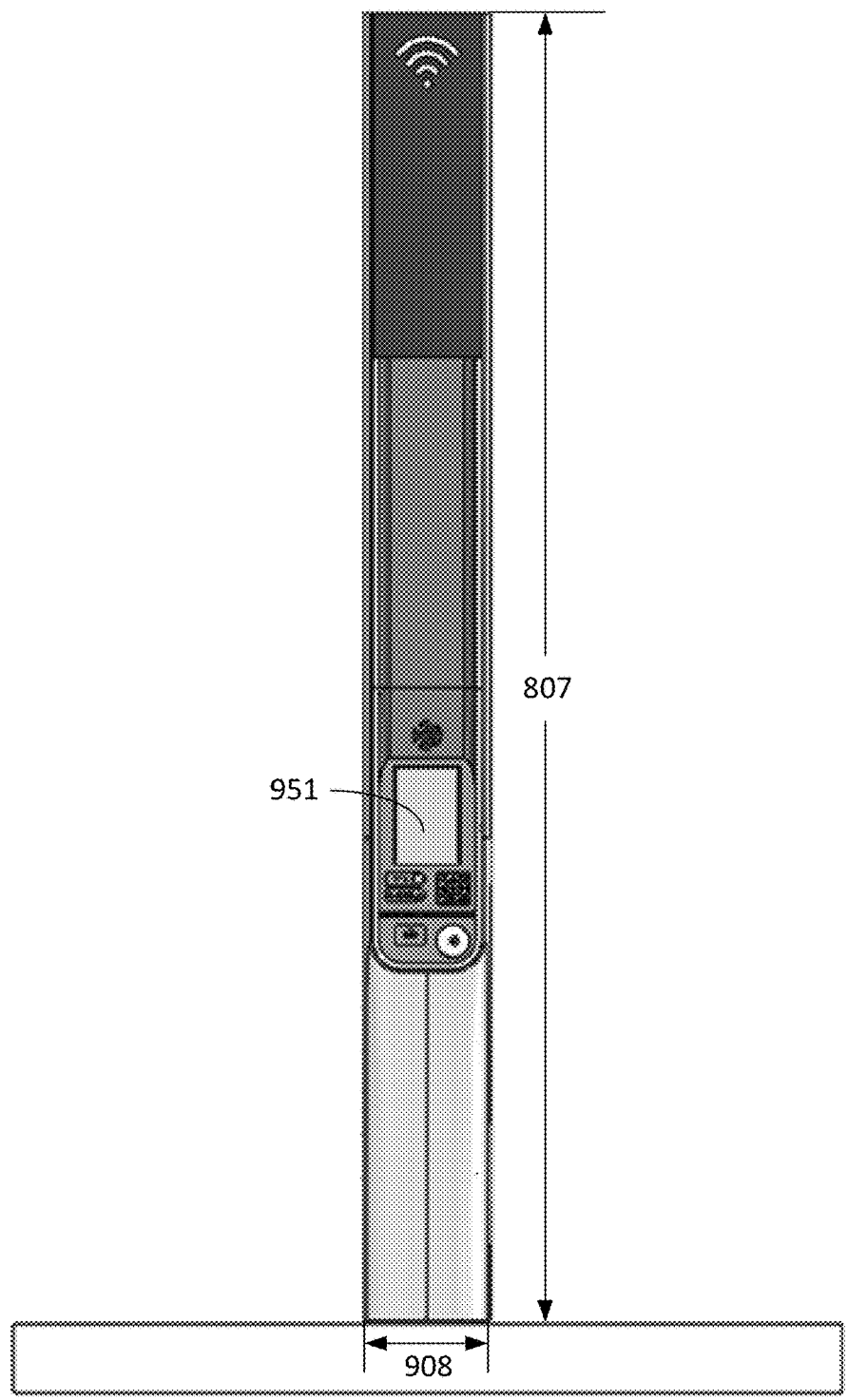
Figure 9C:
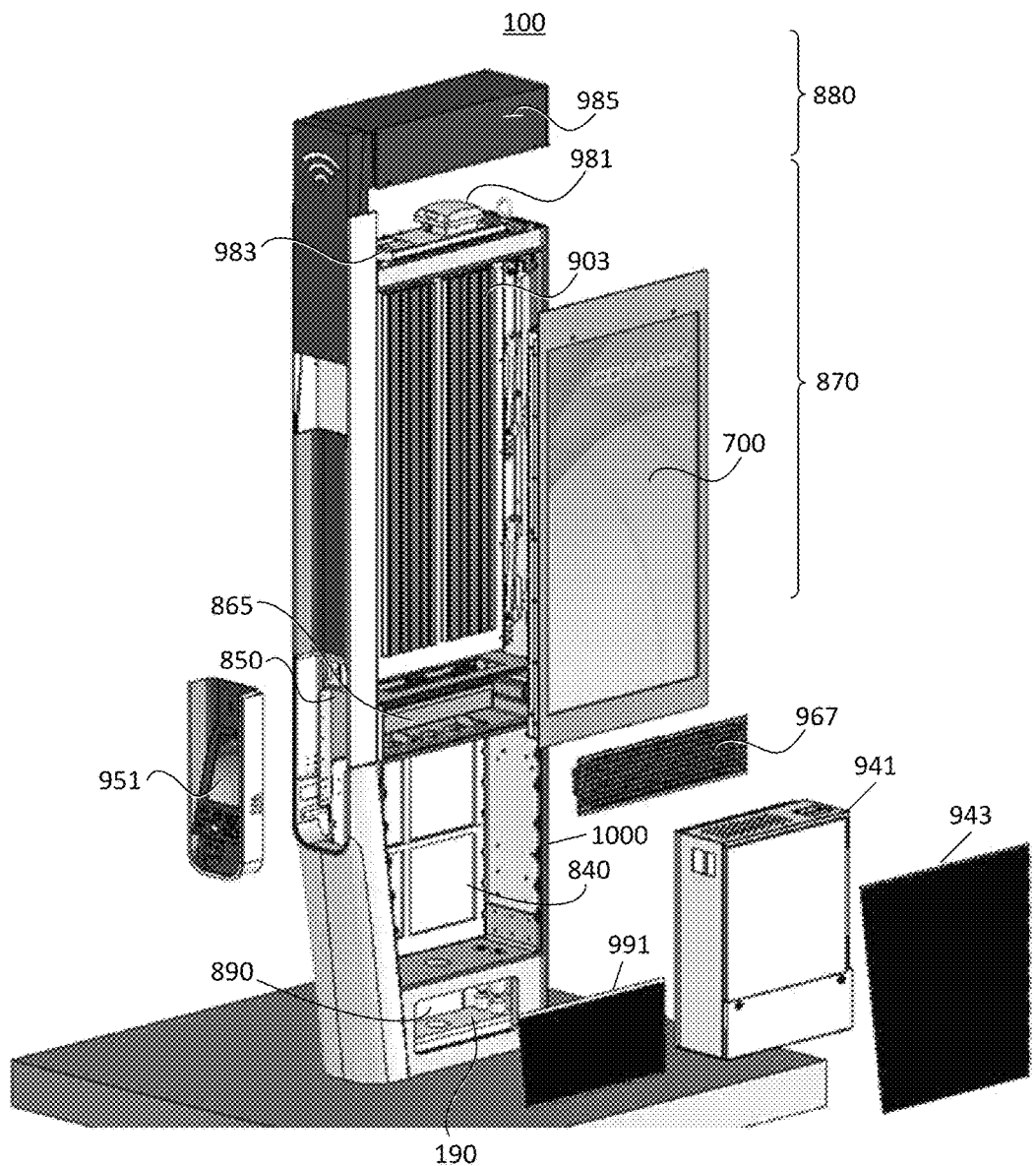

FIGS. 9A, 9B, and 9C show respective front perspective, side, and exploded front perspective views of a PCS 100, in accordance with some embodiments. For convenience, the PCS's top portion 805 and base portion 806 are identified in FIGS. 9A-9B, as are the PCS's height 807, width 908, and length 909.

As can be seen in FIG. 9C, PCS 100 may include a frame 1000. The frame 1000 is (or is part of) a structural system that supports the components of PCS 100. In some embodiments, the frame 1000 forms portions of the PCS's compartments (e.g., communications compartment 880, display compartment 870, air intake compartment 865, user interface compartment 850, electronics compartment 840, and mounting compartment 890).

As can further be seen in FIG. 9C, communications compartment 880 may include a radio access node 981, a wireless access point 983, and/or one or more antennas. The bottom of communications compartment 880 may be formed by a portion of frame 1000, and the top and sides of communications compartment 880 may be formed by a removable cap 985.

Display compartment 870 may include a heat sink 903 and a display module 700. In some embodiments, display compartment 870 includes a second display module (and, optionally, a second heat sink) arranged back-to-back (e.g., in parallel) with display module 700 and heat sink 903, such that display module 700 and the second display module face in opposite directions.

Air intake compartment 865 may include an air intake assembly 967. The air intake assembly 967 may include a grill, a filter, and a fan assembly. User interface compartment 850 may include a user interface device 951. The user interface device 951 may include a table computer, keypad, an emergency call button, microphone(s), speakers, and a mobile device charging port. Electronics compartment 840 may include an electronics cabinet 941, and may be formed by portions of frame 1000 and a cover panel 943. Mounting compartment 890 may at least partially enclose mounting subsystem 190, and may be formed by portions of frame 1000 and a cover panel 991.

Figure 10A:
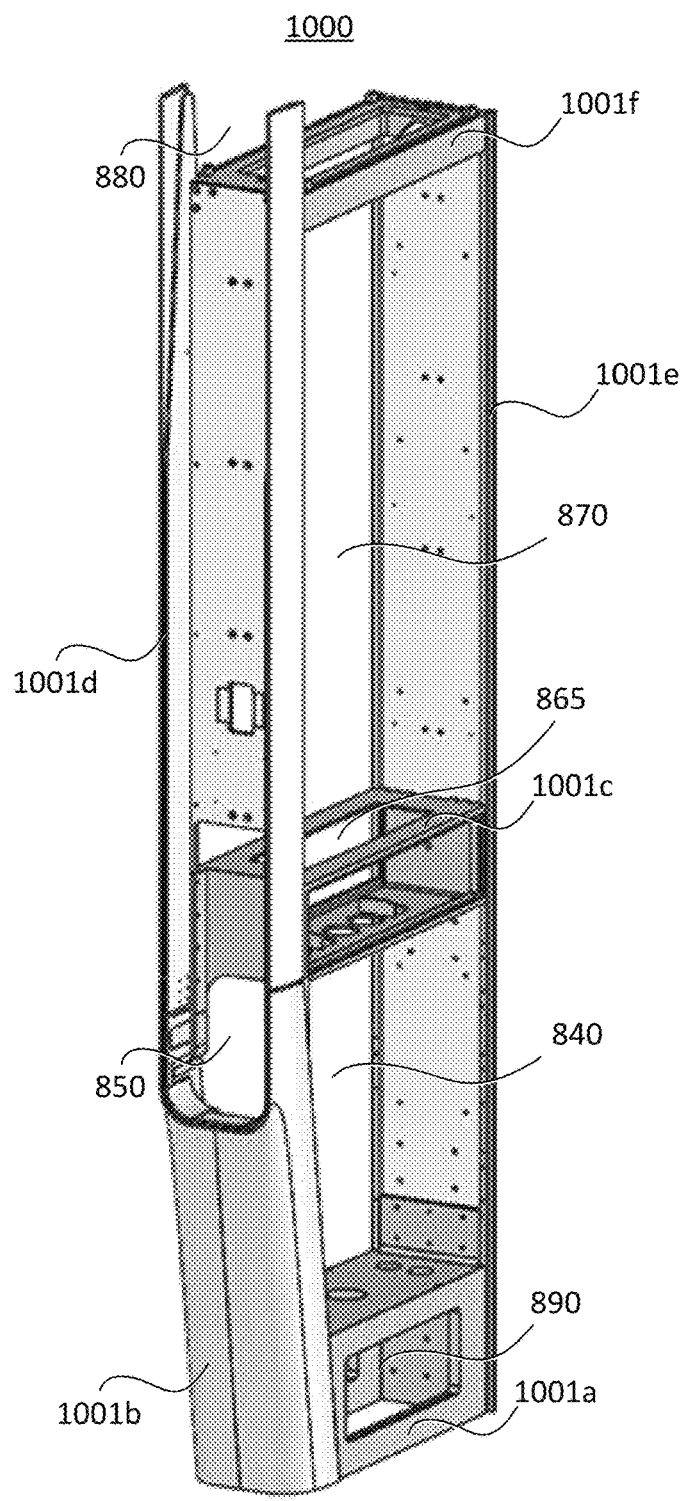
FIGS. 10A, 10B, and 10C show respective side perspective, front perspective, and exploded front perspective views of a frame of a PCS, in accordance with some embodiments.
Figure 10B:
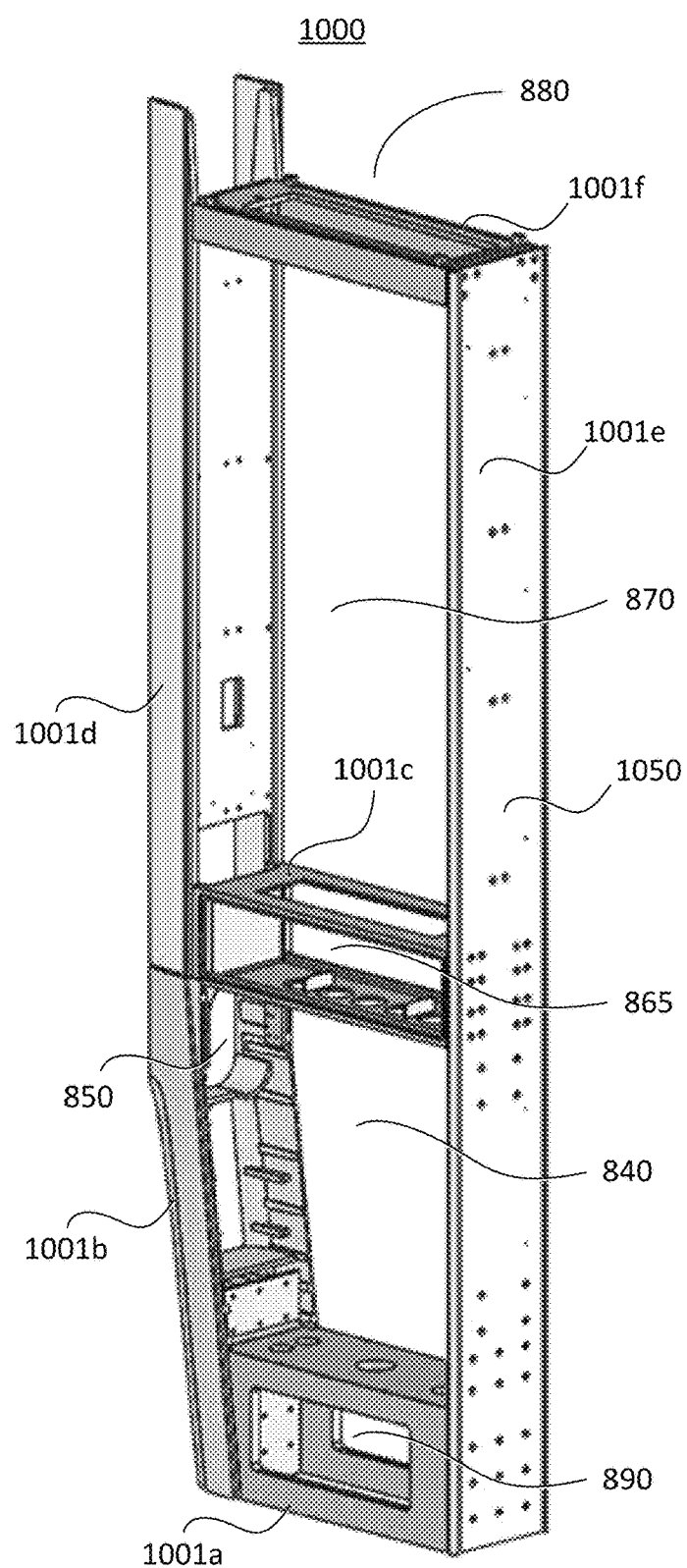
Figure 10C:
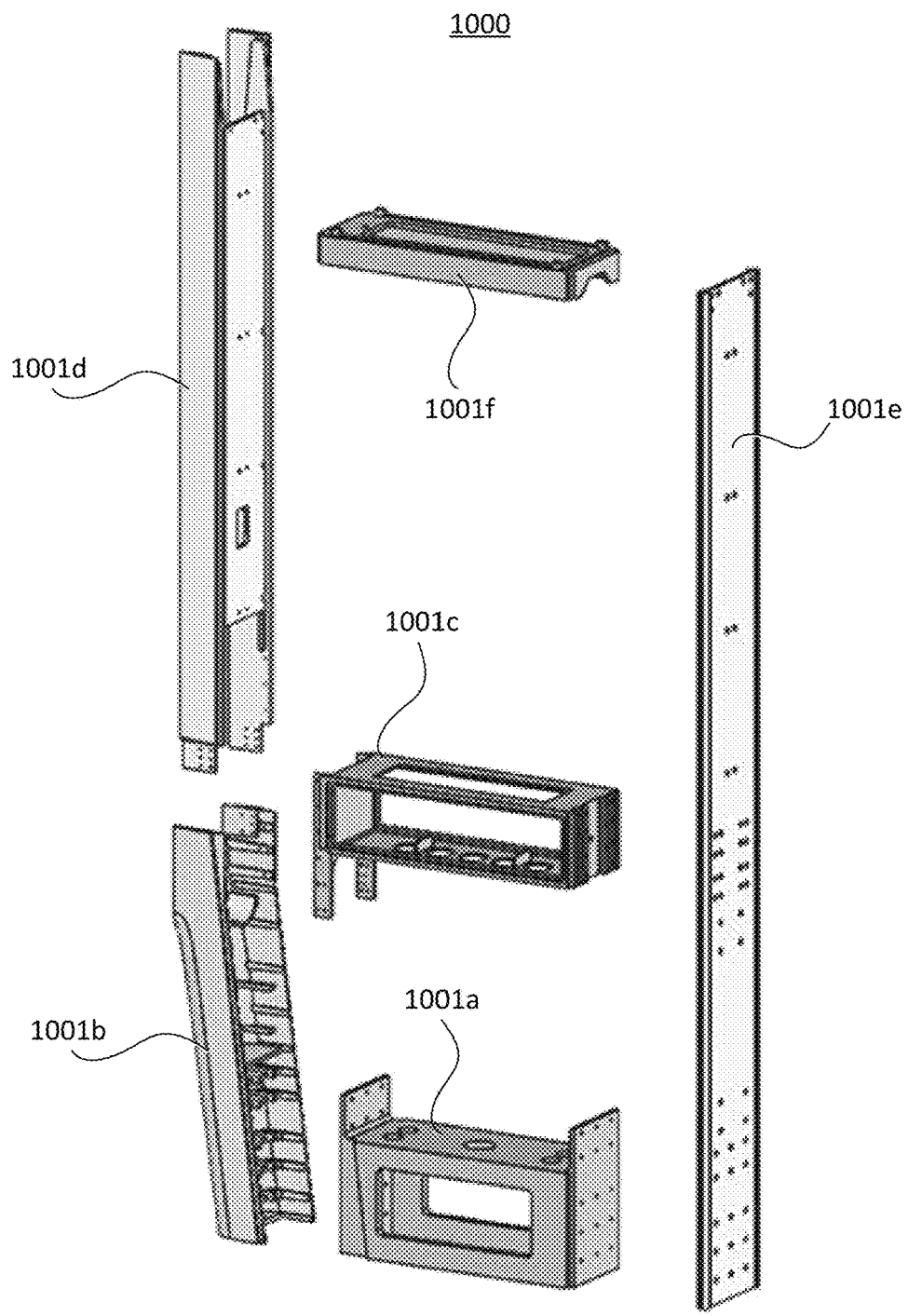

FIGS. 10A-10C show the frame 1000 of a PCS 100, according to some embodiments, and illustrate how the frame 1000 partially forms the PCS's compartments. In some embodiments, the frame 1000 is the frame of a monocoque structure, wherein the frame supports the components, forms the compartments and is also the outer face (or "skin") of portions of the PCS (e.g., the user interface compartment 850 and the opposing side 1050 of the PCS). This approach may simplify construction by reducing the number of brackets, mounting accessories, part count, etc.

In another embodiment, the frame 1000 is that of a traditional structure, and the outer skins are attached to the frame. In such embodiments, the frame supports the components of the PCS, forms the compartments of the PCS, and acts as a rigid structural chassis. One advantage of this approach is field replaceability. If an outer skin is damaged (e.g., by vandalism or by ordinary wear and tear), the damaged skin can be replaced with a new skin. As long as the frame remains uncompromised, damaged outer skins can be removed, replaced, and (optionally) sent to a service facility for refurbishing. Refurbishing methods may include removing dents and/or scratches, sanding, texturing, reshaping, and/or re-painting. Skins that are not suitable for refurbishing (e.g., due to extensive damage) may be recycled and turned into new parts.

As can be seen in FIGS. 10A-10C, frame 1000 may include a bottom member 1001a, a lower front member 1001b, a cross-frame member 1001c, an upper front member 1001d, a rear member 1001e, and a top member 1001f. In the example of FIGS. 10A-10C, lower portions of lower front member 1001b and rear member 1001e are joined to opposite sides of bottom member 1001a. One side of cross-frame member 1001c is joined to an upper portion of lower front member 1001b and a lower portion of upper front member 1001d. The opposite side of cross-frame member 1001c is joined to rear member 1001e proximate to a midpoint between the rear member's top and base ends. The upper portions of upper front member 1001d and rear member 1001e are joined to opposite sides of top member 1001f.

In the example of FIGS. 10A-10C, top member 1001f and the upper portion of upper front member 1001d form a bottom and a side of communications compartment 880. Two sides of display compartment 870 are formed by upper front member 1001d and rear member 1001e, and the top and bottom of display compartment 870 are formed by top member 1001f and cross-frame member 1001c, respectively. Cross-frame member 1001c forms the top, bottom, and two sides of air intake compartment 865. User interface compartment 850 is formed in part by the bottom portion of upper front member 1001d, the top portion of lower front member 1001b, and a side of cross-frame member 1001c. Two sides of electronics compartment 840 are formed by lower front member 1001b and the lower portion of rear member 1001e, and the top and bottom of electronics compartment 840 are formed by cross-frame member 1001c and bottom member 1001a, respectively. Bottom member 1001a forms mounting compartment 890.

Figure 11:
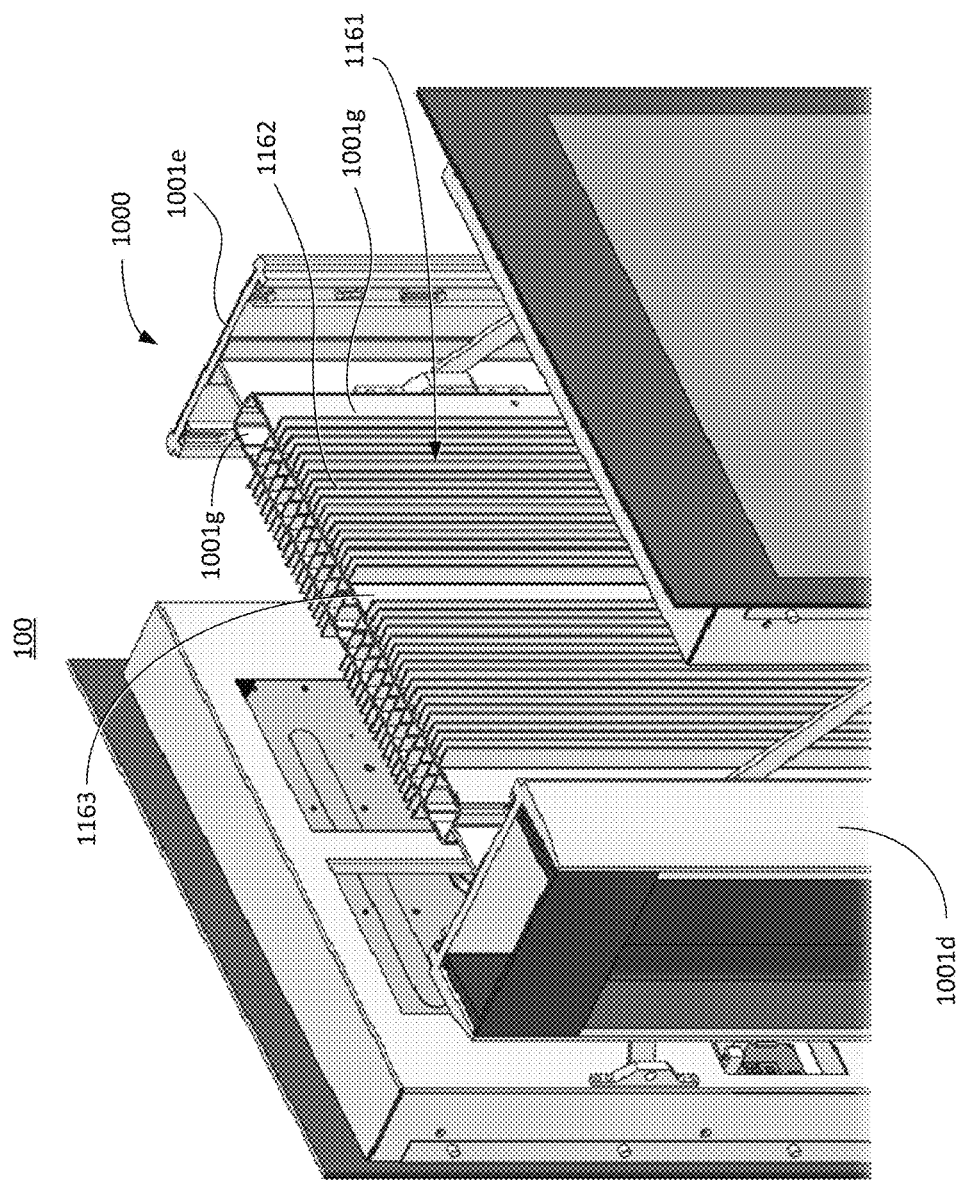
FIG. 11 shows a perspective view of a portion of a PCS, in accordance with some embodiments.

Embodiments of frame 1000 are not limited by the configuration shown in FIGS. 10A-10C. As can be seen in FIG. 11, which shows a front-perspective view of a portion of PCS 100, some embodiments of frame 1000 further include one or more cross-frame members 1001g coupled to upper front member 1001d and an upper portion of rear member 1001e to form an I-beam. In some embodiments, cross-frame member(s) 1001g may include one or more ribbed heat sinks 1161. A ribbed heat sink 1161 may include a substantially planar member 1163 and fins 1162 extending from the substantially planar member 1163 (e.g., in one or more directions substantially perpendicular to the surface of the substantially planar member).

Frame 1000 may facilitate cooling of the PCS's compartments. In some embodiments, one or more (e.g., all) members of frame 1000 may have relatively high thermal conductivity (e.g., average thermal conductivity of at least 90, 100, 110, or 120 Btu/(hr*° F.*ft)). When the temperature within a PCS compartment is greater than the ambient temperature in the area proximate to the PCS, the frame member(s) with relatively high thermal conductivity may function as heat sinks (including, but not limited to, cross-frame member(s) 1001g), such that heat from the compartments is transferred to the PCS's ambient environment through the frame member(s). The member(s) of frame 1000 with relatively high thermal conductivity may substantially consist of materials with relatively high thermal conductivity, including, without limitation, aluminum, thermal pyrolytic graphite, silicon carbide, etc. For example, one or more member(s) of frame 1000 may substantially consist of aluminum.

Members of frame 1000 may be manufactured using suitable techniques. In some embodiments, bottom member 1001a, lower front member 1001b, cross-frame member 1001c, cross-frame member(s) 1001g, and/or top member 1001f may be metal castings. In some embodiments, upper front member 1001d and/or rear member 1001e may be extruded metal, polymer, composite, etc.

Figure 12C:
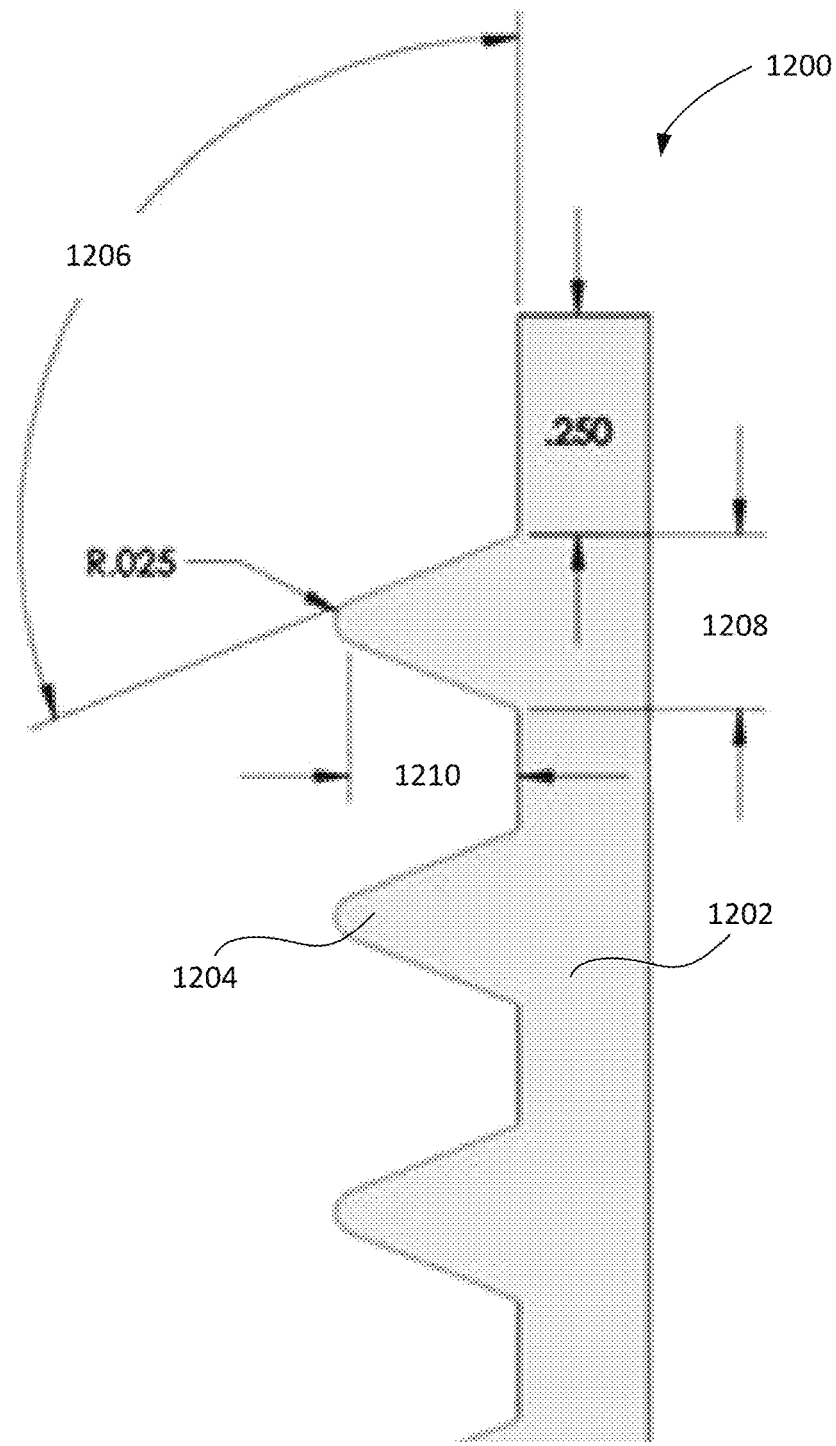
FIG. 12C shows a schematic side view of a ribbed panel, in accordance with some embodiments.

Referring to FIGS. 12A-12C, portions of a PCS's frame 1000 and/or compartments may be covered by ribbed panels 1200. The ribbed panels 1200 may discourage vandalism of PCS 100, since the panel ribs might offer a less appealing target for drawing, painting, or etching than other, smoother surfaces. In addition, the ribbed panels may be swappable, as shown in FIG. 12B, such that a damaged or vandalized panel could be quickly replaced with a pristine panel.

Referring to FIG. 12C, a ribbed panel 1200 may include a substantially planar member 1202 and a set of ribs 1204 extending from the planar member. In some embodiments, the angle 1206 between the outer surface of a rib and the outer surface of the planar member is between approximately 95° and 115°. In some embodiments, the thickness 1208 of a rib 1204 at the rib's base may be between approximately 0.25" and 0.5", and the width 1210 of a rib 1204 may be between approximately 0.3" and 0.6". Other dimensions may be used.

Controlling Access to Components of a PCS

In some embodiments, one or more of the compartments of a personal communication structure (PCS) 100 may be secured. Securing a PCS's compartments may protect the PCS's components from vandalism, theft, and damage (e.g., from unwanted handling or exposure to the ambient environment), protect people from safety hazards (e.g., electrical hazards), and/or prevent unauthorized parties from accessing the PCS's components.

Nevertheless, from time to time it may be necessary or desirable for authorized parties to access the components enclosed in a PCS's compartments. For example, it may be desirable for an authorized party to access a PCS subsystem to perform maintenance, to perform tests, to repair or replace a component, to adjust a component's settings, etc. In some cases, it may be desirable for one party to have access to one set of PCS components and for another party to have access to another set of PCS components, without either party having access to both sets of components. More generally, it may be desirable for different parties to have access only to specified subsets of the PCS's components. For example, it may be desirable for an electricians' union to have access to the PCS's power distribution subsystem 110, so that the union's electricians can maintain or repair the power distribution subsystem, but there may be no reason for the electricians to have access to any other PCS components. Likewise, it may be desirable for a telecommunications company's personnel to have access to the PCS's communications subsystem 180, but there may be no reason for the company's personnel to have access to any other PCS components.

Figure 13:
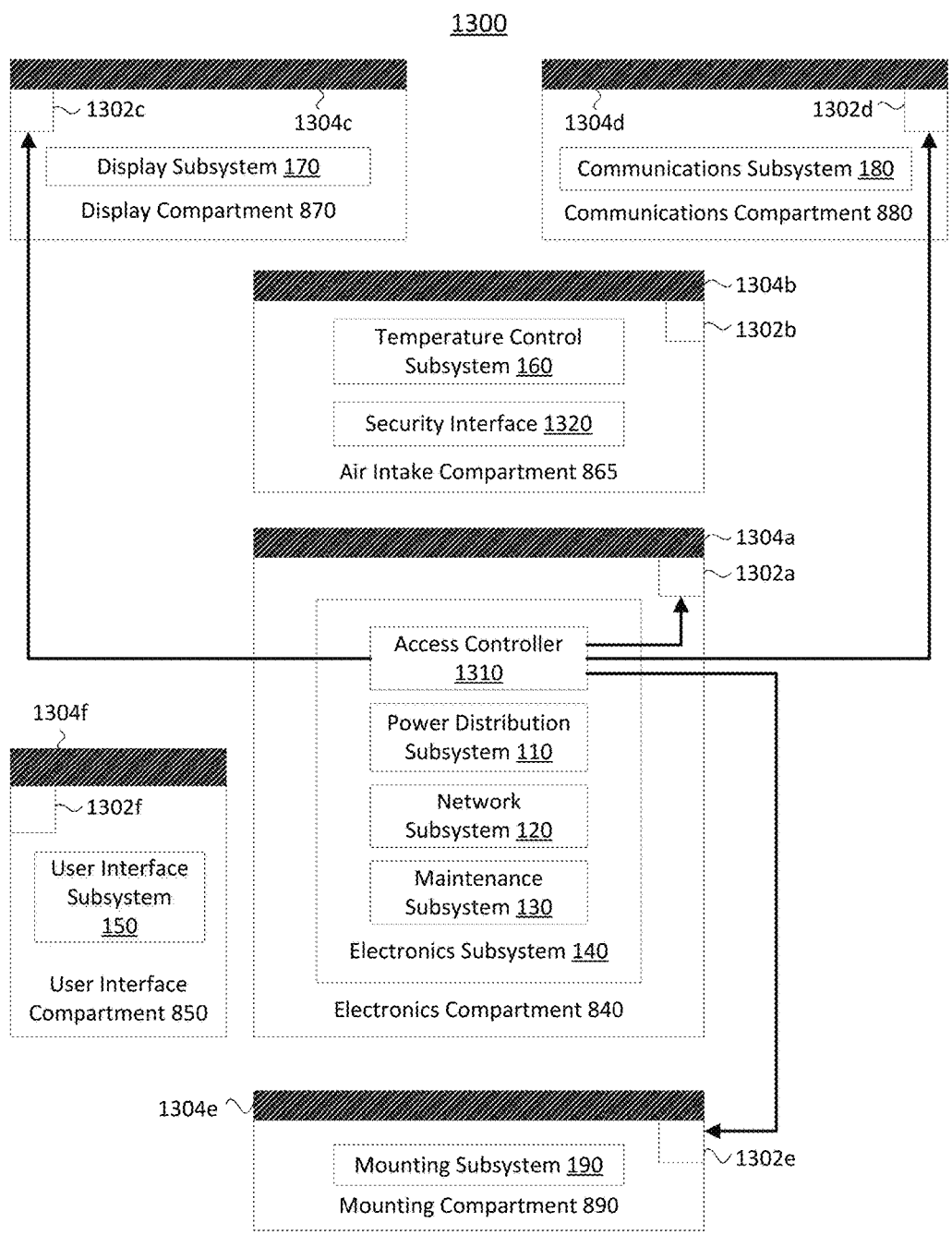
FIG. 13 illustrates a system for controlling access to components of a PCS, in accordance with some embodiments.

FIG. 13 illustrates a system 1300 for controlling access to components of a PCS, according to some embodiments. Access-control system 1300 may independently secure at least a subset of the compartments of a PCS 100 (e.g., access-control system 1300 may apply different security measures to different compartments in the subset, which may include requiring users to provide different authentication tokens and/or information to access different compartments in the subset). The independently secured compartments may be independently accessible (e.g., the interior of any compartment in the subset may be accessed without accessing the interiors of other compartments in the subset). Providing independently secured and independently accessible compartments may facilitate the task of maintaining overall security, while granting different parties access to different sets of PCS components. Some techniques for securing and controlling access to the PCS's compartments are described in further detail below.

In some embodiments, access-control system 1300 includes one or more compartment locks (e.g., locks 1302a-f) and one or more compartment access members (e.g., access members 1304a-f) associated with one or more respective compartments (e.g., electronics compartment 840, air intake compartment 865, display compartment 870, communications compartment 880, mounting compartment 890, and user interface compartment 850). When a compartment lock 1302 is engaged, the lock fastens or otherwise secures the corresponding access member 1304 in a closed position, such that the interior of the corresponding compartment is inaccessible. When a compartment lock 1302 is disengaged, the corresponding access member 1304 is movable between the closed position and an open position, such that the corresponding compartment is accessible.

Figure 14:
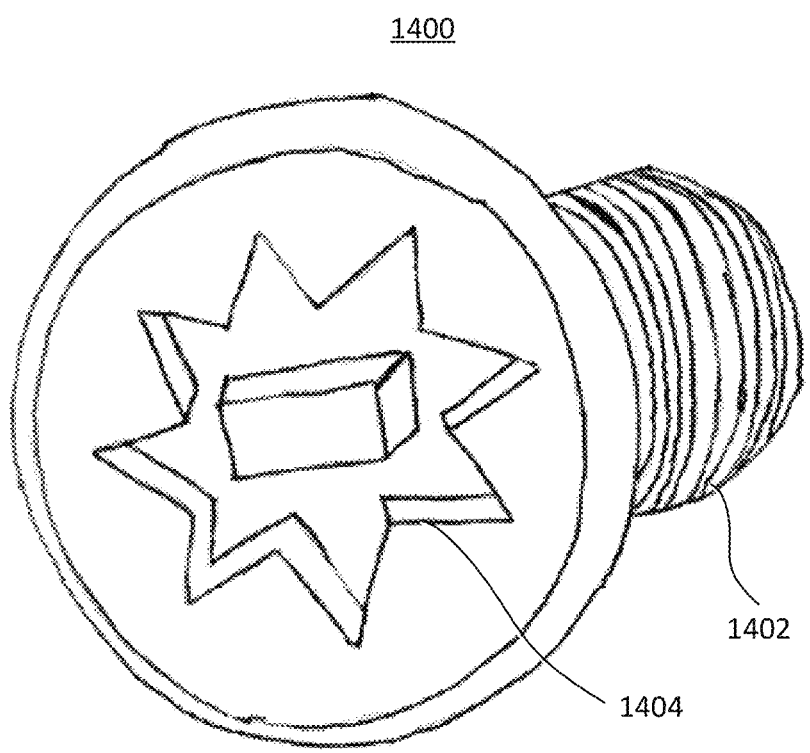
FIG. 14 shows a perspective view of a security fastener.

The compartment locks 1302 may include, without limitation, mechanical locks, electronic locks, electromechanical locks, etc. Non-limiting examples of mechanical locks include warded locks, tumbler locks (e.g., pin tumbler locks, wafer tumbler locks, disc tumbler locks, lever tumbler locks), combination locks, security fasteners (e.g., "security" or "tamper-proof" screws, bolts, anchors, nuts), etc. A security fastener may have an atypical shape and/or atypical dimensions relative to commercially available fasteners of the same type. For example, as can be seen in FIG. 14, a security fastener 1400 may be a machine screw 1402 with an atypical screw drive 1404 or head configuration. A security fastener can generally be unlocked or unfastened using a specialized tool that conforms to or otherwise accommodates the fastener's atypical shape and/or dimensions. Other mechanical locks can generally be opened with physical keys or a combination code.

Non-limiting examples of electronic or electromechanical locks include keycard locks, RFID locks, smart locks, cyber locks, etc. A keycard lock can generally be unlocked by presenting a suitable security token (e.g., a keycard with appropriate key data) to a keycard reader. Likewise, an RFID lock can generally be unlocked by presenting a suitable security token (e.g., an RFID tag with appropriate key data) to an RFID reader. A smart lock can generally be unlocked by presenting suitable authentication data to an access controller 1310, which confirms the validity of the authentication data and disengages the lock. Non-limiting examples of authentication data include biometric data (e.g., fingerprint data, retinal scan data, voice print data or other speech-based data, etc.), security credentials (e.g., username, password, personal identification number (PIN), etc.) cryptographic data, etc.

A cyber lock generally includes an electronic cylinder that can be unlocked by inserting a suitable cyber key. A cyber key is generally an electronic key that can communicate with a cyber lock to engage and disengage the cyber lock's cylinder. In some cases, a cyber key may provide power to the cyber lock. In some cases, a cyber key may contain internal memory that stores security information, which may include but is not limited to: one or more encrypted access codes, information identifying one or more PCS structures the key can access, dates and times when the key is authorized to access a particular PCS or set of PCSs, and/or date/time ranges when the key is authorized to access a particular PCS or set of PCSs. In some cases, a cyber key may be capable of disabling access to the security information and/or deleting the security information in response to input signals (e.g., input signals received wirelessly from a remote service center, indicating that the key has been lost or stolen). A cyber key's security information (e.g., schedules, credentials, authorizations, permissions, etc.) generally may be updated using wireless communications (e.g., Bluetooth and/or Wi-Fi) when connected to an authorized network. In some embodiments, a cyber key associated with a PCS 100 may connect to an authorized network through the PCS 100 (e.g., via the communications subsystem 180). Some of the above examples of cyber keys may contain an internal rechargeable battery that powers the cyber lock when the key is inserted into the lock. In some cases, a cyber key may communicate with a cyber lock (e.g., when the key is inserted into the lock). Such communication may occur wirelessly or via a wired connection (e.g., a USB interface).

Some examples of commercially available electronic or electromechanical locks include electromagnetic locks, electric latch releases, electronically-actuated deadbolts, motorized locks and solenoid locks.

In some embodiments, an electronic or electromechanical lock includes a locking mechanism and an actuator. Non-limiting examples of locking mechanisms include deadbolts, latches, electromagnets, etc. Non-limiting examples of actuators include solenoid drivers, rotary actuators, linear actuators (e.g., a linear actuator that moves a deadbolt or unlatches a latch), electromagnets, cams, levers, etc.

Returning to FIG. 13, access-control system 1300 may include an access controller 1310 and a security interface 1320. In some embodiments, access controller 1310 controls one or more actuators for one or more compartments, and uses the appropriate actuator to disengage a corresponding lock 1302 and/or open a corresponding access member 1304 upon provision of suitable authentication data. For example, when a user provides the appropriate authentication data for display compartment 870, access controller 1310 may drive an actuator to disengage lock 1302c, and (optionally) open compartment 870 by driving an actuator to move access member 1304c. In some embodiments, the authentication data is provided to access controller 1310 by security interface 1320 (e.g., via network subsystem 120). In some embodiments, authentication data is provided to access controller 1310 over a communication network (e.g., via network subsystem 120 and/or communication subsystem 180).

Figure 15:
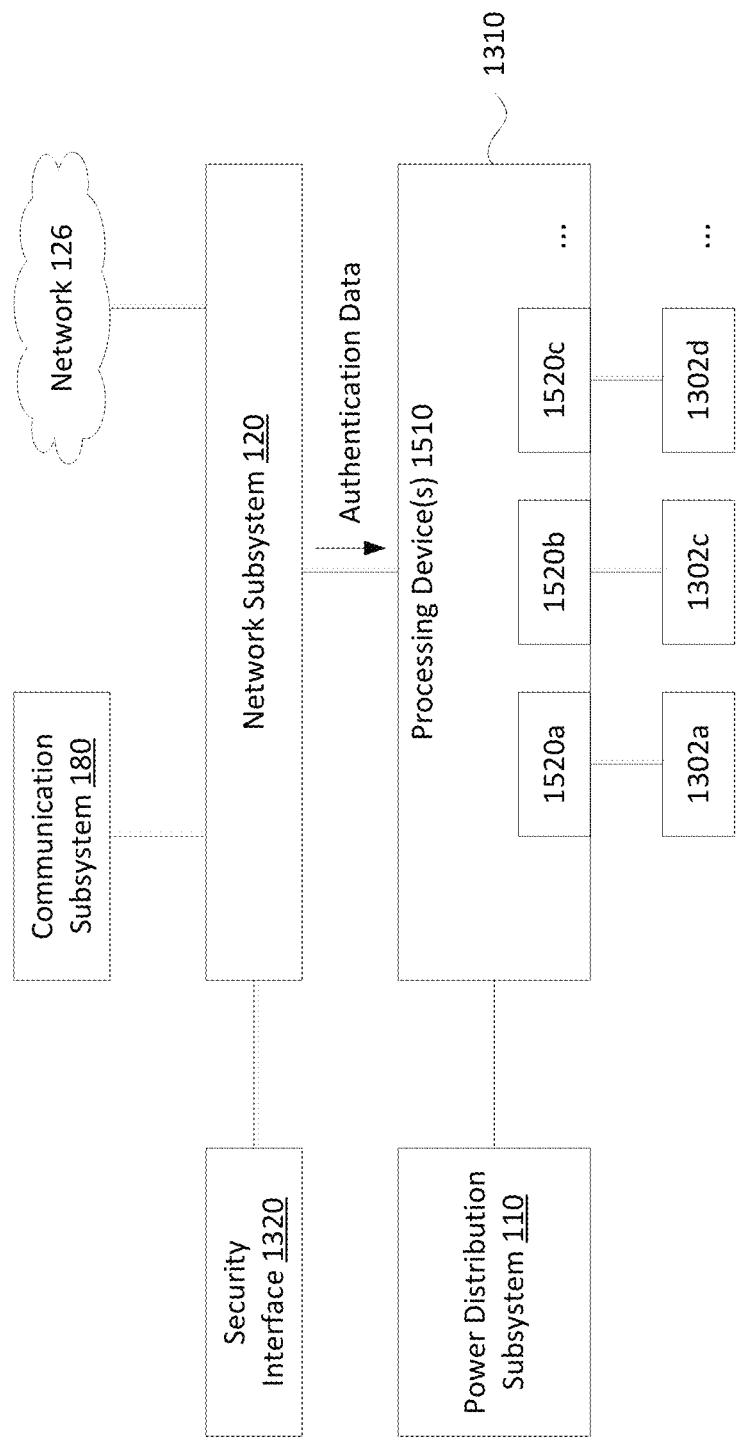
FIG. 15 shows a block diagram of an access controller, in accordance with some embodiments.

In some embodiments, access controller 1310 includes one or more processing devices 1510 and one or more actuator drivers 1520, as shown in FIG. 15. The processing device(s) 1510 and actuator driver(s) 1520 may be powered by power distribution subsystem 110. Processing device(s) 1510 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device.

Actuator driver(s) 1520 may include hardware (e.g., I/O ports) and/or software (e.g., driver software) controlled by processing device(s) 1510 and adapted to communicate with actuators (e.g., the actuators of locks 1302 and/or access members 1304). In some embodiments, access controller 1310 engages a lock 1302 and/or disengages a lock 1302 by sending suitable control signals to the lock's actuator via an actuator driver 1520. In some embodiments, access controller 1310 opens an access member 1304 and/or closes an access member 1304 by sending suitable control signals to the access member's actuator via an actuator driver 1520. In some embodiments, access controller 1310 determines whether a lock 1302 is engaged or disengaged, or determines whether an access member 1304 is open or closed, by sending a suitable query to the corresponding actuator, which may reply to the query by sending data to processing device(s) 1510 indicating the actuator's state. In some embodiments, when access controller 1310 detects closure of a compartment's access member 1304, access controller 1310 may engage the compartment's lock 1302.

An embodiment has been described in which access controller 1310 includes one or more processing device(s) 1510. In some embodiments, access controller 1310 is implemented on one or more processing devices of a subsystem of PCS 100. Access controller 1310 may, for example, be implemented on the maintenance subsystem's processing device(s) 600, which may be equipped with suitable actuator driver(s) 1520.

A user may provide authentication data to access controller 1310 via security interface 1320. Security interface 1320 may include a keycard reader, RFID reader, keyboard, keypad, touchscreen, fingerprint scanner, retinal scanner, camera, microphone, data access port, and/or other suitable data input device. The keycard reader and RFID reader can be used to read authentication data from a keycard and an RFID tag, respectively. The keyboard, keypad, or touchscreen can be used to enter security credentials. The fingerprint scanner, retinal scanner, camera, or microphone may be used to enter biometric data. The data access port may be used to upload authentication data, including but not limited to cryptographic keys. In the example of FIG. 15, security interface 1320 is configured to send the user-provided authentication data to access controller 1310 via network subsystem 120. In some embodiments, security interface 1320 includes a processing device adapted to encrypt the user-provided authentication data before sending the data to access controller 1310. In some embodiments, security interface 1320 sends the authentication data to access controller 1310 via a dedicated link that is not part of network subsystem 120. Alternatively or in addition, a user may provide authentication data to access controller 1310 over a communication network (e.g., network 126, or a network coupled to communication subsystem 180).

Access controller 1310 may analyze the user-provided authentication data to determine whether it is valid. In some embodiments, the user specifies which compartment(s) the user is attempting to access and access controller 1310 analyzes the authentication data to determine whether it is valid for the specified compartment(s). In some embodiments, the user provides authentication data without specifying which compartment(s) the user is attempting to access and access controller 1310 analyzes the authentication data to determine whether it is valid for any compartment. To determine whether the authentication data is valid, access controller 1310 may perform one or more suitable authentication procedures (e.g., fingerprint matching, voiceprint matching, retinal scan matching, username matching, password matching, PIN matching, one-factor authentication, two-factor authentication, multi-factor authentication, etc.).

In some embodiments, permission to access a compartment of the PCS 100 may be remotely granted, denied, or revoked (e.g., by a remote service center), and the grant, denial, or revocation of permission to access the compartment may be communicated to the access controller 1310 over a communication network (e.g., network 126, a network coupled to communication subsystem 180, etc.). In some embodiments, the access controller may acknowledge the grant, denial, or revocation of permission over the communication network.

The entity that grants, denies, or revokes permission to access a compartment of the PCS 100 may determine whether to grant, deny, or revoke permission based on any suitable information. In some embodiments, the entity grants permission to access a compartment during predetermined time periods. For example, the entity may grant permission to access a compartment during time periods specified by repair or maintenance schedules for components located in the compartment. As another example, the entity may deny access to the display compartment 870 for display subsystem 170 maintenance except during periods generally characterized by low pedestrian foot traffic, such as early morning hours. It can be appreciated that during periods of high pedestrian foot traffic, it is desirable for the display subsystem 170 to be showing advertisements. In some embodiments, the maintenance subsystem 130 may communicate with the entity (e.g., a remote service center). For example, the maintenance subsystem 130 may indicate to the entity whether (or when) maintenance or repair of a PCS component or subsystem is recommended or permitted. In some embodiments, the entity grants permission to access a compartment based on communication from the maintenance subsystem indicating that repair or maintenance of a component or subsystem in the compartment is recommended or permitted. For example, the maintenance subsystem 130 may indicate that repair or replacement of a PCS component in a compartment is recommended in response to administering a diagnostic test (e.g., a self-test) and detecting a fault. In some embodiments, the PCS 100 may send user-provided authentication data to the entity, which may determine whether the authentication data is valid for one or more compartments and grant permission to access the compartment(s) if the authentication data is determined to be valid.

In some embodiments, the PCS 100 may implement two-factor access control based on (1) user-provided authentication data and/or items (e.g., security tokens, keys, etc.) and (2) a grant, denial, or revocation of permission to access a compartment. When two-factor access control is used, the grant, denial, or revocation of permission to access a compartment may function as a grant, denial, or revocation of permission to allow authorized access to the compartment. When authorized access to a compartment is permitted, the access controller 1310 may allow users who provide valid authentication data/item(s) for the compartment to access the interior of the compartment. When authorized access to a compartment is not permitted, the access controller 1310 may not allow a user to access the interior of the compartment, even if the user provides valid authentication data/item(s) for the compartment. In other words, the PCS 100 may permit a user to access a PCS compartment if the user provides suitable authentication data/item(s) and a remote entity grants permission to access the compartment, but not if the authentication data/item(s) are unsuitable nor if the remote entity denies or revokes permission. For example, if a user provides compromised authentication data/item(s) (e.g., stolen authentication data or a lost/stolen key), the remote entity may determine that the authentication data/item(s) are compromised, deny permission to access the compartment, and instruct the access controller 1310 to revoke the user's privileges to access one or more compartments by disabling authentication data/item(s) assigned to or in the possession of the user.

In embodiments of the PCS 100 that implement two-factor access control, steps of the access control process may be performed in parallel and/or in any suitable sequence. In some embodiments, access controller 1310 may send a message to a remote entity (e.g., service center) requesting permission to allow authorized access to a compartment, and the remote entity may then reply with a grant or denial of permission to allow authorized access to the compartment. The access controller 1310 may send such a request before a user provides authentication data/item(s) for the compartment, after the user provides the authentication data/item(s) but before the authentication data/item(s) are validated, or after the user-provided authentication data/item(s) are validated. In some embodiments, a request to access a compartment is sent to the remote entity before a user attempts to gain access to the compartment (e.g., by providing authentication data/item(s)). After permission to allow authorized access to the compartment has been received by the PCS 100 (and before such permission has been revoked), a user may gain access to the compartment by providing suitable authentication data/item(s).

In some embodiments, the access controller 1310 provides an indication that permission to access a compartment (or permission to allow authorized access to a compartment) has been granted. For example, when access permission has been granted (and not revoked), the access controller 1310 may illuminate a light-emitting diode (e.g., a green LED) to indicate that access (e.g., authorized access) to the compartment is permitted. The indicator may be disposed in any suitable location, including, but not limited to, on the corresponding compartment or on an electronic key provided by the user. In some embodiments, the access controller 1310 may activate an indicator on a key wirelessly (e.g., over a wireless network) or via a wired connection (e.g., when the key is inserted into an interface connector or lock).

In some embodiments, the PCS 100 may implement single-factor access control based on user-provided authentication data/item(s) or on a grant, denial, or revocation of permission to access a compartment. For example, the access controller 1310 may open or unlock a compartment in response to receiving a grant of permission to access the compartment, without requiring the user to provide authentication data/item(s). In some embodiments, a user may transmit a code to a remote entity (e.g., by emailing the code to an email address associated with the entity, by sending a text message to a phone number associated with the entity, etc.), and, after validating the code, the entity may grant permission to access the compartment. In some embodiments, the user may transmit the code via a mobile device that wirelessly connects to a network through the PCS 100 (e.g., through an access node of the PCS 100). In some embodiments, the entity identifies a compartment of the PCS 100 and determines whether to grant permission to access the compartment based on the transmitted code, the email address/phone number to which the code was transmitted, and/or the email address/phone number from which the code was sent. In some embodiments, the entity may use an automated process to grant permission to access a compartment.

Access controller 1310 may detect and respond to attempts to gain unauthorized access to compartment(s) of PCS 100. In some embodiments, access controller 1310 determines that a user is attempting to gain unauthorized access to a PCS compartment if invalid authentication data is provided in more than N consecutive authentication attempts, where N is a predetermined number. In some embodiments, access controller 1310 determines that a user is attempting to gain unauthorized access to a PCS compartment (or has gained unauthorized access) if access controller 1310 detects disengagement of the compartment's lock or opening of the compartment's access member without a corresponding entry of the compartment's authentication data.

When unauthorized access (or an attempt to gain unauthorized access) to a PCS compartment is detected, access controller 1310 may take remedial action. In some embodiments, access controller 1310 collects evidence of the unauthorized access (or attempt) by activating a camera to acquire one or more images (e.g., still images or video) of a region proximate to the PCS. The acquired images may include images of the user who has accessed (or attempted to access) the PCS. In some embodiments, access controller 1310 sounds an alarm, displays a message via display subsystem 170, initiates communication with a security provider, and/or performs other suitable actions to draw attention and/or alert interested parties to the unauthorized access. In some embodiments, when unauthorized access to one or more compartments is detected, the access controller silently alerts a remote security center (e.g., alerts the remote security center without alerting the user), which in turn takes action based on the unauthorized access. Depending on which compartment is accessed, the security center may, for example, deploy security personnel or alert the local police.

Figure 16:
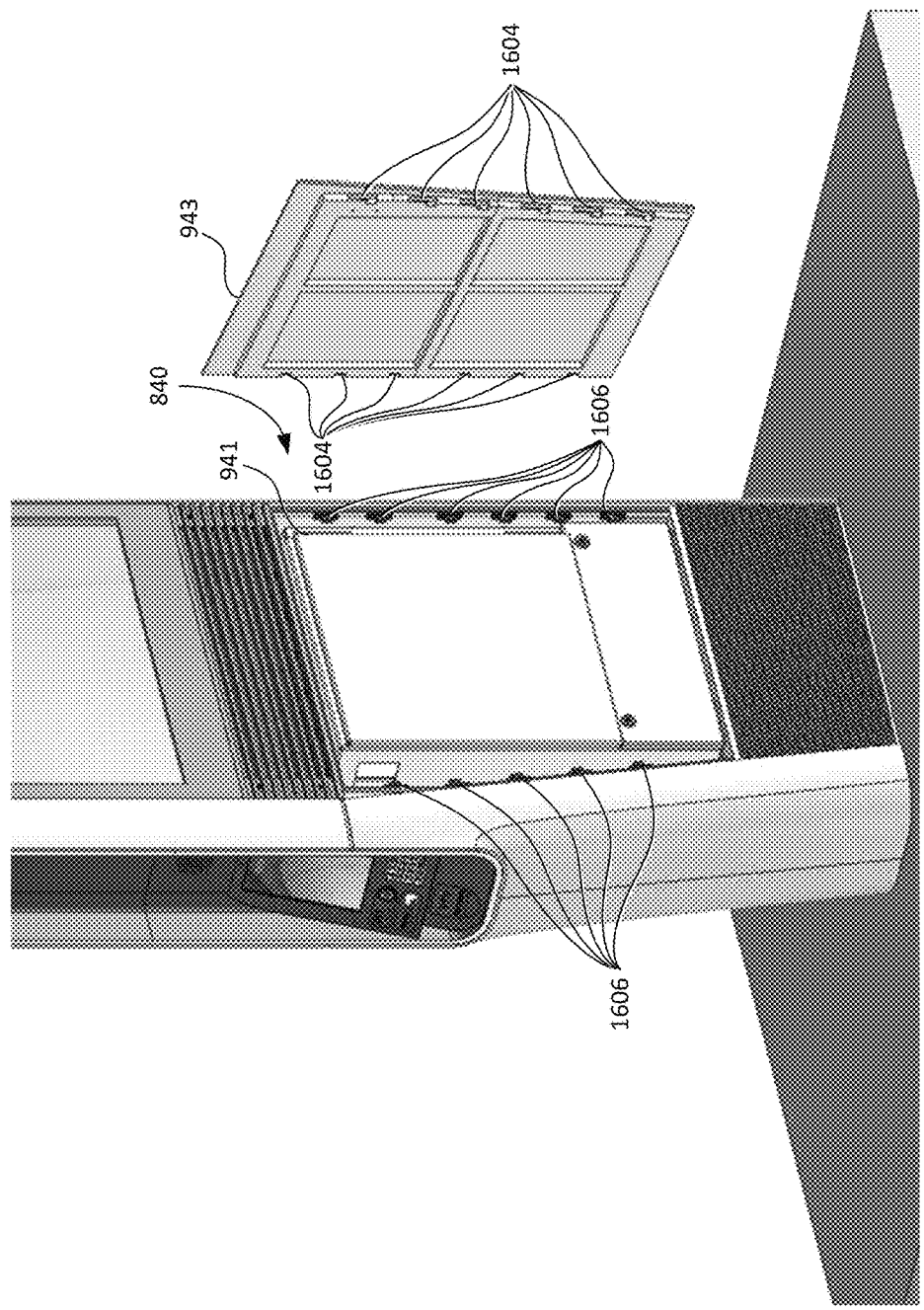
FIG. 16 shows a perspective view of an electronics compartment, in accordance with some embodiments.

FIG. 16 shows a perspective view of electronics compartment 840, according to some embodiments. In some embodiments, cover panel 943 functions as access member 1304*a* for electronics compartment 840. In some embodiments, the lock 1302*a* for electronics compartment 840 includes a set of latches 1604 and a corresponding set of latch receptacles 1606. When the lock is engaged, the interlocking of the latches 1604 and the latch receptacles 1606 holds the access member securely in the closed position. The lock may be disengaged by access controller 1310, which may drive one or more actuators coupled to the latch receptacles 1606 to release the latches 1604 or vice versa, thereby allowing the access member to be moved from the closed position (e.g., a position in which the interior of the compartment is inaccessible, such as the position of cover panel 943 in FIG. 9A) to the open position (e.g., a position in which the interior of the compartment is accessible, such as the position of cover panel 943 in FIG. 16). The cover panel 943 may be hinged and/or removable.

Figure 17A:
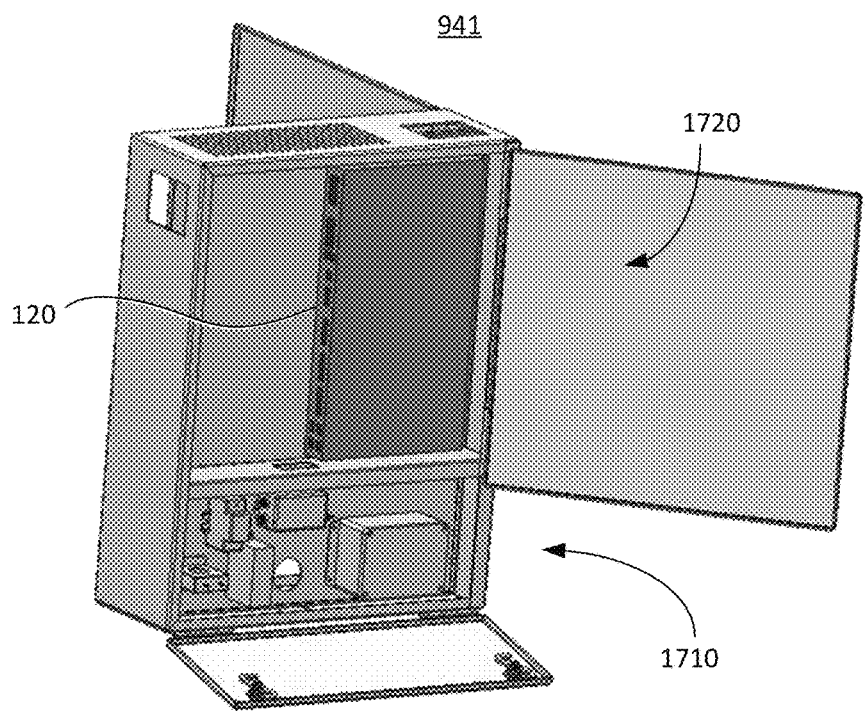
FIGS. 17A and 17B show respective front and rear perspective views of an electronics cabinet, in accordance with some embodiments.
Figure 17B:
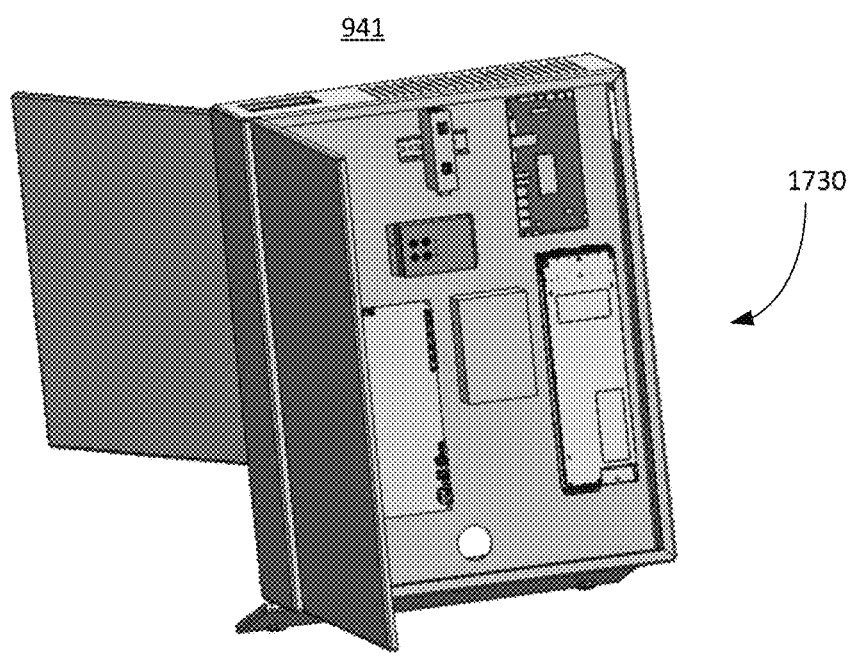

As can be seen in FIG. 16, electronics compartment 840 may enclose an electronics cabinet 941. FIGS. 17A and 17B show front perspective and rear perspective views of the electronics cabinet 941, according to some embodiments. Electronics cabinet 941 may include three sub-compartments 1710, 1720, and 1730. Sub-compartments 1710, 1720, and 1730 (or a subset thereof) may be independently secured and independently accessible. In some embodiments, sub-compartments 1710, 1720, and 1730 enclose, respectively, power distribution subsystem 110, network subsystem 120, and maintenance subsystem 130. In some embodiments, the power distribution subsystem 110 and the network subsystem 120 may be located on the same side of the electronics cabinet 941 (e.g., with the power distribution subsystem 110 located between the base of the PCS 100 and the network subsystem 120), and the maintenance subsystem 130 may be located on the opposite side of the electronics cabinet 941. In some embodiments, sub-compartment 1720 encloses network subsystem 120, and sub-compartments 1710 and 1730 collectively enclose power distribution subsystem 110 and maintenance subsystem 130 (e.g., portions of the power distribution subsystem 110 and/or portions of the maintenance subsystem 130 may be located in both the sub-compartment 1710 and the sub-compartment 1730).

In some embodiments, electronics compartment 840 may not enclose an electronics cabinet 941. Electronics compartment 840 may enclose electronics subsystem 140 without partitioning subsystems 110, 120, and 130 into sub-compartments.

An embodiment has been described in which an electronics compartment 840 encloses three sub-compartments 1710, 1720, and 1730, which in turn enclose power distribution subsystem 110, network subsystem 120, and maintenance subsystem 130. In some embodiments, PCS 100 may not include an electronics compartment 840 enclosing multiple compartments. Instead, PCS 100 may include three compartments which respectively enclose subsystems 110, 120 and 130.

FIGS. 18A and 18B show front perspective and exploded front perspective views, respectively, of an air intake assembly 967, according to some embodiments. Air intake assembly 967 may be enclosed in air intake compartment 865 and may implement a portion of temperature control subsystem 160. In some embodiments, air intake assembly 967 includes a grill 1802, a filter 1806, and a fan assembly 1804. The grill 1802 may function as access member 1304b, and may be secured to the PCS by security fasteners 1808, which may function as lock 1302b. Thus, lock 1302b may be engaged by using security fasteners 1808 to fasten grill 1802 to the PCS. According to some embodiments, the closed and open positions of access member 1304b (e.g., grill 1802 of air intake assembly 967) are illustrated in FIG. 9A and FIG. 18A, respectively. In some embodiments, air intake compartment 865 may enclose two air intake assemblies 967 disposed proximate to each other, on opposite sides of PCS 100.

FIGS. 19A and 19B show front perspective and rear perspective views, respectively, of a user interface device 951, according to some embodiments. User interface device 951 may be partially enclosed in user interface compartment 850 and may implement a user interface subsystem 150. In some embodiments, user interface device 951 includes a user interface panel 1902 and a tablet computer 1900 fastened to the user interface panel 1902 by security fasteners 1904. In some embodiments, the security fasteners are accessible via the interior of air intake compartment 865, but not accessible from the exterior of the PCS 100. Thus, in some embodiments, the lock 1302f and access member 1304f for user interface compartment 850 may include, respectively, the lock 1302b and the access member 1304b for air intake compartment 865.

FIG. 20 shows a perspective view of a display compartment 870, according to some embodiments. In some embodiments, display compartment 870 includes a display module 700 and a heat sink 903. In some embodiments, display compartment 870 includes a second display module (and, optionally, a second heat sink) arranged back-to-back with display module 700 and heat sink 903, such that display module 700 and the second display module face outwardly in opposite directions.

FIG. 21 shows an exploded perspective view of a display module 700, according to some embodiments. In some embodiments, display module 700 includes a housing and a display panel 2104. The housing may include a housing frame 2102, a covering frame 2106, and a transparent covering 2108. Display module 700 may be assembled by positioning display panel 2104 in cavity 2110, fastening the display panel to housing frame 2102, and using covering frame 2106 to secure transparent covering 2108 over display panel 2104. Transparent covering 2108 may include toughened glass (e.g., "Gorilla Glass" (ID manufactured by Corning, Inc.). In some embodiments, the assembled display module 700 functions as the access member 1304c for display compartment 870. FIG. 9A shows access member 1304c (display module 700) in the closed position, and FIG. 20 shows the access member in the open or service position.

FIG. 22 shows a cut-away perspective view of compartment lock 1302c of display compartment 870, according to some embodiments. In some embodiments, compartment lock 1302c includes a connector 2202 (e.g., a pin) coupled to the housing of display module 700, and a mating interlocking connector 2204 (e.g., an L-shaped receptacle) formed in a retention member 2208 of PCS 100. FIG. 22 also shows an actuator 2206. In some embodiments, actuator 2206 is operable to disengage lock 1302c by moving retention member 2208 such that connector 2202 is released from mating interlocking connector 2204 (e.g., moving retention member 2208 toward the PCS's base). The operation of compartment lock 1302c and actuator 2206 are described in more detail below, with reference to FIGS. 23A and 23B.

Figure 23A:
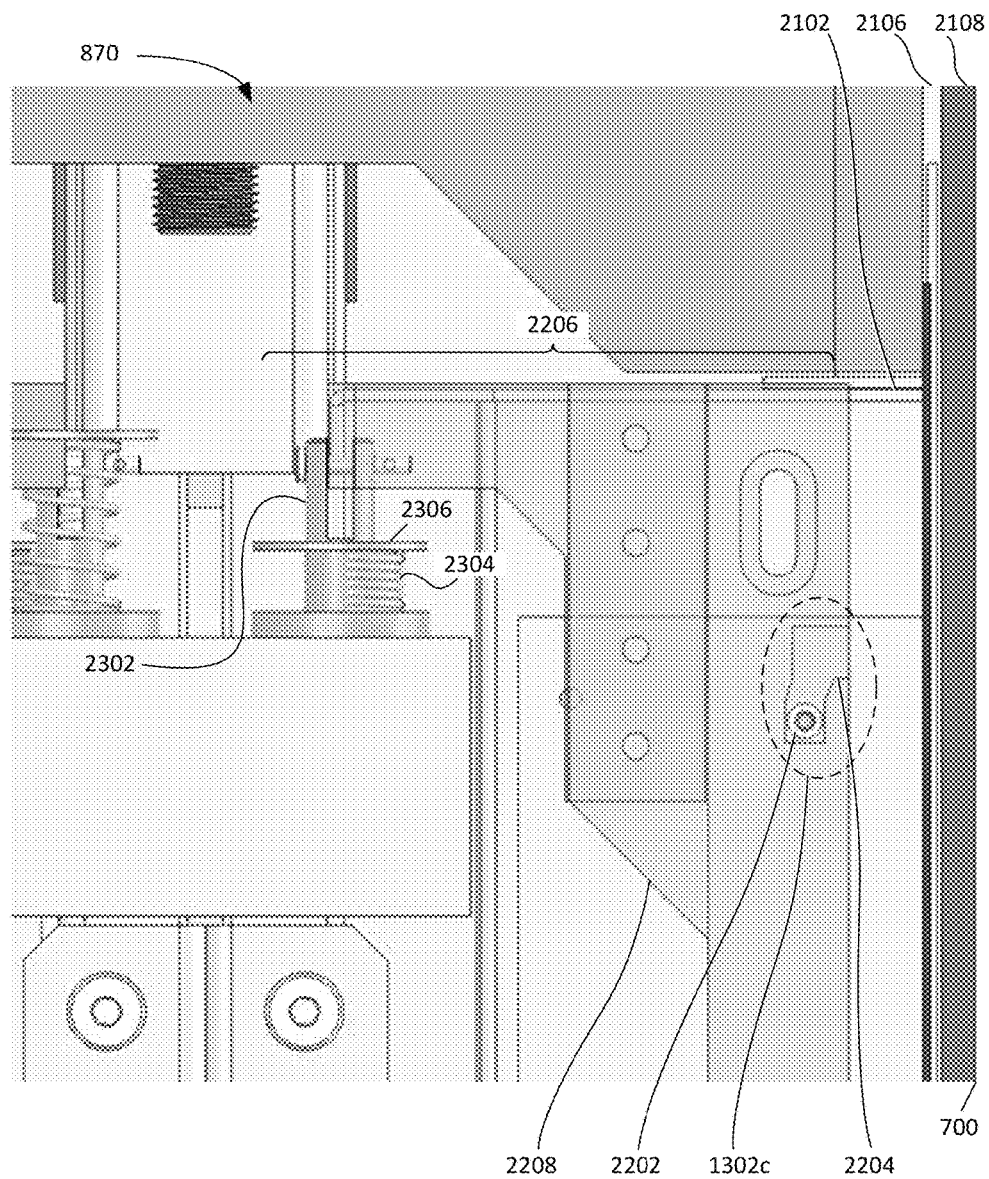
FIGS. 23A and 23B show side views of a compartment lock of a display compartment with the lock engaged (FIG. 23A) and disengaged (FIG. 23B), in accordance with some embodiments.

FIG. 23A shows a cross-sectional view of compartment lock 1302c of display compartment 870 with the lock engaged and the access member (display module 700) in the closed position, according to some embodiments. In some embodiments, lock 1302c is engaged by positioning connector 2202 within mating interlocking connector 2204, such that mating interlocking connector 2204 prevents connector 2202 from moving laterally. As can be seen, when lock 1302c is engaged, display module 700 is held in the closed position. In some embodiments, actuator 2206 is operable to disengage lock 1302*c* by retracting a pin 2302 into an aperture of a spool 2306, thereby moving mating interlocking connector 2204 downward such that connector 2202 can move laterally toward the exterior of the PCS 100. In some embodiments, actuator 2206 includes a bias member 2304 (e.g., a spring) that biases lock 1302*c* toward the engaged position. Actuator 2206 may be controlled by access controller 1310.

Figure 23B:
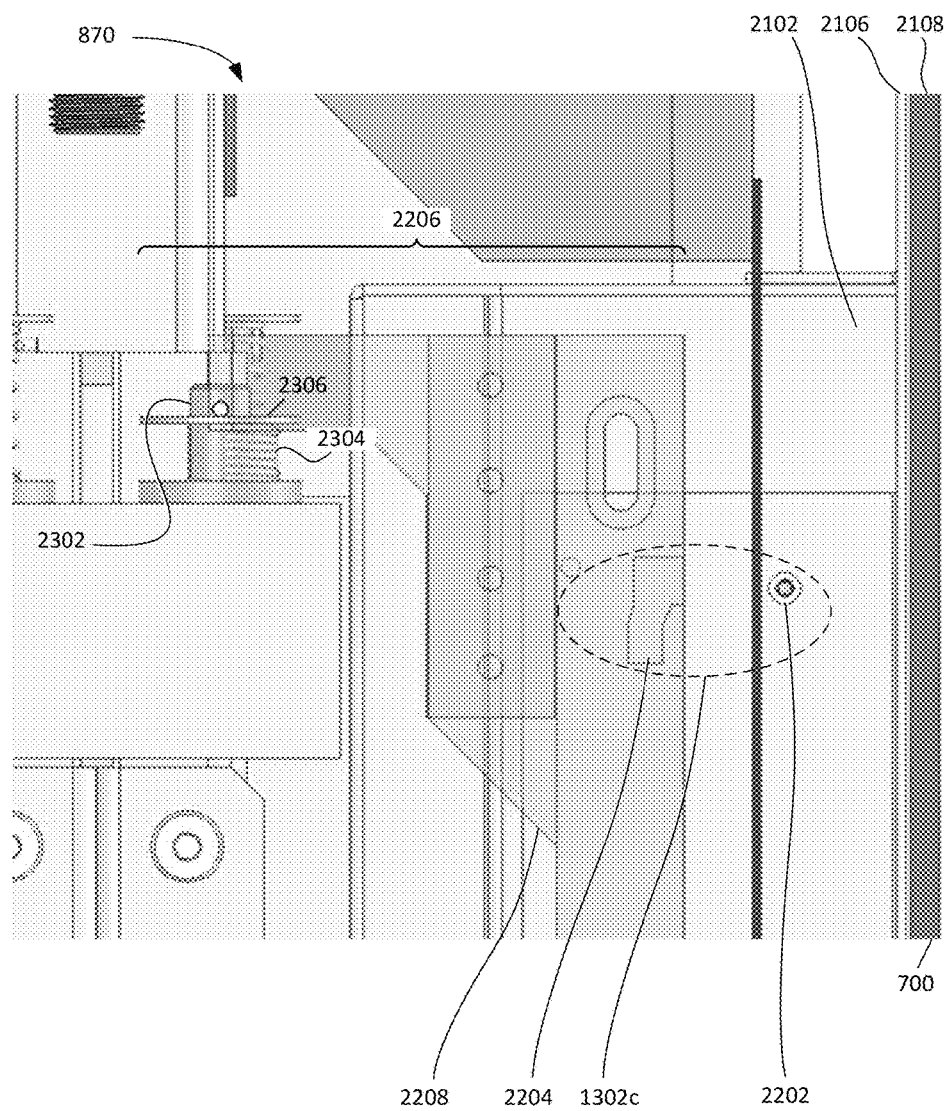

FIG. 23B shows a cross-sectional view of compartment lock 1302*c* of display compartment 870 with the lock disengaged and the access member (display module 700) in the open position, according to some embodiments. In the example of FIG. 23B, pin 2302 has been retracted, thereby causing retention member 2208 and mating interlocking connector 2204 to move downward, thereby releasing connector 2202 to move laterally toward the exterior of PCS 100.

An embodiment has been described in which compartment lock 1302*c* of display compartment 870 includes a connector 2202 and a mating interlocking connector 2204. In some embodiments, a compartment lock 1302*c* may include multiple pairs of connectors and mating interlocking connectors. The connectors may be arranged around a periphery of display module 700, and the mating interlocking connectors may be arranged around a periphery of display compartment 870. For example, retention member 2208 may include one or more mating interlocking connectors, and a second retention member disposed on the opposite side of display module 700 may also include one or more mating interlocking connectors. In some embodiments, the connectors 2202 may be disposed on the retention members 2208, and the mating interlocking connectors 2204 may be disposed on the display module 700.

As described above, PCS 100 may include two display modules 700 facing in opposite directions. In such embodiments, either one or both display modules may be equipped with compartment locks 1302*c* and actuators 2206 that operate independently or in unison.

FIG. 24 shows a perspective view of a communications compartment 880, according to some embodiments. In some embodiments, communications compartment 880 includes a removable cap 985, which may function as access member 1304*d*, and may be secured to the PCS by inserting security fasteners through apertures 2404 and 2406. The security fasteners may function as compartment lock 1302*d*. According to some embodiments, the closed and open positions of access member 1304*d* (e.g., cap 985) are illustrated in FIG. 9A and FIG. 24, respectively.

Figure 25:
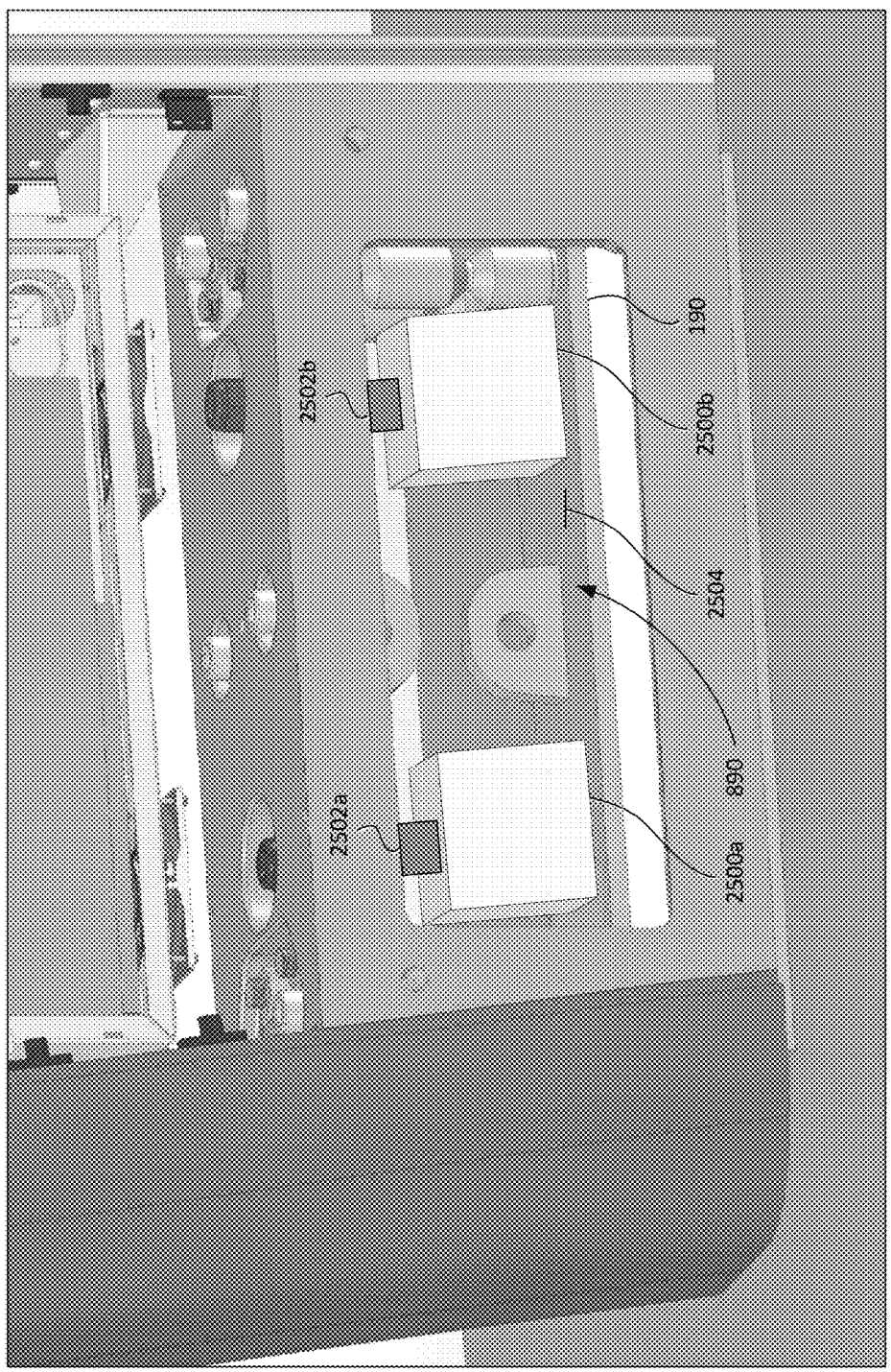
FIG. 25 shows a perspective view of a mounting compartment, in accordance with some embodiments.

Perspective views of mounting compartment 890 are shown in FIGS. 9A, 9C, and 25, according to some embodiments. Mounting compartment 890 may include a cover panel 991. In some embodiments, cover panel 991 functions as access member 1304*e* for mounting compartment 890. In some embodiments, the lock 1302*e* for mounting compartment 890 includes a set of latches disposed proximate the periphery of cover panel 991 and a corresponding set of latch receptacles disposed proximate the periphery of mounting compartment 890 or vice versa. When the lock is engaged, the interlocking of the latches and the latch receptacles may hold the access member securely in the closed position. The lock may be disengaged by access controller 1310, which may drive one or more actuators coupled to the latch receptacles to release the latches, thereby allowing the access member to be moved from the closed position (e.g., a position in which the interior of the compartment is inaccessible, such as the position of cover panel 991 in FIG. 9A) to the open position (e.g., a position in which the interior of the compartment is accessible, such as the position of cover panel 991 in FIG. 9C).

In some embodiments, the mounting compartment 890 contains a mains power connection and one or more network connections. The network connection(s) may be, for example, fiber optic and/or copper network connections, depending, for example, on where the PCS is located and what type of network service is available. In some locations, PCS 100 may receive input data through one or more fiber network connections, provide output data through one or more copper network connections, or vice versa.

In some embodiments, the mounting compartment 890 may contain one or more junction boxes 2500 for connecting power and/or network connections. In some embodiments, the junction boxes 2500 are attached to the mounting compartment 890 before the PCS 100 is installed, which may facilitate securing of the power and network cabling 2502 (e.g., fastening of the cabling to the PCS). In some embodiments, the junction boxes are attached to the PCS 100 before it is installed on mounting subsystem 190. In some embodiments, a portion 2504 of the mounting subsystem 190 forms a bottom surface of the mounting compartment 890. In some embodiments, portions of the power and/or network cabling are located in the mounting subsystem 190 before the PCS 100 is mounted, and the cabling is connected to the PCS's mains power connection and network connection(s) after the PCS 100 is mounted.

In some embodiments, one or more compartments of PCS 100 are hierarchically secured, such that access to one or more compartments is a precondition for accessing another compartment. For example, security interface 1320 may be disposed within a compartment C (e.g., air intake compartment 865 or communication compartment 880), such that a user can access the security interface 1320 only after accessing the compartment C. The user can then provide authentication data to access controller 1310 via security interface 1320, and thereby gain access to other compartments (e.g., display compartment 870, electronics compartment 840, or mounting compartment 890). In some embodiments, the security interface 1320 may include a key reader disposed on an exterior surface of the PCS 100 or proximate to the PCS 100.

Vandalism Detection in a PCS

In some embodiments, PCS 100 may contain one or more vandalism detection systems (e.g., in different compartments of the PCS). Each of the vandalism detection systems may contain one or more accelerometers. It can be appreciated that accelerometers can be used to detect forces applied to the PCS 100. In some embodiments, each of the vandalism detection systems is localized to detect vandalism for a given system. For example, each display module 700 may have its own vandalism detection system. Each display module's vandalism detection system may contain an accelerometer and may be mounted to display panel 721. When a force is applied to the display, for example if someone tries to break the glass, the display module's vandalism detection system may detect the force and send an alert to a remote entity (e.g., a security center).

Figure 26:
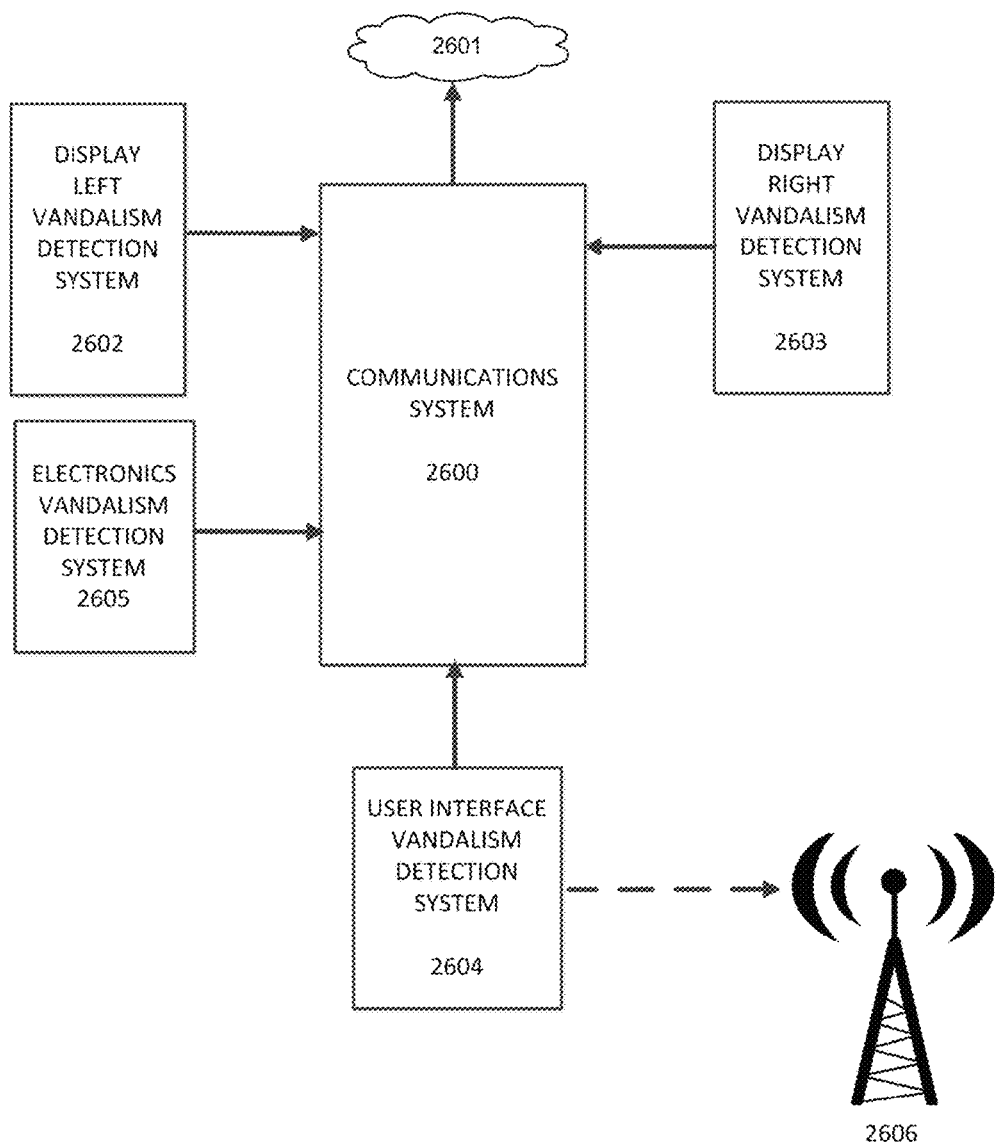
FIG. 26 shows a block diagram of a vandalism detection system of a PCS, in accordance with some embodiments.

An exemplary block diagram of a vandalism detection system is shown in FIG. 26. A PCS 100 may include two display modules 700, which may be used to display advertisements. Each of the display modules may have its own vandalism detection system (2602, 2603), which may be implemented, for example, by the display module's processing device(s) 710. In some embodiments, the electronics subsystem 140 of the PCS 100 has its own electronics vandalism detection system 2605, which may be implemented, for example, by the maintenance subsystem's processing device(s) 400. It can be appreciated that the electronics subsystem 140 may contain costly networking and power control systems. In some embodiments, the user interface subsystem 150 of the PCS 100 has its own user interface vandalism detection system 2604, which may be implemented, for example, by the user interface subsystem's processing device(s) 557. It can be appreciated that the user interface may be a target for vandalism because it is accessible.

In the exemplary block diagram in FIG. 26 the vandalism detections systems 2602-2605 interface to a communications system 2600 (e.g., network subsystem 120 of the PCS 100). In some embodiments, the interface between a vandalism detection system and the communications system 2600 is Ethernet, however other types of interfaces could be used. In some embodiments, communications system 2600 includes a controller that communicates with the vandalism detection system(s) using a protocol. It can be appreciated that communications system 2600 may receive alerts from the vandalism detection systems and send out aggregated alerts to a remote entity (e.g., a security center). In some embodiments, communications system 2600 is simply a service switch and the vandalism detection systems send their alerts directly to a remote entity. This technique may be advantageous because it does not require communications system 2600 to have its own controller. In addition, this technique may be advantageous because if one of the PCS's controllers becomes compromised (e.g., hacked), for example the communications system's controller, the entire PCS 100 system may become compromised.

As described above, user interface subsystem 150 may be on a battery backup system and may be operable to make emergency (e.g., 911) or other phone calls over a wireless communications system. In some embodiments, when user interface vandalism detection system 2604 is on battery backup and detects an act of vandalism, it sends an alert over the wireless communications system to a cellular network 2606, as shown in FIG. 26.

Figure 27:
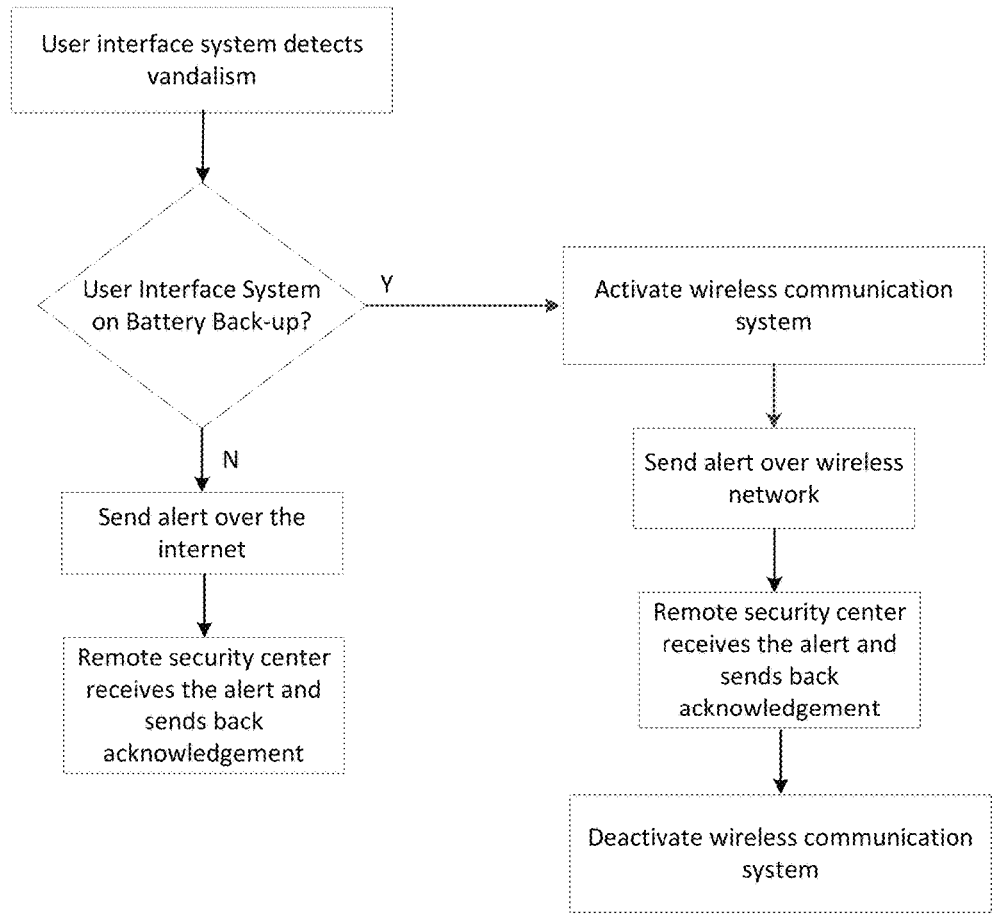
FIG. 27 is a flowchart of a method for sending a vandalism alert in a PCS, in accordance with some embodiments.
Figure 31:
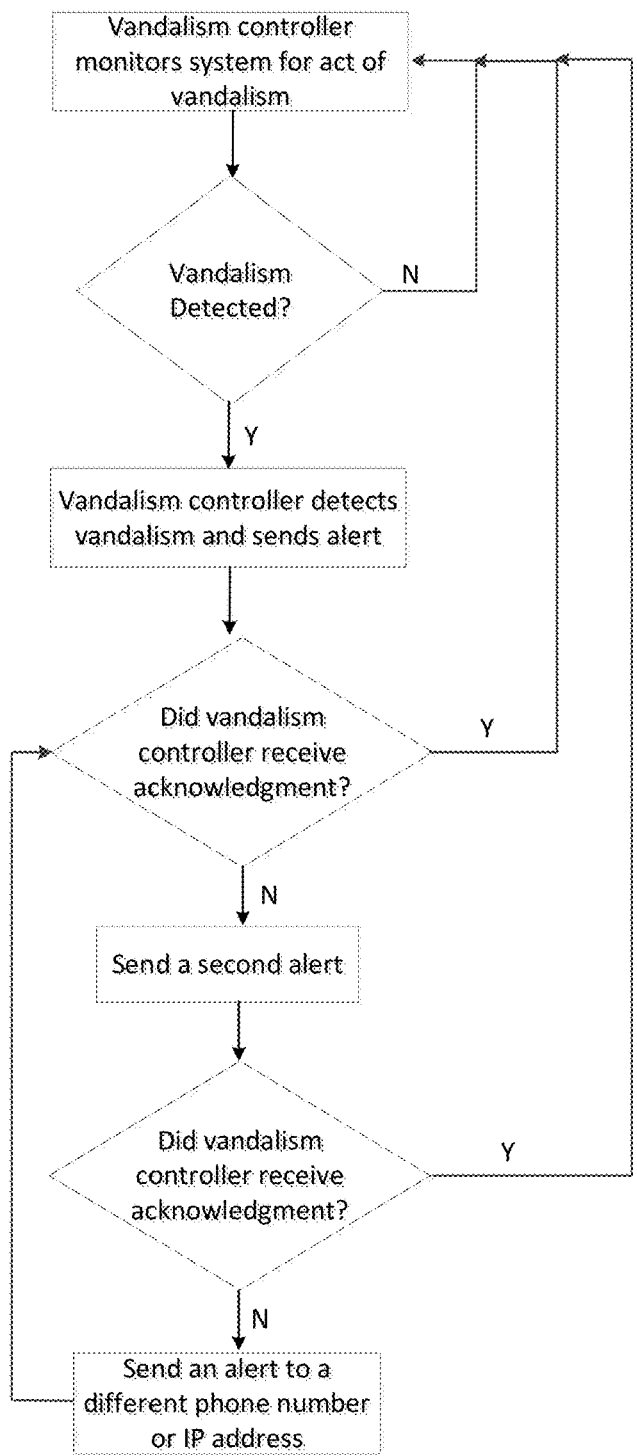
FIG. 31 is a flowchart of a method of sending an alert in a PCS, in accordance with some embodiments.

An exemplary method of determining whether to send a vandalism detection alert over a wired versus a wireless network is shown in FIG. 27. It can be appreciated that the alert could be sent over the wireless communication system as an automated synthesized voice message. In some embodiments, the alert sent over the wireless communications is in text message format (e.g., SMS) to the remote security center. In some embodiments, the user interface vandalism detection system is able to receive an acknowledgement that the alert message was received. It can be appreciated that if the alert was sent over a wireless communications system and it did not receive the acknowledgement within a predetermined period of time, the vandalism detection system may send another alert to the same number or a different number programmed into the system. It can be appreciated if the alert was sent over the internet that the vandalism detection system may try another IP address. An exemplary flow diagram of a method of sending a vandalism detection alert is shown in FIG. 31. This method uses a second try before switching to a different IP address or phone number. In some embodiments, the vandalism detection system sends alerts to IP addresses and/or phone numbers contained in a prioritized, preprogrammed list.

Figure 30:
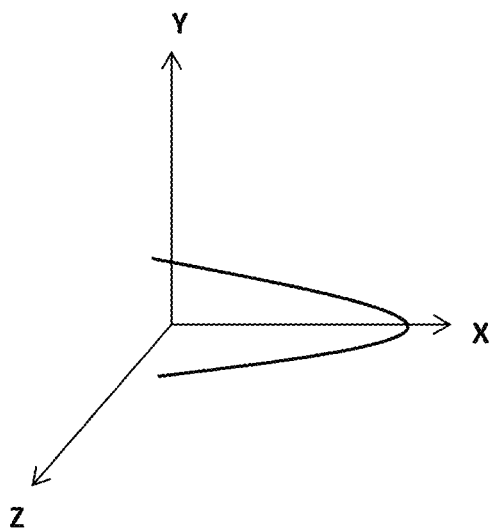
FIG. 30 is an exemplary diagram of a vandalism force applied to a PCS.

In some embodiments, a vandalism detection system containing an accelerometer measures the direction of a force applied to the PCS 100 (or to a component thereof). It can be appreciated that the vandalism detection system may process the data (e.g., signals) generated by the accelerometer to determine if the detected force corresponds to an act of vandalism. An exemplary diagram showing a force in the X-axis is shown in FIG. 30. In some embodiments, a display vandalism detection system may classify a force in the X-axis direction (or perpendicular to the viewing surface of the display) as more likely corresponding to an act of vandalism than a comparable force in the Y-axis direction.

Figure 32A:
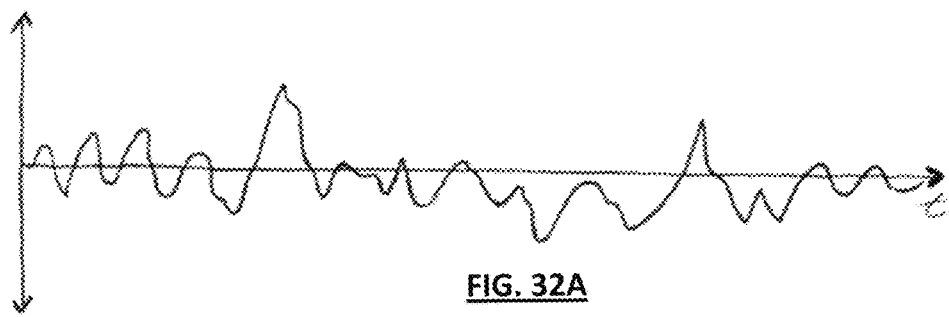
FIGS. 32A, 32B, and 32C show examples of signals generated by an accelerometer of a vandalism detection system in response to forces being applied to a PCS, in accordance with some embodiments.
Figure 32B:
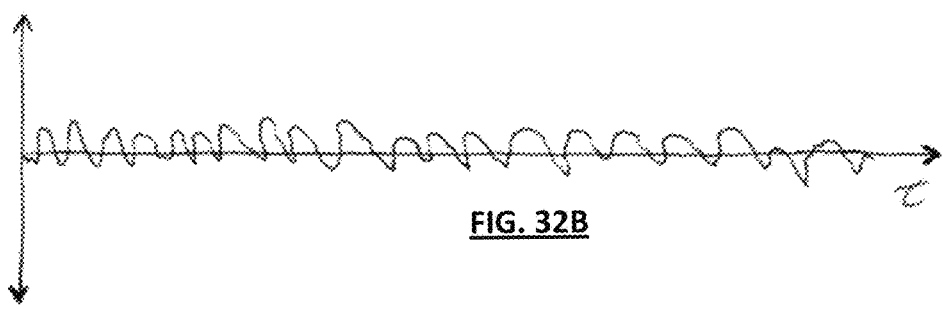

In some embodiments, when a vandalism detection system senses a single force it searches for additional forces, such as a series of forces. It can be appreciated that a PCS 100 located on a city sidewalk and may be subjected to forces associated with environmental forces that are not attributed to vandalism, such as large vehicles driving over rough roads adjacent to the PCS, subway cars travelling under the sidewalk onto which the PCS mounted, construction equipment, etc. An example of a signal that may be generated by an accelerometer in response to such forces is shown in FIG. 32A. In some embodiments, the vandalism detection system is able to filter out such signals in an attempt to minimize false positives. In addition, a vandalism detection system may be able to sense when the forces applied to a PCS are due to a constant movement, such as movement associated with seismic activity. An example of a signal that may be generated by an accelerometer in response to such movement is shown in FIG. 32B. In some embodiments, the detected signals may be compared to known signal patterns that are common to the environment. For example, if the PCS is located above a subway line, the rumble of the subway cars below the PCS may create a signature signal that is not to be mistaken for potential vandalism. In some embodiments, the vandalism detection system may be able to determine the frequency of a detected signal. For example, the detected signal frequency may be compared to a known frequency, such as that of a jackhammer being used for road construction.

Figure 32C:
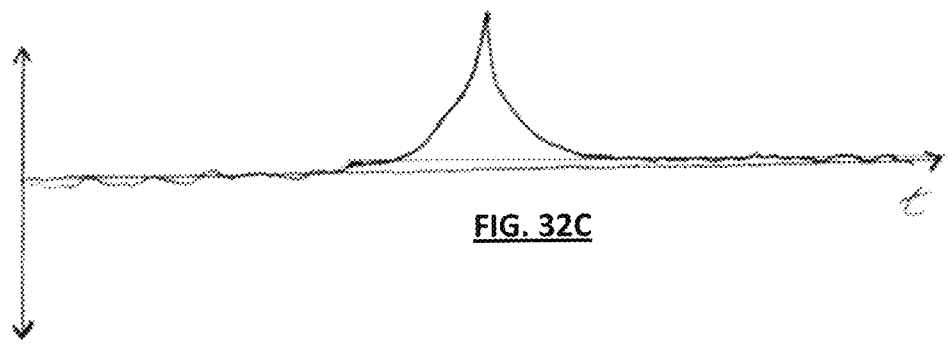

In some embodiments, these forces would also be detected in the Y-axis or parallel to the advertisement display surface. It can be appreciated that at least some acts of vandalism may be characterized by an accelerometer generating a single high amplitude signal (e.g., when a vandal hits a display with an object, for example, a baseball bat or brick). An example of a signal generated by an accelerometer in response to a display being hit with an object is shown in FIG. 32C.

In some embodiments, a PCS 100 may send a silent alert to a security provider to alert the security provider that an act of vandalism is occurring. In some embodiments, the alert may contain accompanying information to indicate which vandalism detection system has detected the act of vandalism, which component or compartment of the PCS 100 is being vandalized, etc.

Figure 28:
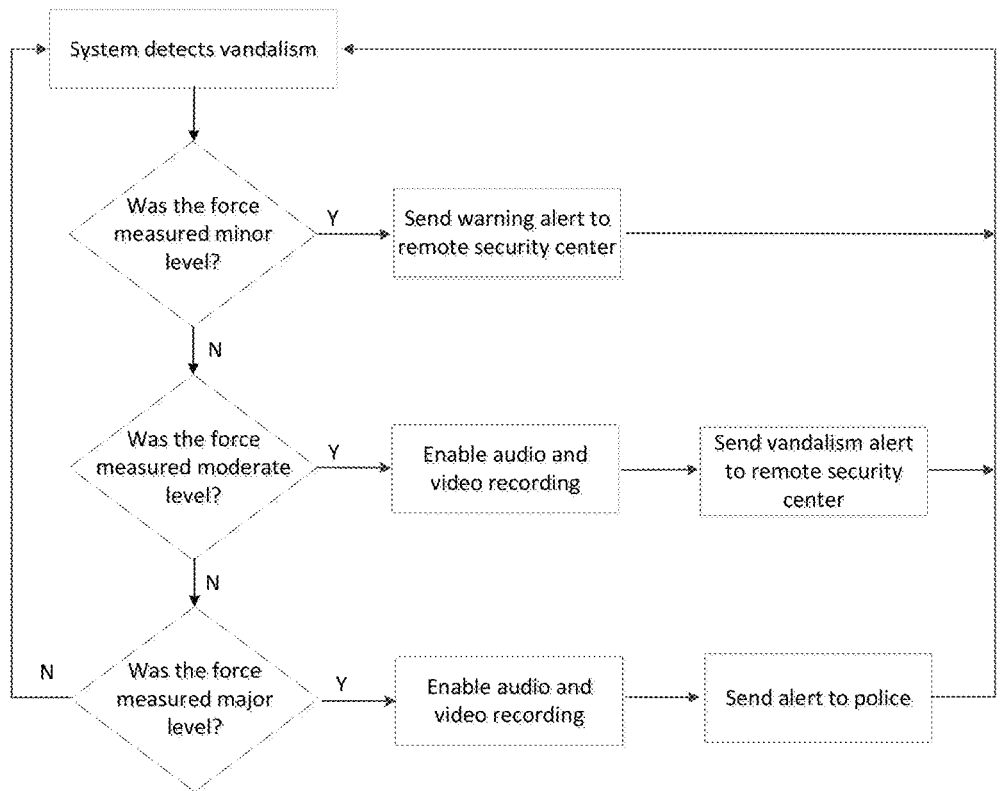
FIG. 28 is a flowchart of a method for determining a vandalism alert level in a PCS, in accordance with some embodiments.

In some embodiments, a vandalism detection system may assign an alert level (e.g. low, medium, high) to the alert sent to a remote entity. An method for assigning alert level is shown in FIG. 28. It can be appreciated, that a low level alert may correspond to a warning. For example, when the security center receives the warning it may schedule service personnel to examine PCS 100 for damage when they are in the area. It can be appreciated that a medium level alert may indicate a vandal breaking a display or trying to gain access to one of the compartments. For example, when the security center receives the medium level alert, the security center may deploy a security officer to the scene to apprehend the vandals. It can be appreciated that a high level alert may be indicative of a force large enough to detach PCS 100 from its base. For example, when a high level alert is received, local police may be notified that a potential vehicular accident has occurred with the PCS. In some embodiments, the alert level may be a number for example from 1-10, with 1 being the lowest (e.g. warning) and 10 being the highest.

In some embodiments, the vandalism detection system may send a signal to the power distribution subsystem to interrupt power to one or more subsystems or compartments in response to an alert. It can be appreciated that a high level alert may indicate a safety hazard to bystanders or to the PCS itself. In some embodiments, after a high level alert is sent to a remote location, the entire PCS may be powered down.

In some embodiments, the vandalism detection system may send PCS location information along with the alert. It can be appreciated that knowing the location along with the alert may help streamline the process of notifying and deploying security personnel or local police.

Figure 29:
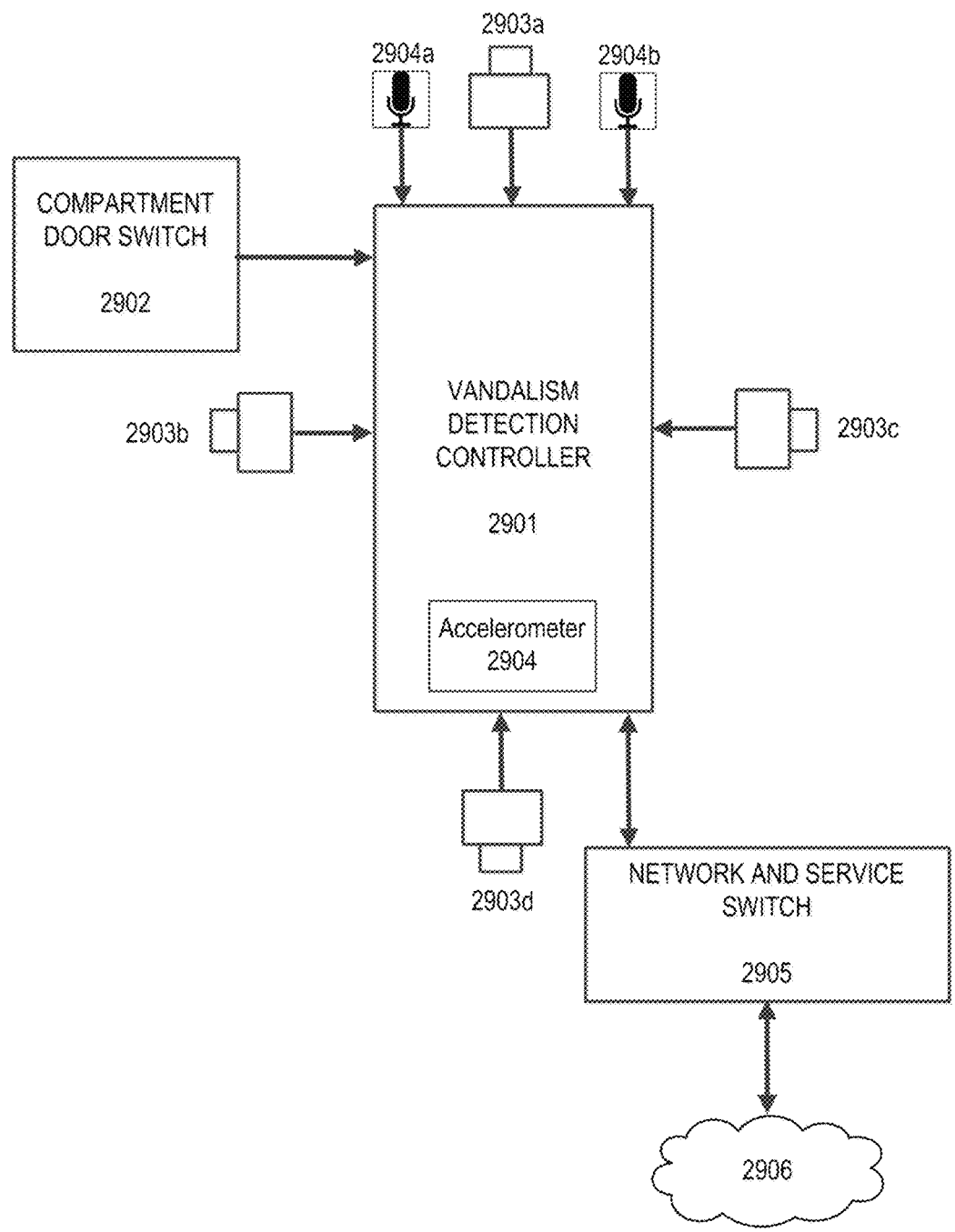
FIG. 29 is a block diagram of a vandalism detection system of a PCS, in accordance with some embodiments.

An exemplary diagram of a vandalism detection system is shown in FIG. 29. The vandalism detection system 2901 may activate one or more cameras 2903 when an act of vandalism is detected. In some embodiments, the camera(s) 2903 may include one or more of the above-described cameras (616, 723, 724). In FIG. 29, the vandalism detection system is able to control four cameras 2903, one that captures video in each direction. In some embodiments, the vandalism detection system streams live video feed to a remote security center real-time, so the act of vandalism can be assessed. In some embodiments, the vandalism detection system 2901 is coupled to one or more microphones 2904 for recording audio signals. In some embodiments, the microphone(s) 2904 may include one or more of the above-described microphones (604, 605). The vandalism detection system 2901 in FIG. 29 is coupled two microphones 2904. For example, when the vandalism detection system 2901 detects an act of vandalism it may activate the microphones to record audio that is synchronized with the video feed. It can be appreciated that having audio and video available at a remote security center may help personnel asses the vandalism situation. In some embodiments, the audio and video data are stored locally in memory. It can be appreciated if there is a connection problem with the security center that a backup copy retained in the PCS 100 may be valuable. In some embodiments, vandalism detection system 2901 is coupled to one or more compartment door switches 2902. A compartment door switch may indicate whether a corresponding compartment door is open or closed. It can be appreciated that detection of forces applied to the PCS 100 and detection of a compartment door switch indicating that a door has opened (or is open) may help personnel at a remote security center determine which compartment of the PCS is being vandalized.

Further Description of Some Embodiments

Embodiments have been described in which a vandalism detection system performs a vandalism detection process. The vandalism detection methods or processes outlined herein can be coded as software that is executable on one or more processors that employ one of a variety of operating systems or platforms. Additionally, such software can be written using any of a number of suitable programming languages and/or programming or scripting tools, and also can be compiled as executable machine language code or intermediate code that is executed on a framework or virtual machine. Also, the acts performed as part of the techniques described herein can be performed in any suitable order.

In this respect, the vandalism detection techniques can be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various techniques discussed above. The computer readable medium or media can be non-transitory. The computer readable medium or media can be transportable, such that the program or programs stored thereon can be loaded onto one or more different computers or other processors to implement various aspects of the present invention as discussed above. The terms "program" or "software" are used herein in a generic sense to refer to computer code or set of computer-executable instructions that can be employed to program a computer or other processor to implement various aspects described in the present disclosure. Additionally, it should be appreciated that according to one aspect of this disclosure, one or more computer programs that when executed perform techniques described herein need not reside on a single computer or processor, but can be distributed in a modular fashion amongst a number of different computers or processors to implement various aspects of the present invention.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures can be shown to have fields that are related through location in the data structure. Such relationships can likewise be achieved by assigning storage for the fields with locations in a computer-readable medium that conveys relationship between the fields. However, any suitable mechanism can be used to establish a relationship between information in fields of a data structure, including through the use of pointers, tags or other mechanisms that establish a relationship between data elements.

In some embodiments the technique(s) can be implemented as computer instructions stored in portions of a computer's random access memory to provide control logic that affects the processes described above. In such an embodiment, the program can be written in any one of a number of high-level languages, such as FORTRAN, PASCAL, C, C++, C#, Java, JavaScript, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software can be embedded on an article of manufacture including, but not limited to, "computer-readable program means" such as a floppy disk, a hard disk, an optical disk, a magnetic tape, a PROM, an EPROM, or CD-ROM.

Embodiments have been described in which various aspects of the techniques described herein are applied to a personal communication structure (PCS). In some embodiments, aspects of the techniques described herein may be applied to any suitable structure including, without limitation, a kiosk (e.g., an interactive kiosk), pay station (e.g., parking pay station), automated teller machine (ATM), article of street furniture (e.g., mailbox, bench, traffic barrier, bollard, telephone booth, streetlamp, traffic signal, traffic sign, public transit sign, public transit shelter, taxi stand, public lavatory, fountain, watering trough, memorial, sculpture, waste receptacle, fire hydrant, vending machine, utility pole, etc.), etc.

Various aspects of the present disclosure can be used alone, in combination, or in a variety of arrangements not specifically described in the foregoing, and the invention is therefore not limited in its application to the details and arrangement of components set forth in the foregoing description or illustrated in the drawings. For example, aspects described in one embodiment can be combined in a suitable manner with aspects described in other embodiments.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Equivalents

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A personal communication structure (PCS) comprising:
one or more vandalism detection systems;
each vandalism detection system comprising an accelerometer for:
    detecting a series of forces applied to the PCS during a time period;
    determining if the detected forces are attributed to environmental effects, wherein the determination of whether the detected forces are attributed to environmental effects comprises determining the frequency of the forces applied to the PCS and comparing the frequency of the forces applied to the PCS to frequencies associated with environmental effects; and
    if not attributed to environmental effects, issuing an alert indicating the PCS is being subject to an act of vandalism.

2. The PCS of claim 1 wherein the determination of whether the detected forces are attributed to environmental effects comprises determining the direction of the forces applied to the PCS.

3. The PCS of claim 2 wherein the detected forces are more likely to be attributed to environmental effects if the direction of the detected forces is parallel to a display surface of the PCS rather than orthogonal to the display surface of the PCS.

4. The PCS of claim 1 wherein the determination of whether the detected forces are attributed to environmental effects comprises determining the magnitude of the forces applied to the PCS.

5. The PCS of claim 1 further comprising a plurality of independently accessible compartments at least partially enclosing respective subsystems of the PCS, the plurality of independently accessible compartments comprising:
- an electronics compartment at least partially enclosing a power distribution subsystem;
- a communications compartment at least partially enclosing a communications subsystem; and
- one or more display compartments, each at least partially enclosing a respective display subsystem.

6. The PCS of claim 5 wherein an interior of each of the independently accessible compartments is accessible without accessing the interior of any other independently accessible compartment.

7. The PCS of claim 5 wherein each display compartment comprises one of the one or more vandalism detection systems.

8. The PCS of claim 5 further comprising a user interface compartment at least partially enclosing a user interface subsystem, and wherein the user interface compartment comprises one of the one or more vandalism detection systems.

9. The PCS of claim 5 wherein issuance of the alert further instructs the power distribution subsystem to interrupt power being provided to one or more subsystems of the PCS.

10. The PCS of claim 1 wherein the one or more vandalism detection systems are powered by a backup power supply that is independent of a primary power supply for the PCS.

11. The PCS of claim 1 further comprising a communications system in electronic communication with the vandalism detection system for transmitting the alert.

12. The PCS of claim 11 wherein the communications system transmits the alert wirelessly to a remote monitoring facility.

13. The PCS of claim 1 further comprising issuing a second alert based at least in part on a subsequent determination if the detected forces are attributed to environmental effects.

14. A method for detecting vandalism at a personal communications structure (PCS), the PCS including one or more vandalism detection systems, the method comprising:
- detecting, using an accelerometer, one or more series of forces applied to the PCS during a time period;
- determining if the detected forces are attributed to environmental effects, wherein the determination of whether the detected forces are attributed to environmental effects comprises determining the direction of the forces applied to the PCS, and wherein the detected forces are more likely to be attributed to environmental effects if the direction of the detected forces is parallel to a display surface of the PCS rather than orthogonal to the display surface of the PCS; and
- if not attributed to environmental effects, issuing an alert indicating the PCS is being subject to an act of vandalism.

15. The method of claim 14 wherein the determination of whether the detected forces are attributed to environmental effects further comprises comparing the frequency of the forces applied to the PCS to frequencies associated with environmental effects.

16. The method of claim 14 wherein the determination of whether the detected forces are attributed to environmental effects comprises determining the frequency of the forces applied to the PCS.

17. The method of claim 14 wherein the determination of whether the detected forces are attributed to environmental effects comprises determining the magnitude of the forces applied to the PCS.

18. The method of claim 14 wherein the PCS comprises a plurality of independently accessible compartments at least partially enclosing respective subsystems of the PCS, the plurality of independently accessible compartments comprising:
- an electronics compartment at least partially enclosing a power distribution subsystem;
- a communications compartment at least partially enclosing a communications subsystem; and
- one or more display compartments, each at least partially enclosing a respective display subsystem.

19. The method of claim 18 wherein each display compartment comprises one of the one or more vandalism detection systems.

20. The method of claim 18 wherein the PCS further comprises a user interface compartment at least partially enclosing a user interface subsystem, and wherein the user interface compartment comprises a vandalism detection system.

21. The method of claim 18 further comprising causing the power distribution subsystem to interrupt power being provided to one or more subsystems of the PCS based at least in part on the alert.

22. The method of claim 18 wherein the PCS further comprises a communications system in electronic communication with at least one of the vandalism detection systems for transmitting the alert.

23. The method of claim 22 wherein the communications system transmits the alert to a remote monitoring facility using at least one of a wired network and a wireless network.

24. The method of claim 23 wherein the alert includes an alert level.

25. The method of claim 24 wherein the alert includes a location of the PCS.

26. The method of claim 22 wherein the communications system transmits a second alert if the communications system does not receive an acknowledgement of the first alert after a specified time period.

27. The method of claim 22 wherein the communications system transmits the alert using contact information selected from a prioritized preprogrammed list of contact information.

28. The method of claim 22 wherein the communications system transmits video after transmitting the alert.

* * * * *